US012572365B2

(12) United States Patent
Magouyrk et al.

(10) Patent No.: US 12,572,365 B2
(45) Date of Patent: Mar. 10, 2026

(54) REGION BUILD TESTING TECHNIQUES

(71) Applicant: Oracle International Corporation, Redwood Shores, CA (US)

(72) Inventors: Clayton Matthew Magouyrk, Seattle, WA (US); Lucas Michael Kreger-Stickles, Seattle, WA (US); William Thomas Price, Weston-Super-Mare (GB)

(73) Assignee: Oracle International Corporation, Redwood Shores, CA (US)

( * ) Notice: Subject to any disclaimer, the term of this patent is extended or adjusted under 35 U.S.C. 154(b) by 173 days.

(21) Appl. No.: 18/667,851

(22) Filed: May 17, 2024

(65) Prior Publication Data

US 2024/0385851 A1 Nov. 21, 2024

Related U.S. Application Data

(60) Provisional application No. 63/503,147, filed on May 18, 2023.

(51) Int. Cl.
*G06F 9/4401* (2018.01)
*G06F 8/65* (2018.01)
(Continued)

(52) U.S. Cl.
CPC .............. *G06F 9/4401* (2013.01); *G06F 8/65* (2013.01); *G06F 9/4416* (2013.01); (Continued)

(58) Field of Classification Search
CPC ...... G06F 9/4401; G06F 11/3698; G06F 8/65; G06F 9/4416
See application file for complete search history.

(56) References Cited

U.S. PATENT DOCUMENTS 9,876,703 B1 1/2018 Arllen et al.
10,511,675 B1 12/2019 Chud
(Continued)

FOREIGN PATENT DOCUMENTS

WO 2021150306 A1 7/2021
WO 2021150366 A1 7/2021
(Continued)

OTHER PUBLICATIONS

International Application No. PCT/US2024/028744, International Search Report and Written Opinion mailed on Jul. 23, 2024, 16 pages.
(Continued)

*Primary Examiner* — Phil K Nguyen
*Assistant Examiner* — Gayathri Sampath
(74) *Attorney, Agent, or Firm* — Kilpatrick Townsend & Stockton LLP

(57) ABSTRACT

A variety of testing environments and techniques are disclosed. An orchestrator control plane may generate a build plan comprising a plurality of ordered steps for bootstrapping one or more services. The build plan may be generated based at least in part on one or more service plans and manifests that individually specify a deterministic process for bootstrapping a service. The orchestrator control plan may instruct a region orchestrator executing within an isolated testing environment to execute a test build of the one or more services according to the build plan. The region orchestrator may execute, as part of executing the test build, a subset of steps from the plurality of ordered steps of the build plan utilizing resources of the isolated testing environment and in an order identified by the build plan. At any suitable time, the isolated testing environment may be reset to enable subsequent test build executions.

20 Claims, 44 Drawing Sheets

(51) Int. Cl.

| | |
|---|---|
| *G06F 9/455* | (2018.01) |
| *G06F 9/48* | (2006.01) |
| *G06F 9/50* | (2006.01) |
| *G06F 11/32* | (2006.01) |
| *G06F 11/3668* | (2025.01) |
| *G06F 11/3698* | (2025.01) |

(52) U.S. Cl.

CPC ........ *G06F 9/45558* (2013.01); *G06F 9/4881* (2013.01); *G06F 9/5072* (2013.01); *G06F 11/328* (2013.01); *G06F 11/3698* (2025.01); *G06F 2009/4557* (2013.01); *G06F 2009/45595* (2013.01); *G06F 2209/482* (2013.01)

(56) References Cited

U.S. PATENT DOCUMENTS

| | | | |
|---|---|---|---|
| 11,321,137 B2 | 5/2022 | Barsalou et al. | |
| 11,379,353 B1 | 7/2022 | Marchetti et al. | |
| 11,593,251 B2 | 2/2023 | Chirkin et al. | |
| 11,604,672 B2 | 3/2023 | Subramanian et al. | |
| 11,853,802 B1* | 12/2023 | Wei | G06F 9/45558 |
| 2010/0106678 A1 | 4/2010 | Pietrek et al. | |
| 2014/0173060 A1* | 6/2014 | Jubran | G06F 9/5061 |
| | | | 709/220 |
| 2015/0372938 A1 | 12/2015 | Patel et al. | |
| 2020/0004569 A1 | 1/2020 | Gupta et al. | |
| 2020/0244527 A1 | 7/2020 | Sharma et al. | |
| 2021/0224076 A1 | 7/2021 | Dockter et al. | |
| 2021/0224132 A1 | 7/2021 | Barsalou | |
| 2021/0382725 A1 | 12/2021 | Vemula et al. | |
| 2022/0197633 A1* | 6/2022 | Kun | G06F 9/45558 |
| 2022/0353133 A1 | 11/2022 | Shrestha et al. | |
| 2022/0398078 A1 | 12/2022 | Segler | |
| 2023/0011628 A1 | 1/2023 | Hurley et al. | |
| 2023/0105901 A1 | 4/2023 | Adogla et al. | |
| 2023/0108661 A1 | 4/2023 | Adogla et al. | |
| 2023/0367654 A1 | 11/2023 | Kurian et al. | |
| 2024/0330069 A1 | 10/2024 | Atur et al. | |

FOREIGN PATENT DOCUMENTS

| | | |
|---|---|---|
| WO | 2021150435 A1 | 7/2021 |
| WO | 2022104395 A1 | 5/2022 |

OTHER PUBLICATIONS

International Application No. PCT/US2024/028788, International Search Report and Written Opinion mailed on Jul. 23, 2024, 16 pages.

U.S. Appl. No. 18/537,902, Non-Final Office Action, mailed on May 20, 2025, 10 pages.

"Developing System Services in Oracle Solaris 11.3", Oracle, Available Online at: https://docs.oracle.com/cd/E53394_01/pdf/E60814.pdf, Sep. 1, 2018, 76 pages.

Girola et al., "IBM Data Center Networking; Planning for Virtualization and Cloud Computing", Redbooks, May 9, 2011, 258 pages.

International Application No. PCT/US2024/028767, "International Search Report and Written Opinion", mailed Sep. 10, 2024, 13 pages.

International Application No. PCT/US2024/029210, "International Search Report and Written Opinion", mailed Sep. 16, 2024, 12 pages.

International Application No. PCT/US2024/029417, "International Search Report and Written Opinion", mailed Sep. 16, 2024, 12 pages.

International Application No. PCT/US2024/030201, "International Search Report and Written Opinion", mailed Sep. 16, 2024, 12 pages.

International Application No. PCT/US2024/030208, "International Search Report and Written Opinion", mailed Sep. 16, 2024, 13 pages.

International Application No. PCT/US2024/030212, "International Search Report and Written Opinion", mailed Sep. 16, 2024, 12 pages.

* cited by examiner

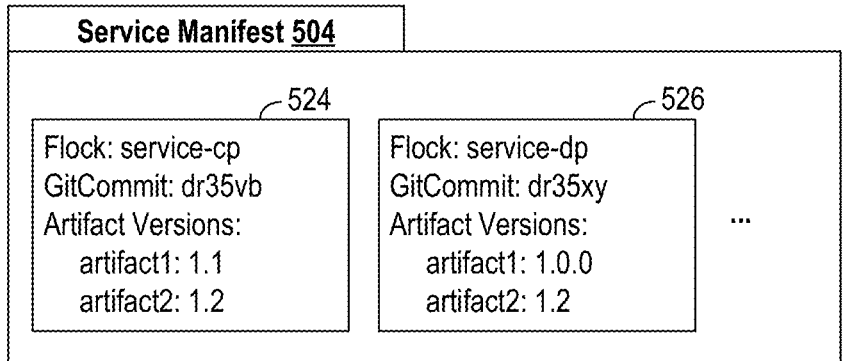

Service Plan 502

Intra-Service Coordination      Inter-Service Coordination

506 — Build Milestone

516 — Skill State Update

520

522

EU

508 — Build Milestone

518 — Skill State Update

Skill State Update

Service(s) 514

EU

510 — Build Milestone

Skill State Update

Skill State Update

EU

512 — Build Milestone

Skill State Update

Service Manifest 504

524
```
Flock: service-cp
GitCommit: dr35vb
Artifact Versions:
    artifact1: 1.1
    artifact2: 1.2
```

526
```
Flock: service-dp
GitCommit: dr35xy
Artifact Versions:
    artifact1: 1.0.0
    artifact2: 1.2
```

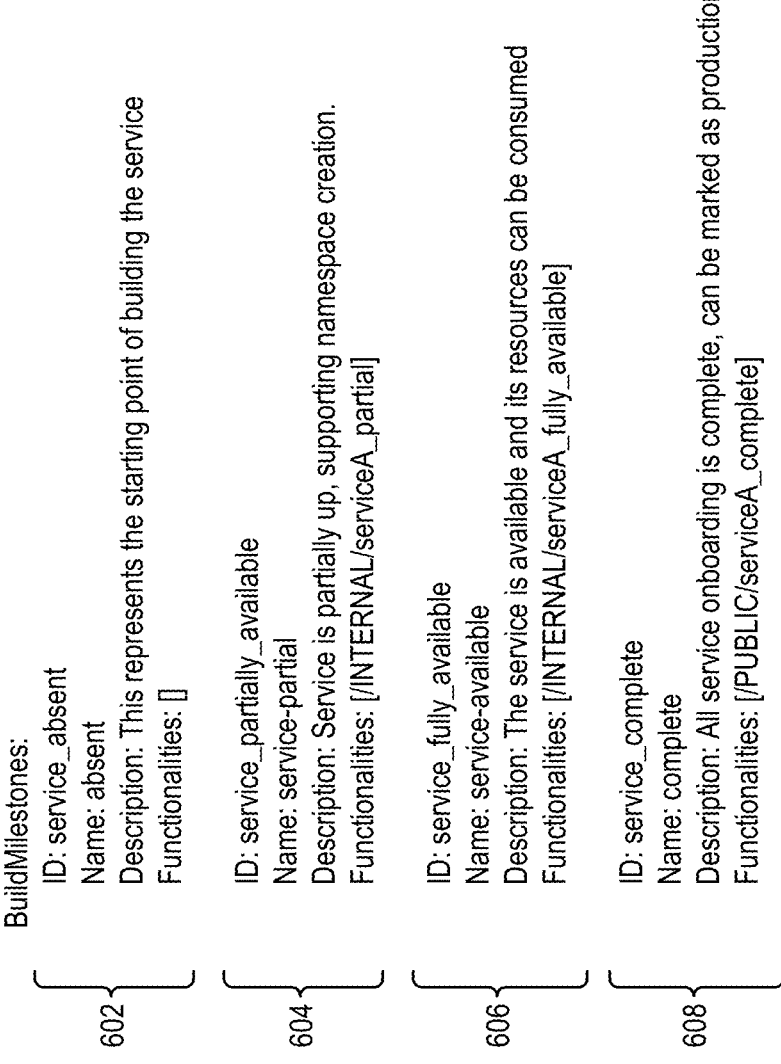

BuildMilestones:

ID: service_absent
Name: absent
Description: This represents the starting point of building the service
Functionalities: []

602

ID: service_partially_available
Name: service-partial
Description: Service is partially up, supporting namespace creation.
Functionalities: [/INTERNAL/serviceA_partial]

604

ID: service_fully_available
Name: service-available
Description: The service is available and its resources can be consumed
Functionalities: [/INTERNAL/serviceA_fully_available]

606

ID: service_complete
Name: complete
Description: All service onboarding is complete, can be marked as production
Functionalities: [/PUBLIC/serviceA_complete]

Figure 7:
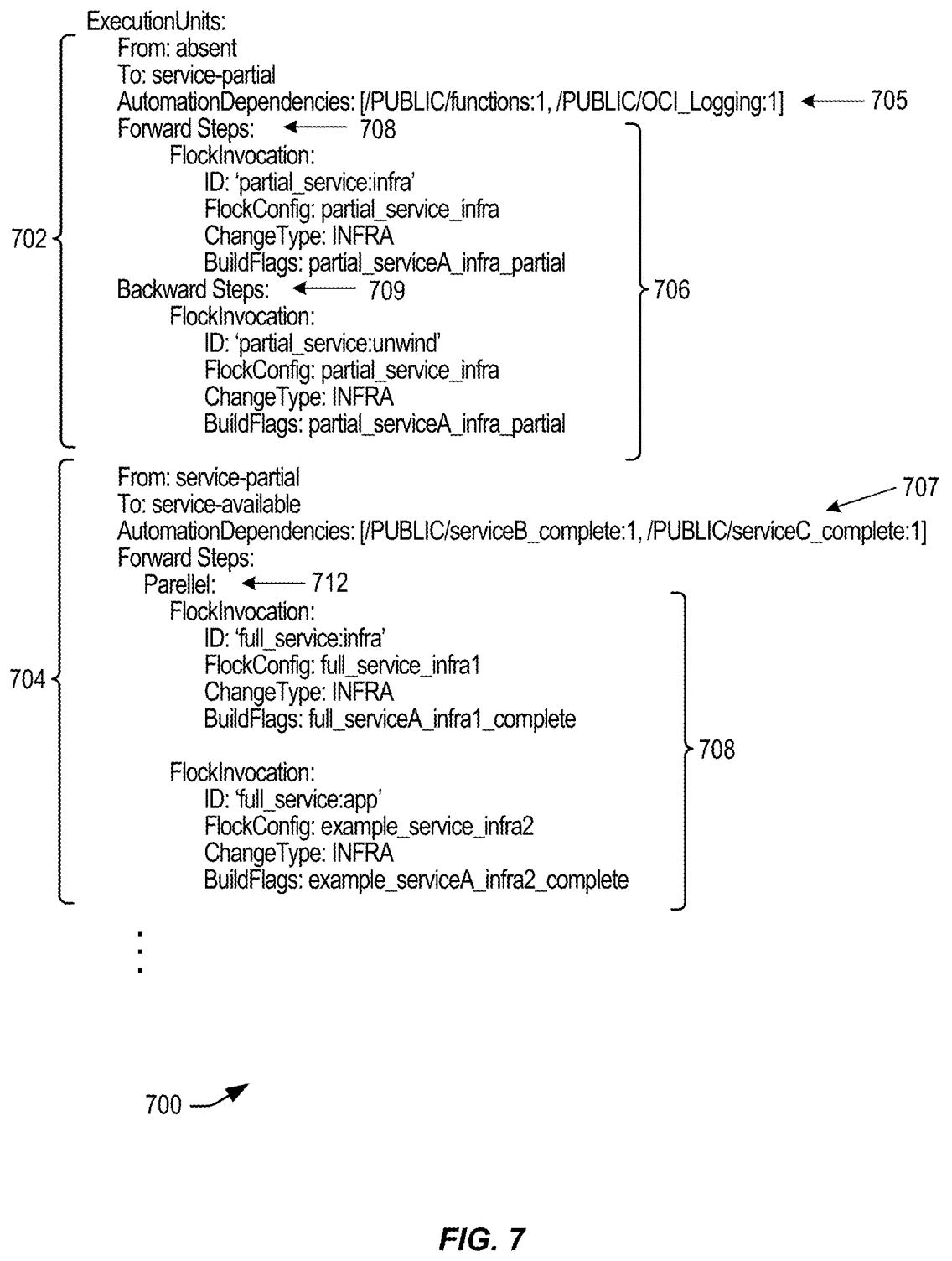

```
ExecutionUnits:
    From: absent
    To: service-partial
    AutomationDependencies: [/PUBLIC/functions:1, /PUBLIC/OCI_Logging:1]    ◄——— 705
    Forward Steps:    ◄——— 708
        FlockInvocation:
            ID: 'partial_service:infra'
            FlockConfig: partial_service_infra
            ChangeType: INFRA
            BuildFlags: partial_serviceA_infra_partial
    Backward Steps:    ◄——— 709                                              706
        FlockInvocation:
            ID: 'partial_service:unwind'
            FlockConfig: partial_service_infra
            ChangeType: INFRA
            BuildFlags: partial_serviceA_infra_partial From: service-partial
    To: service-available                                                    707
    AutomationDependencies: [/PUBLIC/serviceB_complete:1, /PUBLIC/serviceC_complete:1]
    Forward Steps:
        Parellel:    ◄——— 712
        FlockInvocation:
            ID: 'full_service:infra'
            FlockConfig: full_service_infra1
            ChangeType: INFRA
            BuildFlags: full_serviceA_infra1_complete FlockInvocation:                                                     708
            ID: 'full_service:app'
            FlockConfig: example_service_infra2
            ChangeType: INFRA
            BuildFlags: example_serviceA_infra2_complete
```

Figure 8:
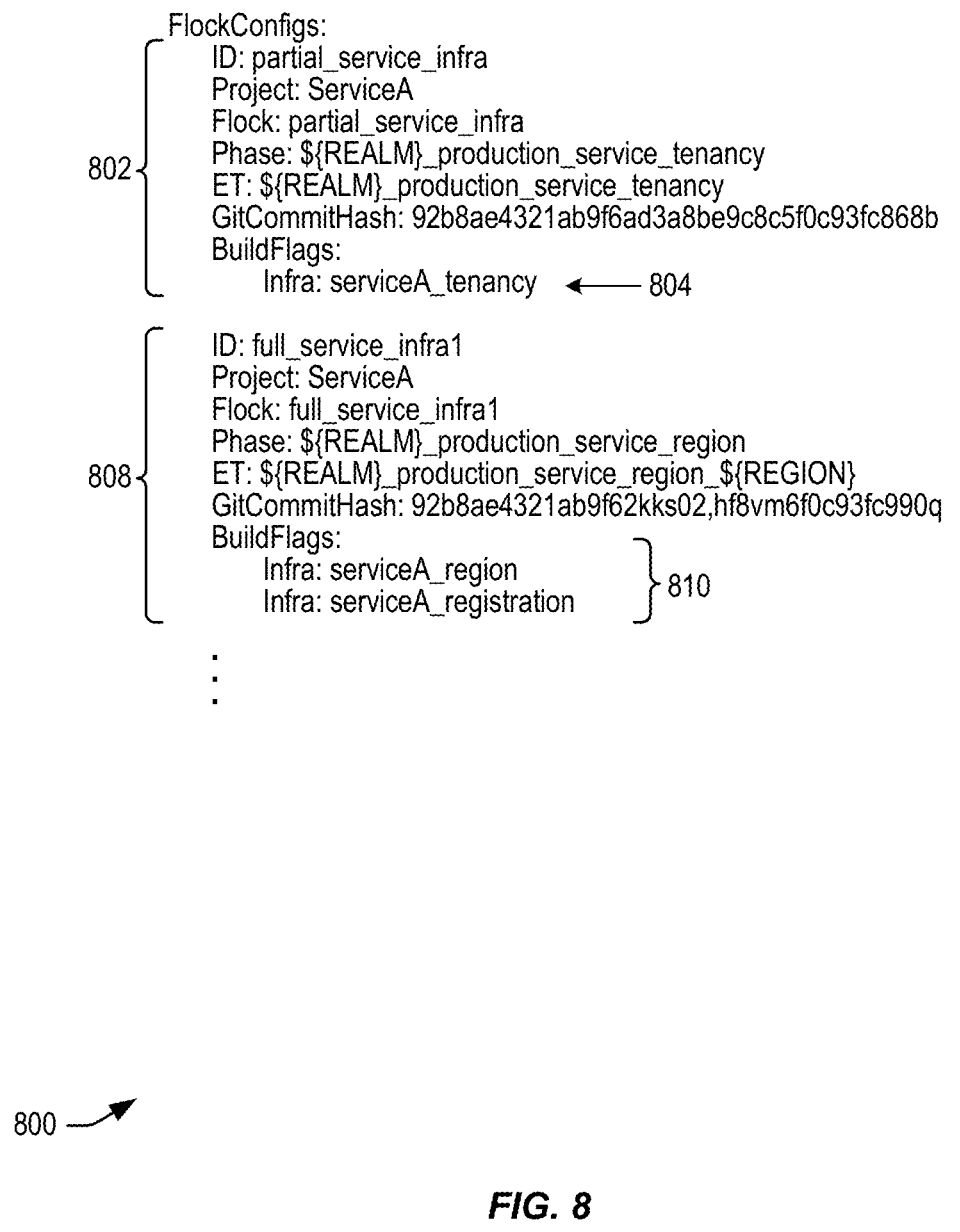

FlockConfigs:

802 {
    ID: partial_service_infra
    Project: ServiceA
    Flock: partial_service_infra
    Phase: ${REALM}_production_service_tenancy
    ET: ${REALM}_production_service_tenancy
    GitCommitHash: 92b8ae4321ab9f6ad3a8be9c8c5f0c93fc868b
    BuildFlags:
        Infra: serviceA_tenancy    ◄──── 804
}

808 {
    ID: full_service_infra1
    Project: ServiceA
    Flock: full_service_infra1
    Phase: ${REALM}_production_service_region
    ET: ${REALM}_production_service_region_${REGION}
    GitCommitHash: 92b8ae4321ab9f62kks02,hf8vm6f0c93fc990q
    BuildFlags:
        Infra: serviceA_region        } 810
        Infra: serviceA_registration
}

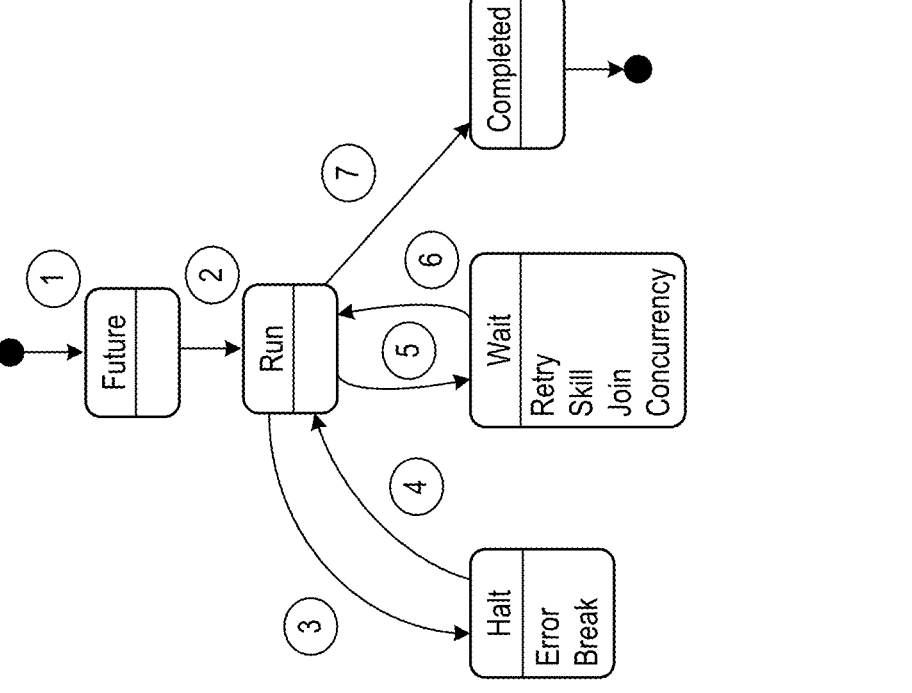
*FIG. 17*
1700

| TYPE | EXT. ACT. | EU ONLY | SUBTYPES | DATA | DESCRIPTION |
|---|---|---|---|---|---|
| EXECUTION_UNIT_START | N | N | | SPAM, EU (Milestone → Milestone) | Indicates beginning of an execution unit of a SPAM |
| EXECUTION_UNIT_END | N | Y | | SPAM, EU (Milestone → Milestone) | Indicates the end of an execution unit |
| RELEASE | Y | Y | | Release (SPAM, Flock ET Alias, ReleaseType, Checkpoint, ChangeType, Artifacts | Execute a release attempt – will fail if the release fails |
| SKILLS_UPDATE | Y | Y | INSTALLING, INSTALLED, UNINSTALLING, SELECTED, RETIRED | SPAM, Execution Unit, Skill State, Skill Version | Emitted to set Skill Version State |
| SKILLS_SELECT | Y | N | | Set of Selected Skills | Updates all Skills for region to SELECT the correct skills and UNSELECT any that are unresolved |
| GUARD | N | Y | | List<SkillGuardSpec>, step | Use guards as preconditions for step – assert/wait as applicable for them to be satisfied before proceeding |
| SERIAL | N | N | | Series of steps | Runs the series of steps |
| FORK | N | N | | List of TrackRefs | Start tracks |
| JOIN | N | N | | List of TrackRefs | Wait for specified tracks to complete before continuing |
| RETRY | N | N | | Retry-policy, step | Run steps, if it fails, reattempt according to retry policy. If there are no more retries, halt. |

| TYPE | DATA | DESCRIPTION |
|---|---|---|
| CONTINUE | TrackRef, TrackState, ExpectedCurrentStepRef | Continue the identified track – valid only when the target track is eligible to continue – it must be halted, running, or waiting. |
| CONTINUE_TO | TrackRef, TrackState, ExpectedCurrentStepRef, NextStepRef | Continue the identified track, setting the next turn to execute to NextStepRef rather than the immediate next step. |
| SET_BREAKPOINT CLEAR_BREAKPOINT | List<StepRef> | Set or Clear breakpoints on steps. This will pause execution before the specified step. Will result in a validation error for the intervention if the step is unreachable from the current execution state |
| TRACK_HALT_ON_ERROR CLEAR_TRACK_HALT_ON_ERROR | List<TrackRef> | Set or clear track halt on error – when set, a track will halt on an error within a RETRY – intended to be used to have the execution halt when a release fails, when normally it would exhaust retries before halting. |
| SET_SKILL_OVERRIDE CLEAR_SKILL_OVERRIDE | OverrideScope, SkillRef, SkillVersion, SkillInstallStatus, SkillHealthStatus | Set or Clear a skill health install/health override. Set skill is scoped to one of: plan, SPAM, or ExecutionUnit. |
| EXECUTION_OVERRIDE | OverrideScope (SpamRef, ExecutionUnitSpec, SpamStepRef) ExecutionOverride (NONE, HALT_BEFORE_BEGIN, SKIP, HALT_ON_ERROR) | Specify an execution override (as part of planning time) to skip, automatic halt before execution, or halt on error (go directly to HALT_ERROR on a failure rather than executing within a RETRY) for a given scope of steps. |
| SKILL_OVERRIDE | OverrideScope (SpamRef, ExecutionUnitSpec, SpamStepRef) SkillRef, SkillVersion, SkillInstallStatus, SkillHealthStatus | Specifying a skill health override as part of planning – will emit suitable SET/CLEAR_SKILL_OVERRIDE steps as part of plan to bring Execution State up to date. |

```
plan {
    track T1 UP0-7 SERIAL {
        UP0-0 EU_START "dns:1.0.0" "absent" → "VIBE_initial";
        UP0-1 SKILLS_UPDATE "dns:1.0.0" "absent" → "VIBE_initial" INSTALLING ("/INTERNAL/InitialVibe:1.0.0");
        UP0-3 RETRY spec
        UP0-2 RELEASE "dns:1.0.0" "absent" → "VIBE_initial"
            project "dns"
            flock "dns_ControlPlane"
            phase "${REGION}_vibe_permissions"
            et "${REGION}_vibe_permissions"
            milestone "vibe_permissions"
            type INFRA
            commit "dns-cp-git-commit-id1";
        UP0-5 RETRY spec
        UP0-4 RELEASE "dns:1.0.0" "absent" → "VIBE_initial"
            project "dns"
            flock "dns_ControlPlane"
            phase "${REGION}_vibe"
            et "${REGION}_host_region"
            milestone "host-setup-for-vibe"
            type INFRA
            commit "dns-cp-git-commit-id1";
        UP0-6 SKILLS_UPDATE "dns:1.0.0" "absent" → "VIBE_initial" INSTALLED ("/INTERNAL/InitialVibe:1.0.0");
        UP0-7 EU_END "dns:1.0.0" "absent" → "VIBE_initial";
    }
    init T1;
    ...
}
```

2202 — track T1 UP0-7 SERIAL {
2204 — UP0-0 EU_START "dns:1.0.0" "absent" → "VIBE_initial";
2206 — UP0-1 SKILLS_UPDATE "dns:1.0.0" "absent" → "VIBE_initial" INSTALLING ("/INTERNAL/InitialVibe:1.0.0");
2210 — UP0-3 RETRY spec
2208 — UP0-2 RELEASE "dns:1.0.0" "absent" → "VIBE_initial"
2209 {
2214 — UP0-5 RETRY spec
2212 — UP0-4 RELEASE "dns:1.0.0" "absent" → "VIBE_initial"
2213 {
2216 — UP0-6 SKILLS_UPDATE "dns:1.0.0" "absent" → "VIBE_initial" INSTALLED ("/INTERNAL/InitialVibe:1.0.0");
2218 — UP0-7 EU_END "dns:1.0.0" "absent" → "VIBE_initial";
2220 — init T1;

```
plan {
    track T1 UP0-7 SERIAL {
        UP0-0 EU_START "dns:1.0.0" "absent" → "VIBE_initial";
        UP0-1 SKILLS_UPDATE "dns:1.0.0" "absent" → "VIBE_initial" INSTALLING ("/INTERNAL/InitialVibe:1.0.0");
2210 ────────→ UP0-3 RETRY spec
                UP0-2 RELEASE "dns:1.0.0" "absent" → "VIBE_initial"
                project "dns"
                flock "dns_ControlPlane"
                phase "${REGION}_vibe_permissions"
                et "${REGION}_vibe_permissions"
                milestone "vibe_permissions"
                type INFRA
                commit "dns-cp-git-commit-id1"; ←──── 2306
            UP1-1 RETRY spec
                UP1-0 RELEASE "dns:1.0.0" "absent" → "VIBE_initial"
                project "dns"
                flock "dns_ControlPlane"
                phase "${REGION}_vibe_permissions"
                et "${REGION}_vibe_permissions"
                milestone "vibe_permissions"
                type INFRA
                commit "dns-cp-git-commit-id2"; ←──── 2304
2302        UP1-3 RETRY spec
                UP1-2 RELEASE "dns:1.0.0" "absent" → "VIBE_initial"
                project "dns"
                flock "dns_ControlPlane"
                phase "${REGION}_vibe"
                et "${REGION}_host_region"
                milestone "host-setup-for-vibe"
                type INFRA
                commit "dns-cp-git-commit-id2";
            UP1-4 SKILLS_UPDATE "dns:1.0.0" "absent" → "VIBE_initial" INSTALLED ("/INTERNAL/InitialVibe:1.0.0");
            UP1-5 EU_END "dns:1.0.0" "absent" → "VIBE_initial";
    }
2308 ──→ track INTERVENE UP1-5 SERIAL { UP1-5 CONTINUE T1 from HALT_ERROR on UP0-3; }
2310 ──→ splice INTERVENE;
    ….
}
```

Figure 38:
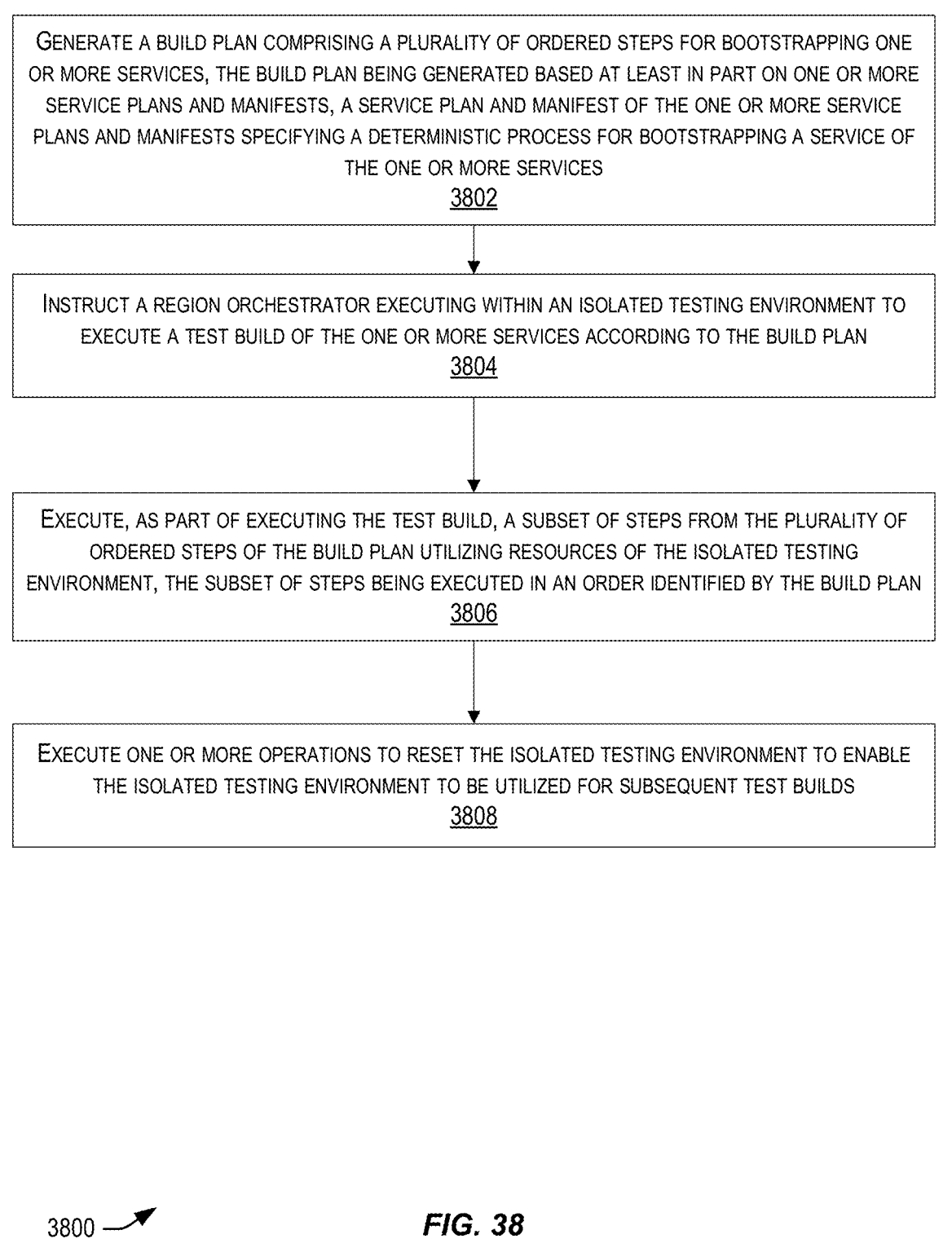

GENERATE A BUILD PLAN COMPRISING A PLURALITY OF ORDERED STEPS FOR BOOTSTRAPPING ONE OR MORE SERVICES, THE BUILD PLAN BEING GENERATED BASED AT LEAST IN PART ON ONE OR MORE SERVICE PLANS AND MANIFESTS, A SERVICE PLAN AND MANIFEST OF THE ONE OR MORE SERVICE PLANS AND MANIFESTS SPECIFYING A DETERMINISTIC PROCESS FOR BOOTSTRAPPING A SERVICE OF THE ONE OR MORE SERVICES
3802

INSTRUCT A REGION ORCHESTRATOR EXECUTING WITHIN AN ISOLATED TESTING ENVIRONMENT TO EXECUTE A TEST BUILD OF THE ONE OR MORE SERVICES ACCORDING TO THE BUILD PLAN
3804

EXECUTE, AS PART OF EXECUTING THE TEST BUILD, A SUBSET OF STEPS FROM THE PLURALITY OF ORDERED STEPS OF THE BUILD PLAN UTILIZING RESOURCES OF THE ISOLATED TESTING ENVIRONMENT, THE SUBSET OF STEPS BEING EXECUTED IN AN ORDER IDENTIFIED BY THE BUILD PLAN
3806

EXECUTE ONE OR MORE OPERATIONS TO RESET THE ISOLATED TESTING ENVIRONMENT TO ENABLE THE ISOLATED TESTING ENVIRONMENT TO BE UTILIZED FOR SUBSEQUENT TEST BUILDS
3808

REGION BUILD TESTING TECHNIQUES

CROSS-REFERENCE TO RELATED APPLICATIONS

This non-provisional application claims priority to U.S. Provisional Patent Application No. 63/503,147, filed on May 18, 2023, entitled "Skills Based Region Build Orchestration," the disclosure of which is herein incorporated by reference in its entirety for all purposes.

BACKGROUND

Today, cloud infrastructure services utilize many individual services to build a data center (e.g., to bootstrap various resources in a data center of a particular geographic region). A region is a logical abstraction corresponding to a localized geographical area in which one or more data centers are (or are to be) located. Building a data center (also referred to performing a "region build") may include provisioning and configuring infrastructure resources and deploying code to those resources (e.g., to implement a variety of services). Any suitable number of data centers may be included in a region and therefore a region build may include operations for building multiple data centers. Bootstrapping operations for one service may depend on the availability of other functionality and/or services of the region. As the number of service teams and regions grows, the tasks performed for orchestrating provisioning and deployment drastically increase. Conventional tools for building a region require significant manual effort or automated techniques present drawbacks with respect to overhead, accuracy, and ease of use. Improvements can be made.

BRIEF SUMMARY

Embodiments of the present disclosure relate to orchestrating a data center build. Previous implementations had no centralized description from which to derive the operations needed to build a service. Instead, service build information was distributed across a myriad of configuration files. Current implementations lack a specification for how a service is built and include implementation details only. This leads to a lack of understanding of service builds and greatly increases the efforts required to unblock issues during a data center build. The present disclosure is directed to a region build orchestrator that is configured to manage and track data center builds across multiple geographic regions.

At least one embodiment is directed to a computer-implemented method (the "method," for brevity). The method may comprise generating, by an orchestrator control plane of a cloud infrastructure orchestration service, a build plan comprising a plurality of ordered steps for bootstrapping one or more services. In some embodiments, the build plan may be generated based at least in part on one or more service plans and manifests. A service plan and manifest of the one or more service plans and manifests may specify a deterministic process for bootstrapping a service of the one or more services. The method may comprise instructing, by the orchestrator control plane, a region orchestrator executing within an isolated testing environment to execute a test build of the one or more services according to the build plan. The method may comprise executing, by the region orchestrator as part of executing the test build, a subset of steps from the plurality of ordered steps of the build plan utilizing resources of the isolated testing environment. In some embodiments, the subset of steps may be executed in an order identified by the build plan. In some embodiments, the method may comprise executing, by the orchestrator control plane, one or more operations to reset the isolated testing environment to enable the isolated testing environment to be utilized for subsequent test builds.

In some embodiments, resetting the isolated testing environment comprises at least one of 1) identifying one or more resources of the isolated testing environment, and 2) deleting the one or more resources.

In some embodiments, the method may comprise 1) pausing, by the region orchestrator, the test build during execution, 2) receiving, by the orchestration control plane, an updated service plan, 3) generating, by the orchestration control plane, a new build plan based at least in part on the updated service plan, and 4) resuming, by the region orchestrator, the test build. In some embodiments, subsequent operations performed during execution of the test build may be performed based at least in part on the new build plan.

In some embodiments, the service plan of the service plan and manifest comprises 1) a plurality of build milestones, 2) a first execution unit defining forward progress from a first build milestone of the plurality of build milestones to a second build milestone of the plurality of build milestones, and 3) a second execution unit defining backward progress from the second build milestone of the plurality of build milestones to the first build milestone of the plurality of build milestones.

In some embodiments, the method may comprise reversing build progress of the service to a previous state based at least in part on executing a workflow corresponding to the second execution unit defining backward progress from the second build milestone of the plurality of build milestones to the first build milestone of the plurality of build milestones. In some embodiments, reversing the build progress of the service comprises specifying that a previously published resource is no longer available. In some embodiments, reversing the build progress of the service causes corresponding build progress of a second service of the one or more services to be reversed to a previous state.

Another embodiment is directed to a cloud-computing service comprising one or more processors and memory storing instructions that, when executed by the one or more processors, cause the cloud-computing service to perform the method(s) disclosed herein.

Still another embodiment is directed to a non-transitory computer-readable medium storing computer-executable instructions that, when executed by one or more processors of a cloud-computing service, cause the cloud-computing service to perform the method(s) disclosed herein.

BRIEF DESCRIPTION OF THE DRAWINGS

To easily identify the discussion of any particular element or act, the most significant digit or digits in a reference number refer to the figure number in which that element is first introduced.

FIG. 5 is a block diagram depicting relationships between portions of a service plan and manifest, in accordance with at least one embodiment.

FIG. 6 is a block diagram depicting a build milestone entity of an example service plan, in accordance with at least one embodiment.

FIG. 7 depicts an example execution unit entity of an example service plan, in accordance with at least one embodiment.

FIG. 8 depicts an example flock config entity of an example service plan, in accordance with at least one embodiment.

FIG. 17 is a block diagram depicting an example lifecycle for a track, in accordance with at least one embodiment.

FIG. 19 is a table depicting an example set of step types, in accordance with at least one embodiment.

FIG. 20 is a table depicting an example set of interventions, in accordance with at least one embodiment.

FIG. 22 is a code segment depicting an example track of a region build plan, in accordance with at least one embodiment.

FIG. 23 is a code segment depicting an example modified track of a region build plan, in accordance with at least one embodiment.

FIG. 38 is a flow diagram depicting an example method for testing a service build, according to at least one embodiment.

DETAILED DESCRIPTION

Figure 1:
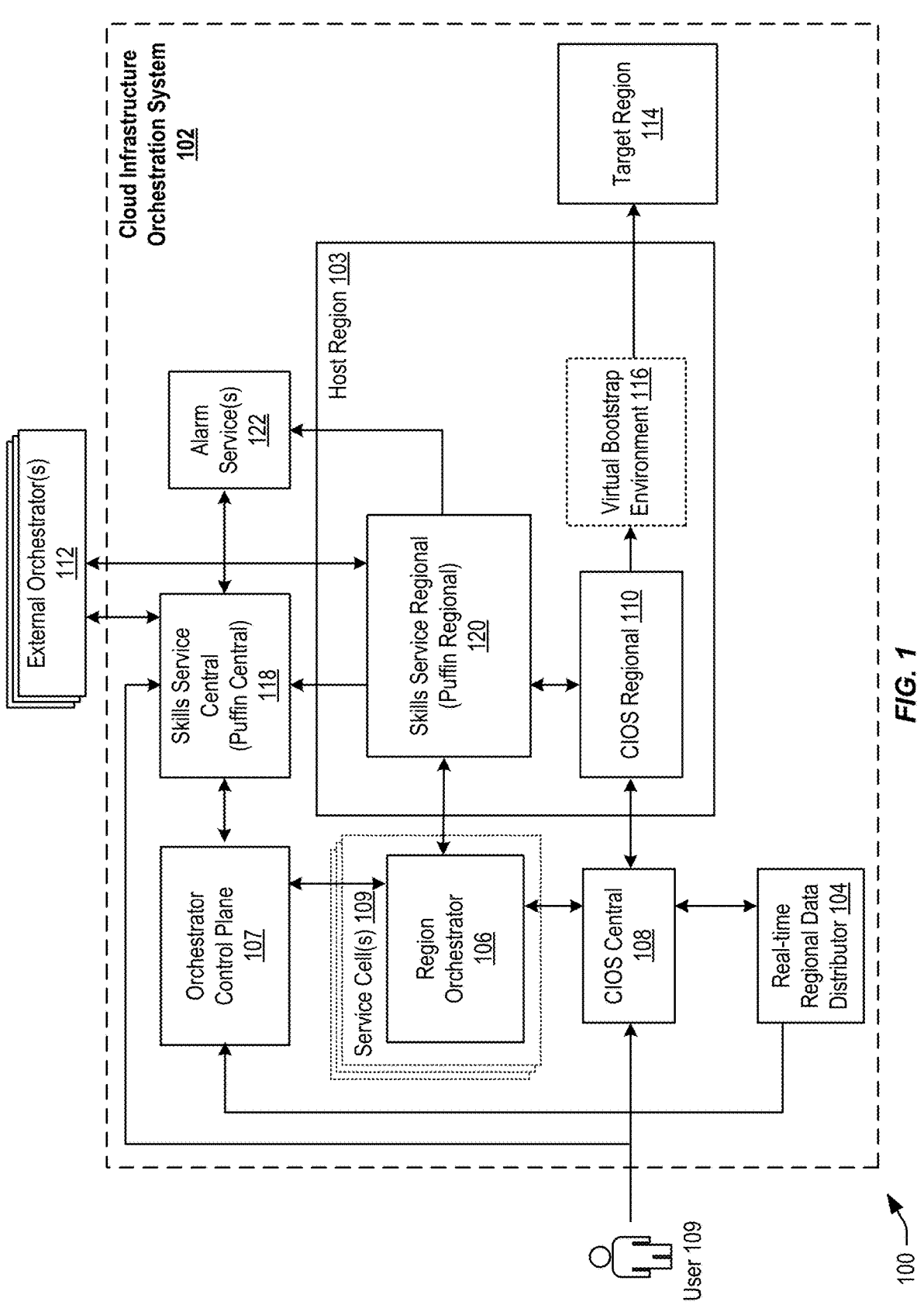
FIG. 1 is a block diagram of an environment in which a Cloud Infrastructure Orchestration System (CIOS may operate to dynamically bootstrap services in a region), in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure and which is used to provide a cloud service to a customer are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers within a region. Building a data center in a region involves provisioning or creating a set of new resources that are needed or used for providing a set of services that the data center is configured to provide. The end result of the region build process is the creation of a data center in a region, where the data center is capable of providing a set of services intended for that data enter and includes a set of resources that are used to provide the set of services.

Building a new data center in a region is a very complex activity requiring coordination between various service teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Each of these tasks further have subtasks that need to be coordinated, further adding to the complexity. Due to this complexity, presently, the building of a data center in a region involves several manually initiated or manually controlled tasks that require careful manual coordination. As a result, the task of building a new region (i.e., building one or more data centers in a region) is very time consuming. It can take time, for example, many months to build a data center. Additionally, the process is very error prone, sometimes requiring several iterations before a desired configuration of the data center is achieved, which further adds to the time taken to build a data center. These limitations and problems severely limit a CSP's ability to grow in a timely manner responsive to increasing customer needs.

Bootstrapping operations have been coordinated and orchestrated by an orchestrator (e.g., a Multi-Flock Orchestrator, an orchestration service, etc.). In previous implementations, the orchestrator attempted to automatically detect dependencies between operations through a static analysis of various configuration files and/or software artifacts. This analysis performed by the system attempted to intelligently and automatically identify the artifacts and manner in which a data center build was performed. As a data center was built, the orchestrator utilized published capabilities (e.g., tags/labels that could be toggled on or off to indicate availability of a resource or functionality) to drive these operations. However, both the automatic detection techniques and the use of capabilities included drawbacks.

Previous implementations of an orchestrator also lacked an exact plan of the work that may be needed (or is needed) to build a data center ahead of the actual build. The orchestrator utilized service build definitions that were spread across multiple flock configuration files ("flock configs") and interpreted by the orchestrator at runtime. This caused the orchestrator to execute an undeterminable number of releases, in an order which could not be known in advance of run time, each release publishing a number of capabilities that also could not be known in advance of run time. To compensate for this indeterministic behavior, manually curated micro-schedules were generated and used to track the work and order of operations necessary to build the data center. These micro-schedules were not machine executable, nor derived from code. Service teams were not prevented from changing their build automation which could cause the existing micro-schedules to be invalidated. Additionally, it was not possible to determine exact behavior of a service build when configuration files for that service rely on external data.

In previous implementations, tasks were triggered by publishing capabilities. Capability availability was not held constant over a release leading to non-determinism in the planned activity if any optional capabilities were published mid-release. The use of optional capabilities made it difficult to determine when a release was expected to publish a certain capability of if a resource was ever going to be created. Service teams could also introduce changes that created unsatisfiable cyclic dependencies between services causing the build to deadlock or to depend upon a capability that would never be published. For at least these reasons, it was impossible to determine when dependent releases would ever be unblocked. Heterogeneity in different regions also meant that there was no single plan for how a service should be bootstrapped. Rather, a different plan existed for each region furthering compounding the difficulty in understanding how the service is built, as capabilities might be depended upon or published in certain types of regions and not others.

Embodiments of the present disclosure may utilize a service plan and manifest (SPAMs) that serves as a deterministic specification for the bootstrapping process of a single service. A service plan and manifest (SPAM) provides a complete service build description that specifies the releases and the deterministic/explicit order of those releases that may be necessary (or are necessary) to build a service.

In some embodiments, the SPAM may include forward and backward transitions, enabling the service build to progress forward or be "unwound" to return to a previous state. The SPAM may include clear expectations for the progress expected by each transition (e.g., each release execution corresponding to a particular flock/phase/execution target). One or more services (e.g., all services to be bootstrapped within the region) may be associated with a respective SPAM. Information provided by these SPAMs may be utilized to eliminate various errors that can occur in a data center build by identifying issues early in the build lifecycle (e.g., upon SPAM submission) rather than during the build execution. SPAMs may be composed together by an orchestrator (e.g., a "region orchestrator") and used to form a directed acyclic graph (DAG) of work (e.g., releases) or region build plan that identifies the expected order of release executions that may be needed (or in some instances, is needed) to build the data center and dependencies between those releases.

Capabilities (published tags used by previous systems) may be replaced with skills as a mechanism with which build progress may be tracked. A "skill" may represent a functional unit that a service exposes and offers to consumers (e.g., other services). This functional unit (also referred to as "service functionality") can include all or a subset of the total functionality associated with a service. In some embodiments, skills may be scoped where access is controlled based on access and/or authorization policies and/or based on an association with a particular namespace. A skill may be provided in multiple versions in which one or more aspects of the skill differs from other versions, where each skill version represents a specific implementation of the skill. Each skill version may be identifiable using a unique skill identifier. Skills may enable enhanced and more accurate progress tracking of a region build over the tracking previously provided with capabilities, as well as improved root cause analysis functionality when errors or unexpected events occur in the build.

Service plans used by the region orchestrator to drive orchestration tasks may specify any suitable number of preconditions (e.g., required skill dependencies) and postconditions (e.g., skill publications) that are expected to be met upon reaching different points (referred to as "execution target (ET) checkpoints"). The order of release execution may be identified in the service plan. In some embodiments, the releases may be expressed using ET checkpoint transitions. Each ET checkpoint transition (e.g., a transition from one ET checkpoint to another ET checkpoint) may be mapped to a corresponding infrastructure release or application release of the build. ET checkpoints may be associated with corresponding build flags that may be used to identify progress of the build. Executing a release may transition the ET from one ET checkpoint to another. Upon successful transition, one or more build flags that are associated with the release being executed at the ET may be set to indicate that the release was successfully executed (e.g., the corresponding infrastructure or application change corresponding to the release was successfully performed). The current ET checkpoint and build flags may be associated with a resource (e.g., an execution target resource) that is managed by the system. ET checkpoints and their use are discussed in more detail in U.S. Non-provisional application Ser. No. 18/661,396, filed May 10, 2024, entitled "Building a Data Center using Execution Target Checkpoints," the disclosure of which is incorporated by reference in its entirety for all purposes.

Using the SPAM enables an improved and deterministic plan to be generated for a region build. Tracking the ET checkpoints defined within the SPAM enables the region orchestrator to identify, at any suitable time, the progress already achieved and/or the amount and order of remaining work to be performed in an ongoing service and/or region/data center build.

A single region orchestrator may be executed for each region under build (e.g., each data center being built). In some embodiments, each instance of the region orchestrator may execute within a service cell. A "service cell" refers to an isolated hosting environment that is hosted on infrastructure that is dedicated to the service cell. A service cell may be isolated in that it does not share hosts or virtual machines with other service cells. In previous orchestrator implementations, data plane resources (e.g., instances in a computing cluster, etc.) were managed by a regional control plane. Any suitable orchestration tasks (e.g., provisioning, removing, modifying a node of the cluster, etc.) across for any given region were performed by the same regional control plane. The present disclosure relates to utilizing a service cell that is specific to the region, the data center, or the build. This enables multiple builds to be performed concurrently with separate instances of the region orchestrator managing each build.

The disclosed methods provide for improved orchestration techniques over conventional techniques. Tracking of region builds is improved with skills. The build process is improved by enforcing a deterministic approach, reducing, if not eliminating the risk of indeterministic behavior. This enables the system to more accurately assess a time remaining and/or a number of remaining tasks (e.g., releases) left in a given region build. Services may progress forward or backward with respect to their build process to build toward completion or to revert to a previous state (e.g., due to encountering an error, to enable testing of a given transition, etc.). By utilizing service cells for region builds, a blast radius of a catastrophic failure may be limited to the service cell as a fault boundary onto itself. This decreases, or substantially eliminates, a risk that a failure in one data center affects any other service cell. This also enables multiple region builds to be executed in parallel, or at least during overlapping times. Additionally, unlike previous implementations, the components that are configured to build a region may be controlled through an orchestrator that is external to the system, enabling a wider variety of orchestrators to be utilized to drive orchestration tasks.

The region orchestrator discussed herein may be designed to execute the Region Build Plan into a real region under build, while also understanding how to alternatively target execution into isolated tenancies for Service Build testing as well. The region orchestrator and orchestrator control plane may be configured to enable specifying breakpoints during plan execution and plan change interventions, which can be leveraged during either Region Build or a Service Build testing. The Orchestrator Control Plane may be used to initiate a Region Orchestrator controlled Service Build Test by executing a Service Build Testing Execution (SBTE), which may leverage an existing Herds resource from a Herd Service for the existing assertions and tracking of Test Tenancies with their usage for overlay test runs. The incorporation of the Herds resource additionally allows the Region Orchestrator to act as a 'meta-orchestrator' by allowing an SBTE to optionally include a Stampede run (orchestrated by a Herds Service) allowing validation of the coordinated build of flocks via SPAMs and orchestrated by the Region Orchestrator, in conjunction with other flocks that are orchestrated by previously implemented orchestrators (e.g., a Multi-Flock Orchestrator (MFO)) or Herds. The testing techniques disclosed herein enable the testing of capability-based and skill-based orchestration tasks.

Certain Definitions

A "region" is a logical abstraction corresponding to a geographical location. A region can include any suitable number of one or more execution targets.

A "phase" refers to a group of execution targets that can be executed at the same time.

An "execution target" refers to a unit (e.g., a set of devices, a tenancy, etc.) against which a release may be executed. In some embodiments, an execution target may be the smallest granular unit against which CIOS can execute a release. An execution target may be specific to a region and a tenancy. Execution targets may be aggregated into one or more phases. For some services, an execution target represents an "instance" of a service. A single service can be bootstrapped to each of one or more execution targets. An execution target may be associated with a set of devices (e.g., a data center).

A "release" refers to a representation of an intent to orchestrate a specific change to a service (e.g., deploy version 8, "add an internal DNS record," etc.). In some embodiments, a release corresponds to a change type that indicates the release is an infrastructure change (e.g., provisioning) or an application change (e.g., a deployment). A release may target one or more phases or execution targets.

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component (e.g., a physical or virtual host) or a Kubernetes engine cluster, this may include, but is not limited to, software (e.g., an application), configuration information (e.g., a configuration file) for an infrastructure component, or the like.

A "flock configuration file" or "flock config," for brevity refers to a configuration file that describes a set of resources (e.g., infrastructure components and artifacts, also referred to as a "flock") associated with a single service. A flock config may correspond to a single release (e.g., provisioning and/or deployment tasks that are to be performed as a unit). A flock config may correspond to an infrastructure release or an application release. A service may be built using any suitable number of releases and corresponding flock configs. A flock config may include declarative statements that specify one or more aspects corresponding to a desired state of the resources of the service for that release.

A "flock" refers to a set of CIOS managed resources or a set of execution targets that can be deployed as a unit. A flock may exist within an organizational unit referred to as a "project."

A "herd" refers to a collection of flocks, test tenancies, and metadata that may be used to test an overlay service build. A tenancy may only be associated with a single herd.

A "stampede" refers to an instance of a Service Build Test of provided flocks into test tenancies associated to a herd and targeting a particular region. A herd may only have a single stampede active at a time.

A "Reset Service" refers to a service that is configured to clean up the contents of tenancies which are used by a stampede.

A "Service Build Test Execution" (SBTE) refers to an instance of a service build test that is orchestrated by Region Orchestrator within a context of a herd to a particular region and optionally coordinated with a stampede.

A "service cell" may refer to an isolated hosting environment that is hosted on infrastructure that is dedicated to the service cell. A service cell may be isolated in that it does not share hosts or virtual machines with other service cells. A service cell may be a kind of logical data center (e.g., a logical grouping of performance isolation and fault isolation) within a single availability domain, region, or data center.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning," for brevity) refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned infrastructure device" or a "provisioned device," for brevity. Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment," for brevity) refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPsec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and tested in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A "host region" refers to a region that hosts a virtual bootstrap environment (ViBE). A host region may be used to bootstrap a ViBE.

A "target region" refers to a region under build.

A "capability" identifies is a legacy resource previously used during region build that signaled that another resource, service, or feature was available, or that an event had occurred. By way of example, a capability could be published indicating that a resource is available for authorization/authentication processing (e.g., a subset of the functionality to be provided by a service). As another example, a capability could be published indicating the full functionality of the service is available. Capabilities were used to identify functionality on which a resource or service depended and/or functionality of a resource or service that was available for use. A capability was associated with an alphanumeric identifier and was used to indicate the capability is available or unavailable. Capabilities and their use in orchestration is discussed in more detail in U.S. Nonprovisional application Ser. No. 18/661,401, filed May 10, 2024, entitled "Managing Data Center Orchestration using Service Plans and Manifests," the disclosure of which is incorporated by reference in its entirety for all purposes.

"Publishing a capability" refers to "publishing" as used in a "publisher-subscriber" computing design or otherwise providing an indication that a particular capability is available (or unavailable). In capabilities based orchestration implementations, capabilities were "published" (e.g., collected by a Capabilities Service, provided to a Capabilities Service, pushed, pulled, etc.) to provide an indication that functionality of a resource/service was available or that an event had occurred. In some embodiments, capabilities may have been published/transmitted via an event, a notification, a data transmission, a function call, an API call, or the like. An event (or other notification/data transmission/etc.) indicating availability of a particular capability could be broadcasted/addressed (e.g., published) to a Capabilities Service.

A "Capabilities Service" refers to a previously implemented service configured to monitor and maintain capabilities data that indicates which capabilities are current available in a region. A Capabilities Service was previously provided within a Cloud Infrastructure Orchestration System and was used to identify what capabilities, services, features were made available in a region, or which events had occurred within the region. The described Capabilities Service served a central repository/authority of all capabilities that have been published in the region (e.g., during a region build).

An "Region Orchestrator" is intended to refer to a service or system that initiates tasks involved in bootstrapping one or more services during a region build. A region orchestrator may be specific to a particular region or data center and may be configured to manage all bootstrapping operations within that region/data center. A region orchestrator may be a computing component (e.g., a cloud-computing service) configured to coordinate events between components of the CIOS to provision and deploy services to a target region (e.g., a new region). A region orchestrator may track relevant events (e.g., indicated through skills as described herein) for each service of the region build and takes actions in response to those events (e.g., based on determining upstream dependencies have been met for a given release/skill, etc.).

A "Real-time Regional Data Distributor" (RRDD) may be a service or system configured to manage region data. This region data can be injected into flock configs to dynamically create execution targets for new regions.

A "Telemetry Service" may be a service or system that is configured to manage/monitor time series data associated with one or more services/resources and trigger (e.g., publish, store, etc.) various alarms and/or corresponding alarm states based at least in part on analyzing the time series data.

A "Skills Service" (also referred to as "Puffin") may be a service or system that is configured to store planned and/or actual dependency relationships between services, resources, or units of functionality (also referred to as "service functionality"). Puffin may be configured as a central registry with which service teams may register their services/microservices. It should be appreciated that the unit of functionality may relate to functionality provided by a computing component other than a service.

A "skill" may represent a functional unit that a service exposes and offers to consumers (e.g., other services). This functional unit (also referred to as "service functionality" or "functionalities") can include all or a subset of the total functionality associated with a service. In some embodiments, skills may be scoped where access is controlled based on access and/or authorization policies and/or based on an association with a particular namespace. A skill may be provided in multiple versions in which one or more aspects of the skill differs from other versions, where each skill version represents a specific implementation of the skill. Each skill version may be identifiable using a unique skill identifier. Skills are intended to replace the capabilities of previous implementations (e.g., labels/tags that could be toggled on and off) and to enable enhanced and more accurate progress tracking of a region build as well as improved root cause analysis functionality when errors or unexpected events occur in the build. A skill may be monitored for health and may be configured to maintain health data. A "skill" may collectively refer to any suitable number of data structures in which data defining the skill may be maintained. Skills may be associated with an identifier (e.g., a phonebookID) that identifies one or more entities or contacts. Services may specify a skill's run-time dependencies using one or more user interfaces provided by Puffin, while build-time skill dependencies may be declared within a SPAM and reflected in one or more user interfaces hosted by Puffin.

A "fleet" refers to a logical environment (e.g., preproduction, production, etc.) to which a skill can be scoped. By way of example, a skill associated with a production fleet may be separate from a skill of the same name utilized with a preproduction fleet. A "project" may be similarly utilized to scope skills. In some embodiments, a skill may be scoped/applied to a particular environment based at least in part on any suitable combination of attributes such as skillID, skillversionID, compartmentID, namespaceID, producerServiceID, skillName, fleet, project, or the like, that collectively identify a particular application of a skill.

A "service plan specification" or "service plan," for brevity, refers to any suitable document or data that specifies a build implementation of a given service. A service plan may include any suitable combination of build milestones, execution units, and flock configurations. In some embodiments, service plans describe preconditions (e.g., via skill dependencies) and post-conditions (e.g., skills published/installed) for each step along of path of installing a service. A service plan may detail specific releases that may be needed (or that are needed) to build a service and the order by which the releases are to be performed to build the service. A service plan may separate inter-service coordination and intra-service coordination and/or may specify the expected state of a service at any suitable point of a region build.

A "service manifest" or "manifest," for brevity, identifies the versions for flock configs and artifacts that are to be used to build a service. A service manifest may include a collection of service manifest items, each service manifest item identifying a particular flock config or artifact that may be needed (or is needed) to build a service. In some embodiments, a service manifest item may be associated with a git commit hash of the flock and all version declarations for any artifact that is required in application releases for that service's build.

A "SPAM" refers to a combination of a service plan and a manifest that collectively provide a deterministic specification of the process for building a service and, in some cases, uninstalling the service to revert to an earlier working state. In some embodiments, a SPAM details a combination and order of releases that may be needed (or is needed) to build the service. A manifest of the SPAM may define all resources to be used for the releases, while the service plan specifies an order of release execution based on capability dependencies. A SPAM may be used to track compliance of a region build. A SPAM details the releases that may be necessary (or are necessary) to build a service where each release may be associated with pre-conditions and post-conditions. The preconditions may refer to skills that may (or in some instances, must) be present such that a release can be created that will result in the postconditions being satisfied. The post-conditions may be skills that should (or in some cases, must) be published as a consequence of the release succeeding. SPAMs may be created by service teams and are derived from YAML files they author. The SPAM may be delineated into discrete sections, including execution units which define transitions between well-defined points in the service's build, known as "build milestones." A service may transition from one build milestone to the next by performing the releases defined by an execution unit. Execution units may specify the external dependencies (capabilities) that may be (or are) required to perform the releases defined within the unit. Build milestones may specify the capabilities published by the service that should (or in some cases, must) be made available once the service has reached that milestone. In some embodiments, the capabilities specified by a build milestone include capabilities that are intended for consumption by other services.

A "SPAM set" refers to a collection on SPAMs that are mutually compatible and/or that are previously associated with one another. A SPAM set may be used to derive a version set with which a directed acyclic graph may be generated and used to drive operations for building a data center. In some embodiments, a SPAM set may be associated with a scope and/or a regional context.

A "build strategy" may include cross-SPAM rules that may be enforced by a Region Orchestrator to ensure specific orderings of particular build steps. Build strategies, which may be defined globally, may be used to describe and validate complex laddering that occurs to bring up mutually dependent services at runtime as well as broader rules around the ordering of services during region build. Build strategies may act as guardrails on dependencies between tightly coupled skills/services and enable the system to catch violations of contracts earlier than region build. In some embodiments, build strategies may be developed and updated by architects from affected service teams. A build strategy may include a set of rules with each rule having pre-conditions, post-conditions, and a name or other suitable identifier. Pre and/or post conditions of a rule may be declared as being implemented by a SPAM (e.g., an execution unit of a SPAM) or by another build strategy. A build strategy may be versioned (e.g., using major/minor/patch designations). A minor version changes may add new rules, patch version changes may include updates to non-functional portions of the build strategy.

A "build milestone" (also referred to as a "stage") refers to an entity defined in a service plan that identifies a synchronization point between the service build (e.g., the process for building a particular service) and the rest of the data center build. Build milestones refer to stages involved in the deployment of a service in a region under build (e.g., a data center being built within a region). Build milestones may be defined coarsely to limit their number and provide a high-level overview of the process for building a service. As a non-limiting example, a set of build milestones for a service may include "absent" (e.g., a default starting milestone), "service functionality X available," "service available," and "service build complete."

An "execution unit" refers to another entity of a service plan. One or more execution units may describe the process for transitioning from one build milestone to the next via a directed acyclic graph of CIOS releases (e.g., infrastructure and/or application releases). Execution units may represent a series of infrastructure and application installations/changes (e.g., bring up a load-balancer) to transition from one build milestone to the nest, or to un-install infrastructure or applications (e.g., tear down the load-balancer). An execution unit may define releases across one or more execution targets. In some embodiments, build dependencies (expressed as skills that depend on another skill) may be met (and in some cases, must be met) before an execution unit can be invoked. Execution unit definitions may be used to describe the workflow to transition a service from one build milestone to another along with the required preconditions (e.g., installed and available skills) and postconditions (e.g., skills that will be installed and made available through execution the releases of the execution unit). In some embodiments, an execution unit can declare that it implements one or more build strategy rules.

An "external execution unit" refers precondition and postcondition skills, where the operations are managed by an external orchestrator (e.g., an orchestrator that is difference from the Orchestrator Control Plane and Region Orchestrator of the CIOS system discussed herein). External execution units are incorporated into a region build plan when built to provide visibility for dependencies and blocking systems, as well as for the completeness of the skill dependency graph (e.g., skill graphs generated and presented by Puffin).

"Execution context" refers to one or more inputs of a region build planner that may be used to override execution of specific steps within one or more SPAMs of a SPAM set. The execution context (e.g., input data to the region build planner) may define specific milestones to reach for one or more SPAMs and may specify plan concurrency (e.g., SPAMs which may be concurrently executed).

A "region build plan" refers to a materialized plan executed by a Region Orchestrator. A region build plan may be represented by a graph of tracks and steps that define exact execution and execution order that is to be followed to build a data center within a region.

A "track" refers to a single thread of execution within a region build plan. One step may be executing within a track.

A "track step," or "step," for brevity, refers to a node within a region build plan. A step may be one element of build plan execution and may include, but is not limited to asserts regarding state (e.g., an assertion regarding the installation of or health of a skill), execution of an infrastructure or application release, flow control for handling concurrency between steps and/or tracks, etc. A step may be an atomic unit of execution of a region build plan.

An "execution target checkpoint" or "ET checkpoint," for brevity, refers to a defined point in the data center build of a given execution target (e.g., a set of devices, a tenancy, etc.). An ET checkpoint may be associated with certain preconditions (e.g., required capability dependencies) and postconditions (capability publications) that are expected to have been met upon reaching that ET checkpoint. In some embodiments, steps identified within an execution unit may reference ET checkpoint transitions that may map logically to expected CIOS releases (e.g., infrastructure releases or application releases).

A "region archetype" or "region type" may represent an overall structure of a region (e.g., an ONSR region, a single-availability-domain-region, a first region in a realm) that could be used to impact a service's installation. In some embodiments, a service plan may reference dimensions of a region archetype to conditionally change the service plan definition.

"Static analysis" refers to an execution of a static analysis of code (e.g., that identifies data center infrastructure components as objects using a declarative configuration language) to infer publications and/or dependencies (e.g., skill and/or publications and/or dependencies). In some embodiments, a static flock analysis may be performed utilizing an infrastructure-as-code software tool (e.g., Terraform®). In some embodiments, this software tool may generate one or more data structures (e.g., directed acyclic graphs) that represent these dependencies/publications. Each node in the graph may correspond to a flock config and/or a release, with edges identifying capability publications and/or dependencies between releases.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional) that may be configured to manage bootstrapping tasks (provisioning and deployment) for a given service and an Orchestrator (e.g., a multi-flock orchestrator) configured to initiate/manage region builds (e.g., bootstrapping operations corresponding to multiple services in a region/data center).

CIOS enables region/data center building and world-wide infrastructure provisioning and code deployment with minimal manual run-time effort from service teams (e.g., beyond an initial approval and/or physical transportation of hardware, in some instances). The high-level responsibilities of CIOS include, but are not limited to, coordinating region builds in an automated fashion with minimal human intervention, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

CIOS can perform plan generation, where differences between the desired and current state of the resources are identified. Part of plan generation can include identifying the operations that would need to be executed to bring the resources from the current state to the desired state. Once the user is satisfied with a plan, the plan can then be marked as approved or rejected. Thus, users can spend less time reasoning about the plan and the plans are more accurate because they are machine generated. Plans are almost too detailed for human consumption; however, CIOS can provide this data via a sophisticated user interface (UI).

In some examples, CIOS can handle execution of change management by automatically executing the approved plan. Once an execution plan has been created and approved, engineers may no longer need to participate in change management unless CIOS initiates roll-back. CIOS can handle rolling back to a previous service version by automatically generating a plan that returns the service to a previous (e.g., pre-release) state (e.g., when CIOS detects service health degradation while executing).

CIOS can measure service health by monitoring alarms and executing integration tests. CIOS can help teams quickly define roll-back behavior in the event of service degradation, which it can later execute automatically. CIOS can automatically generate and display plans and can track approval. CIOS can combine the functionality of provisioning and deployment in a single system that coordinates these tasks across a region build. CIOS can discover dependencies between execution tasks at every level (e.g., resource level, execution target level, phase level, service level, etc.) through a static analysis (e.g., including parsing and processing content) of one or more configuration files. Using these dependencies, CIOS can generate various data structures from these dependencies that can be used to drive task execution (e.g., tasks regarding provisioning of infrastructure resources and deployment of artifacts across the region).

Today, during Large Scale Events (LSEs) (e.g., events in which a substantial error, blockage, or delay is experienced in a region build), incident management and region build operators frequently incur wide-spread overhead and sometimes delays, e.g., in collecting status, attribution of the issue, assessment of impacts, and the recovery of services, due to the heavily human-based and non-systemic approach of conventional approaches. Due to the complexity of the various dependencies between services, it can be extremely difficult and time intensive for operators to identify the contributing cause of the event. This causes delays in remediation as well as the ability to assess when an event has concluded. Similarly, building a region includes challenges in which human involvement may be utilized to troubleshoot and/or detect of failures or blocking situations. Conventionally, it is difficult for service teams to determine what dependencies exist for their service. Both the dependencies the service may have on other services, and vice versa. Additionally, service teams have incomplete indicators ahead of an actual region build as to whether their region build design will have critical issues (such as cyclic dependencies) that prevent or delay the build of their service.

FIG. 1 is a block diagram of an environment 100 in which a Cloud Infrastructure Orchestration System (CIOS) 102 in which a Cloud Infrastructure Orchestration System (CIOS may operate to dynamically bootstrap services in a region/data center, according to at least one embodiment. CIOS 102 can include, but is not limited to, the following components: Real-time Regional Data Distributor (RRDD) 104, Region Orchestrator 106 (operating in a corresponding service cell of service cell(s) 109), Orchestrator Control Plane 107, CIOS Central 108, CIOS Regional 110, Virtual Bootstrap Environment 116, Puffin Central 118, Puffin Regional 120, and Alarm Service(s) 122. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail below with respect to FIGS. 2 and 3.

Real-time Regional Data Distributor (RRDD) 104 may be configured to maintain and provide region data that identifies realms (which may include one or more regions), regions (which may include one or more availability domains), execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 may be configured to provide any suitable number of user interfaces with which users (e.g., user 109) may interact with CIOS 102 or view data associated with one or more region builds. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data.

CIOS Central 108 can be configured to invoke the functionality of RRDD 104 via any suitable number of interfaces. Generally, CIOS Central 108 (also referred to as a "provisioning and deployment manager") may be configured to manage region data, either directly or indirectly (e.g., via RRDD 104). CIOS Central 108 may be configured to compile SPAMs to inject region data as variables within the SPAMs. CIOS Central 108 may be instructed (e.g., by region orchestrator 106) to perform one or more releases (e.g., infrastructure or application releases) according to a given SPAM.

Orchestrator Control Plane 107 may be configured to provide any suitable number of user interfaces with which users (e.g., user 109) may interact with CIOS 102 or view data associated with one or more region builds. By way of example, Orchestrator Control Plane 107 may manage the user interfaces discussed below in connection with FIGS. 14-19. Orchestrator Control Plane 107 may include a build planning module that may be configured to generate a region build plan. Additional details of region build plans and their generation are provided in more detail with the following figures. In some embodiments, Orchestrator Control Plane 107 may be configured to provide and/or instruct any suitable number of region orchestrators (e.g., Region Orchestrator 108) operating in any suitable service cell (e.g., service cell(s) 109).

In some embodiments, an external orchestrator may be used in lieu of Region Orchestrator 108. In these instances, an external orchestrator (e.g., one of external orchestrator(s) 112) may communicate with the Region Orchestrator 106 via Puffin (e.g., Puffin Central 118 and/or Puffin Regional 120) by consuming the signals they wait for and signaling completion of their work via installation of Skills. When the region build plan reaches an external execution unit, the Region Orchestrator 106 may wait for an external orchestrator to signal completion via publishing the relevant skills.

Each instance of CIOS Regional 110 may correspond to a module configured to execute bootstrapping tasks that are associated with a service of a region (e.g., a data center such as host region 103). CIOS Regional 110 can receive desired state data from CIOS Central 108. In some embodiments, desired state data may correspond to an infrastructure or software release. In some embodiments, the desired state data may be expressed as part of a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes that may be (or are) needed to one or more resources. For example, CIOS Regional 110 can determine that one or more infrastructure components need to be provisioned, one or more artifacts deployed, or any suitable change that may be (or is) needed to the resources of the service to bring the state of those resources in line with the desired state. As CIOS Regional 110 performs bootstrapping operations, it may publish data indicating a transition of a skill from one state to another. A skill state may identify a unit of functionality associated with a service is, or is not, available. The unit could be a portion, or all of the functionality to be provided by the service. By way of example, data may be transmitted from CIOS Regional 110 to Puffin Regional 120 indicating that the state of a skill corresponding to a resource has transitioned to "installed," indicating the resource is available for authorization/authentication processing (e.g., a subset of the functionality to be provided by the resource). Skills can be used to identify functionality on which a resource or service depends and/or functionality of a resource or service that is available for use. By way of example, in some embodiments, CIOS Regional 110 performs bootstrapping operations which result in publishing a skill (e.g., transmitting skill metadata including a skill state value). The skill metadata may be transmitted to Puffin (e.g., Puffin Regional 120) and used to update the skill state of the corresponding skill.

In some embodiments, Puffin Central 118 may provide a number of user interfaces with which one or more skills can be defined. A skill may be used in lieu of capabilities and enables improvements over previous capabilities-based implementations. Unlike capabilities, skills may be scoped (e.g., controllable through access and authorization policies), versioned, and attributed to a particular service and/or contact. Skills may be associated with a lifecycle and may be monitored for health and are designed to be more highly visible/accessible than capabilities. Puffin Central 118 may provide an authoritative registry for skills. Various user interfaces managed by Puffin Central 118 may be utilized to define, maintain, and manage skills that each service offers, as well as their dependency relationships with other services. Puffin Central 118 may be utilized to declare and persist strongly defined metadata of services in a versioned manner. This metadata may be used to generate a blueprint for build-time and run-time dependencies. These blueprints can be used to validate build plans, to drive orchestration decisions during region build, and to improve time-to-engage and time-to-diagnose measures during region build and/or Large-Scale Events (LSEs).

Puffin Central 118 may be configured to serve as a source of truth for services and may maintain metadata including each service's upstream and downstream dependencies and service team contact information and methods for each service across regions and realms (e.g., a set of regions). Each skill may represent a function unit that a service exposes and offers to consumers (e.g., other services). In some embodiments, skills may be scoped where access is controlled based on access and/or authorization policies and/or based on an association with a particular namespace. A skill may be associated with multiple versions in which one or more aspects of the skill differs from previous versions, where each skill version represents a specific implementation of the skill. Each skill version may be identifiable using a unique skill identifier.

In some embodiments, any suitable computing component of the Puffin Service (e.g., Puffin Central 118 and/or Puffin Regional 120) may be configured to monitor the health and/or lifecycle of a skill according to a predefined skill lifecycle. Health monitoring may be performed using one or more alarms that are associated with a given skill. In some embodiments, a telemetry service (e.g., an example of alarm service(s) 122) may utilize an application programming interface provided by the Puffin Service (including Puffin Central 118 and/or Puffin Regional 120) when an alarm is triggered. As another example, the Puffin Service (e.g., Puffin Regional 120) may request alarm data from the alarm service(s) 122 and/or from storage locations at which the alarm service(s) 122 store the alarm data. The Puffin Service may present, via one or more user interfaces, information related to the health of a skill based on the alarms corresponding to the alarm data obtained and their corresponding association to a given skill.

In some embodiments, the Puffin Service (e.g., Puffin Central 118 and/or Puffin Regional 120) may expose one or more application programming interfaces (APIs) with which validation operations may be performed. By way of example, a SPAM describing the build process with respect to one or more services may be provided via a given API (e.g., by the Region Orchestrator 106). The Puffin Service (e.g., Puffin Central 118) may execute any suitable operations for validating that all services and skills identified in the SPAM have been previously registered with the Puffin Service and that the build process defined in the SPAM does not violate previously defined dependency relationships maintained by the Puffin Service. Additionally, or alternatively, Region Orchestrator 106 may perform any suitable validation check such as determining whether each flock config and/or artifact identified in a given service's manifest is referenced within the service's corresponding service plan and/or that no flock config and/or artifact is referenced within the service plan that is not referenced within the manifest. Region Orchestrator 106 may perform validation operations (e.g., a static analysis including parsing the service plan) to determine that a service plan lacks circular dependencies. If a circular dependency is found within a service plan, Region Orchestrator 106 may provide a notification and/or restrict the service plan and corresponding manifest from being utilized. In some embodiments, such restrictions may include restricting the service plan and manifest from being added to a SPAM set (e.g., a set of SPAMs to be used to perform a region build). In some embodiments, the Region Orchestrator 106 may perform any suitable validation operations to ensure that SPAMs of a SPAM set and/or a SPAM that is being considered as an addition to a preexisting SPAM set are mutually compatible. This may include analyzing the SPAM set (alone or with a SPAM that is being considered for addition) to ensure that the SPAMs of the SPAM set do not include circular dependencies.

In some embodiments, each regional component such as Region Orchestrator 106, CIOS Regional 110, Puffin Regional 120, and/or Virtual Bootstrap Environment 116 may be one of many regional components. Each regional component may be specific to a given region (e.g., as depicted in FIG. 1, Host Region 103). Therefore, another region may include similar, but separate, components that are specific to that region. In some embodiments, central components (e.g., Region Orchestrator 106, CIOS Central 108, RRDD 104, and Puffin Central 118) may include one or more components that are configured to manage build operations corresponding to one or more regions. By way of example only, a single orchestrator (Region Orchestrator 106) may be utilized to manage bootstrapping operations for building any suitable number of data centers, or multiple instances of Region Orchestrator 106 may be utilized, each driving the bootstrapping operations for a subset of those data centers or a single data center. In some embodiments, each Region Orchestrator 106 may operate within one of service cell(s) 109 and isolated from other instances of the Region Orchestrator 106.

In some embodiments, Region Orchestrator 106 (e.g., an orchestration service) may be configured to drive region build efforts. In some embodiments, Region Orchestrator 106 may manage information that describes which flock config versions and/or artifact versions are to be utilized to bootstrap a given service within a region (or to make a unit of change to a target region). In some embodiments, Region Orchestrator 106 may manage any suitable combination of flock configs and/or service plans. In some embodiments, Region Orchestrator 106 may be configured to monitor (or be otherwise notified of) changes to the region data managed by Real-time Regional Data Distributor 104. In some embodiments, receiving an indication that region data has been changed may cause a region build to be triggered by Region Orchestrator 106. In some embodiments, Region Orchestrator 106 may identify SPAMs to be used for a region build. Some, or all, of the SPAMs may be configured to be region agnostic. That is, the SPAMs may not explicitly identify what region(s) to which the flock is to be bootstrapped. In some embodiments, Region Orchestrator 106 may trigger a data injection process through which the collected flock configs and/or SPAMs are recompiled (e.g., by CIOS Central 108). During recompilation, operations may be executed (e.g., by CIOS Central 108) to cause the region data maintained by Real-time Regional Data Distributor 104 to be injected into the config files and/or SPAMs. SPAMs can reference region data through variables/parameters without requiring hardcoded identification of region data. Any suitable portion of the SPAMs can be dynamically modified at run time using this data injection rather than having the region data be hardcoded, and therefore, more difficult to change.

In some embodiments, Region Orchestrator 106 can perform a static analysis in which the identified service plans are parsed to identify execution targets, execution target checkpoints, phases, and flocks, and/or to identify circular dependencies between resources that need to be removed. In some embodiments static analysis data corresponding to this analysis may be stored (e.g., via SPAM store 312 of FIG. 3) for subsequent use. In some embodiments, Region Orchestrator 106 can generate any suitable number of data structures based on the dependencies identified. These data structures (e.g., directed acyclic graph(s), linked lists, etc.) may be utilized by CIOS 102 to drive operations for performing a region build. By way of example, these data structures may collectively define an order by which services are bootstrapped within a region. An example of such a data structure is discussed further below with respect to Build Plan 338 of FIG. 3. If circular dependencies (e.g., a service A skill requires a service B skill and vice versa) exist and are identified through the static analysis and/or graph, Region Orchestrator 106 may be configured to notify any suitable service teams that changes are required to the corresponding SPAM to correct these circular dependencies. Region Orchestrator 106 can be configured to traverse one or more data structures to manage an order by which services are bootstrapped to a region. Region Orchestrator 106 can identify (e.g., using data obtained from Puffin Regional 120) the status of each skill within a given region at any suitable time. Region Orchestrator 106 may utilize this data to identify when it can bootstrap a service, when bootstrapping is blocked, and/or when bootstrapping operations associated with a previously blocked service can resume. Based on this traversal, Region Orchestrator 106 can perform a variety of releases in which instructions are transmitted by Orchestrator 106 to CIOS Central 108 to perform bootstrapping operations corresponding to any suitable number of flock configs.

In some embodiments, the service plans and manifests (SPAMs) utilized by Region Orchestrator 106 may provide a deterministic specification of a build description for a service than previously provided by one or more flock configs. While flock configs specify aspects of a single release associated with a single service, a service plan may provide a single specification of the order and conditional requirements for executing all of the releases that may be needed (or are needed) to build a given service. Previous implementations of flock configs included optional dependencies which allowed for a degree of indeterministic behavior with respect to the order of operations performed during a region build. The inclusion of optional dependencies required an orchestrator to perform multiple passes of the build dependency graph, resulting in wasteful processing. These types of dependencies make it difficult, if not impossible, for the system to track region build progress, identify remaining operations yet to be performed, and/or identify build completion. Service plans and manifests (SPAMs) may be utilized to eliminate at least some of the drawbacks to previous indeterministic approaches.

SPAMs (one SPAM corresponding to one service to be bootstrapped in the region) allow service teams to describe the corresponding operations that may be needed (or are needed) to build their service and may allow for separation between internal coordination (e.g., coordination of operations internal to the service) and external coordination (e.g., coordination of operations between components of different services). A number of visualizations may be provided (e.g., via Region Orchestrator 106 or any suitable component of CIOS 102) via one or more user interfaces. One visualization may depict a directed acyclic graph describing the build operations internal to a given service, and a separate visualization may depict a directed acyclic graph describing the order of build operations corresponding to multiple services (e.g., all services of the region/data center). As a specific example, one or more visualizations can present a region-level directed acyclic graph (DAG) including only external coordination (e.g., an order of operations corresponding to coordination between services) while omitting operations that are internal with respect to each service. This DAG, for example, may depict nodes corresponding to one service's skills on which other services depend, while excluding nodes corresponding to skill dependencies between service components/functional units of the same service.

A SPAM may include an external interaction interface that includes a service build definition that includes a number of build milestones. Each build milestone may be associated with a set of capabilities (and/or skills) that the service is expected to publish upon reaching a given milestone. To transition between build milestones, the SPAM may include execution units that encapsulate a directed acyclic graph (DAG) of one or more releases, each release being equivalent to operations previously defined with a single flock config. Each execution unit may define a set of build time dependencies that identify one or more capabilities (and/or skills) that are required by at least one of the releases of the execution unit.

A SPAM may include a service build implementation. An execution unit of the SPAM may describe one or more releases that may be needed (or are needed) to build a service, with potentially multiple execution units being defined. Each execution unit may be associated with one or more execution target checkpoint transitions, each of which may be used to specify the expected capabilities that should be available before the time of the release and the capabilities that should be published as the result of performing the release.

In some embodiments, the Region Orchestrator 106 may be configured to aggregate SPAMs corresponding to each service to be deployed in a region to generate a larger directed acyclic graph (e.g., the Build Plan 338 of FIG. 3) which may capture all of the operations necessary to build a region/data center. The collection of SPAMs identified from this aggregation may be referred to as a "SPAM set." In some embodiments, the Region Orchestrator 106 may utilize the DAG generated from a SPAM set to validate a DAG and/or operations performed using flock configs, while the DAG generated from flock configs is used to drive build operations/release execution. Alternatively, the Region Orchestrator 106 may utilize the DAG generated from the SPAM set to drive build operations/release execution. The utilization of a SPAM/SPAM set may be utilized by the system to generate a deterministic execution plan with which the region build may be executed.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment (e.g., Virtual Bootstrap Environment (ViBE) 116. ViBE 116 may be an overlay network that is hosted by host region 103 (a preexisting region that has previously been configured with a core set of services and which is communicatively available and secure). Region Orchestrator 106 may leverage resources of the host region 103 to bootstrap resources to the VIBE 116 (generally referred to as "building the ViBE"). By way of example, Region Orchestrator 106 may provide instructions through CIOS Central 108 that cause an instance of CIOS Regional 110 within a host region (e.g., host region 103) to bootstrap another instance of CIOS Regional within the VIBE 116. Once the CIOS Regional within the ViBE is available for processing, bootstrapping the services for the target region 114 can continue within the VIBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided. In some embodiments, any suitable combination of the components depicted as part of CIOS 102 may individually be examples of the cloud services of FIGS. 25-30 (e.g., 2556 of FIG. 25, 2656 of FIG. 26, etc.) and may be configured to operate in any suitable infrastructure pattern such as the examples described below in connection with FIGS. 25-30.

Figure 2:
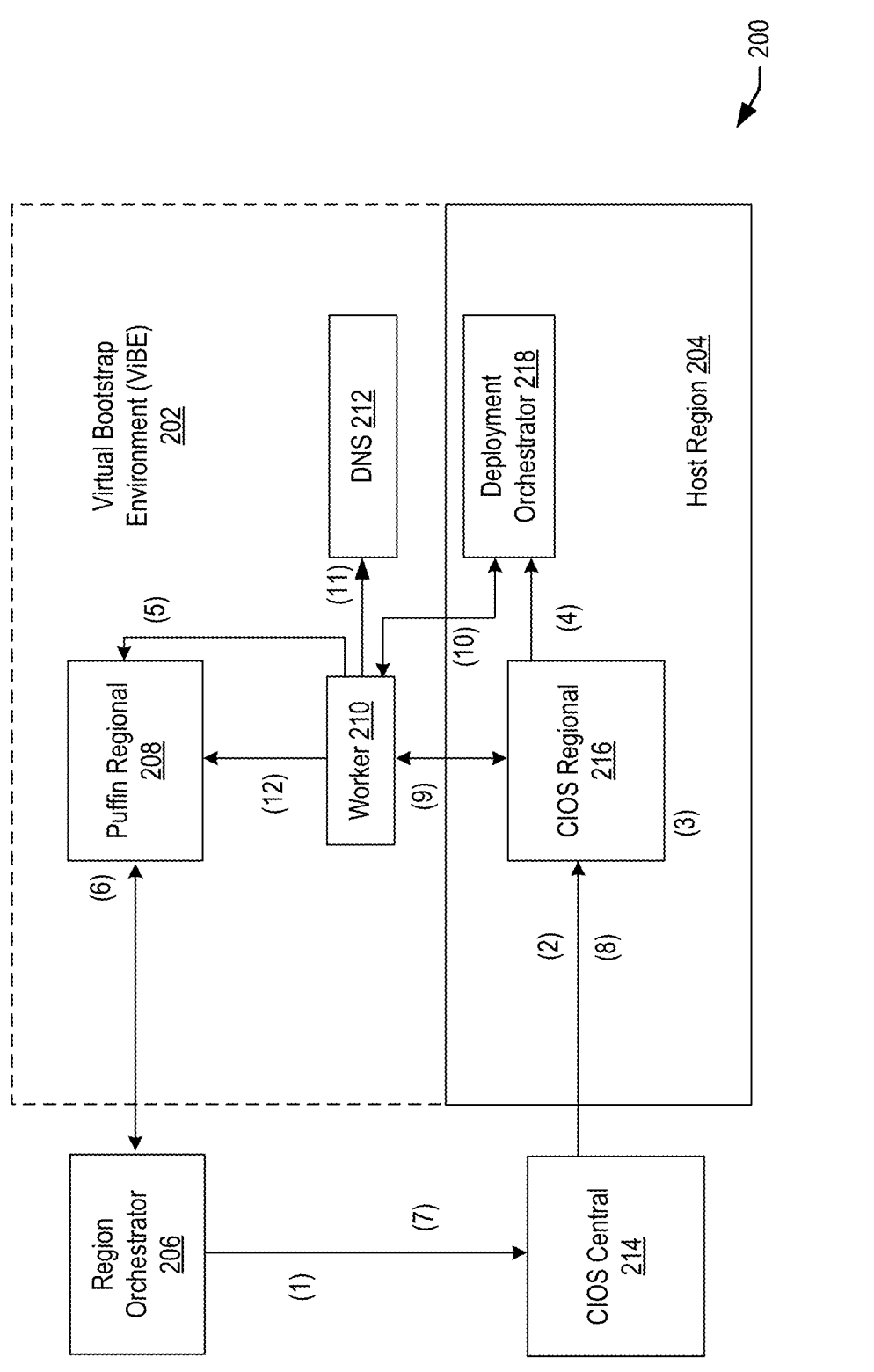
FIG. 2 is a block diagram for illustrating an environment and method for building a virtual bootstrap environment (ViBE), in accordance with at least one embodiment.

FIG. 2 is a block diagram for illustrating an environment and method 200 for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a core set of services may be bootstrapped. While those core set of services exist in the host region 204, they do not yet exist in the ViBE (nor the target region). These essential core services provide the functionality needed to provision devices, establish a chain of trust to the new region, and deploy remaining services into a region. The ViBE 202 may be a tenancy that is deployed in a host region 204 and used as a virtual region.

When the target region is available to provide bootstrapping operations, the VIBE 202 can be connected to the target region so that services in the ViBE can interact with the services and/or infrastructure components of the target region. This will enable deployment of production level services, instead of self-contained seed services as in previous systems, and may be connected over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the VIBE 202 and connected to the service enclave of a region (e.g., host region 204) in order to provision (reserve and/or configure) hardware and deploy services until the target region is self-sufficient and can be communicated with directly. Utilizing the ViBE 202 allows for meeting the dependencies and providing the services needed to be able to provision/prepare infrastructure and deploy software while making use of the host region's resources in order to break circular dependencies of core services.

Region Orchestrator 206 (an example of Region Orchestrator 106 of FIG. 1) may be configured to perform operations to build (e.g., configure) ViBE 202. Region Orchestrator 206 can obtain applicable SPAMs corresponding to various resources to be bootstrapped to the new region (in this case, a ViBE region, ViBE 202). By way of example, Region Orchestrator 206 may obtain a SPAM for building any suitable portion of DNS 212, Worker 210, and/or Puffin Regional 208. In some embodiments, Region Orchestrator 206 may obtain a SPAM identifying aspects of bootstrapping any or all resources of the VIBE 202.

The method 200 may begin at step 1, where Region Orchestrator 206 may instruct CIOS Central 214 (e.g., an example of CIOS Central 108 and CIOS Central 214 of FIGS. 1 and 2, respectively) to build a service of the VIBE 202 or building the VIBE 202 in whole or in part. For example, Region Orchestrator 206 may transmit a request (e.g., including the flock config identified within a SPAM corresponding to building Puffin Regional 208 and a flock config corresponding to building worker 210 identified within the same or a different SPAM) to request bootstrapping of the Puffin Regional 208 and worker 210 that, at this time do not yet exist in the ViBE 202. In some embodiments, CIOS Central 214 may have access to all SPAMs. Therefore, in some examples, Region Orchestrator 206 may transmit one or more identifiers for one or more SPAMs and CIOS Central 214 may independently obtain the corresponding flock config(s) (e.g., flock configs identified by each manifest and/or service plan) from storage (e.g., from database (DB) 308 or SPAM store 312 of FIG. 3).

At step 2, CIOS Central 214 may provide the flock config(s) via a corresponding request to CIOS Regional 216. CIOS Regional 216 may parse the flock config(s) to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regional may instruct deployment orchestrator 218 (e.g., an example of a core service, or other write, build, and deploy applications software, of the host region 204) to execute instructions that in turn cause Puffin Regional 208 and Worker 210, to be bootstrapped within ViBE 202.

At step 5, skills data may be transmitted to the Puffin Service 208 (from the CIOS Regional 216, Deployment Orchestrator 218 via the Worker 210 or otherwise) indicating that Puffin Regional and/or Worker 210 are available. Puffin Service 208 may persist this data. In some embodiments, the Puffin Regional 208 receives state transition data (e.g., from CIOS Regional 216) that indicates a particular skill has a particular status. By way of example, the skill provided to Puffin Regional 208 at step 5 may indicate the Puffin Regional 208 and Worker 210 are available for processing.

At step 6, Puffin Service 208 may identify that the Puffin Service 208 and/or Worker 210 are available based on receiving or obtaining data (an identifier corresponding to a skill) from Puffin Regional 208.

At step 7, as a result of receiving/obtaining the data at step 6 from Puffin Regional 208, Region Orchestrator 206 may instruct CIOS Central 214 to bootstrap a DNS service (e.g., DNS 212) to the ViBE 202.

At step 8, the CIOS Central 214 may instruct the CIOS Regional 216 to deploy DNS 212 to the ViBE 202. In some embodiments, the DNS SPAM for the DNS 212 may be provided by the CIOS Central 214 or one or more corresponding flock configs for bootstrapping the DNS 212 may be identified by CIOS Central 214.

At step 9, Worker 210, now that it is deployed in the VIBE 202, may be assigned by CIOS Regional 216 to the task of deploying DNS 212. Worker may execute a declarative infrastructure provisioner in the manner described above in connection with FIG. 3 to identify a set of operations that are needed to deploy DNS 212. These operations may be identified based at least in part on from comparing the flock config (the desired state), a corresponding portion of a SPAM, to a current state of the (currently non-existing) resources associated with DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 may notify Puffin Regional 208 (e.g., via a skills state transition) that DNS 212 is available in ViBE 202. Region Orchestrator 206 may subsequently identify that the resources associated with the flock configs corresponding to Puffin Regional 208, Worker 210, and DNS 212 are available any may proceed to bootstrapping any suitable number of additional resources to the VIBE 202.

Figure 25:
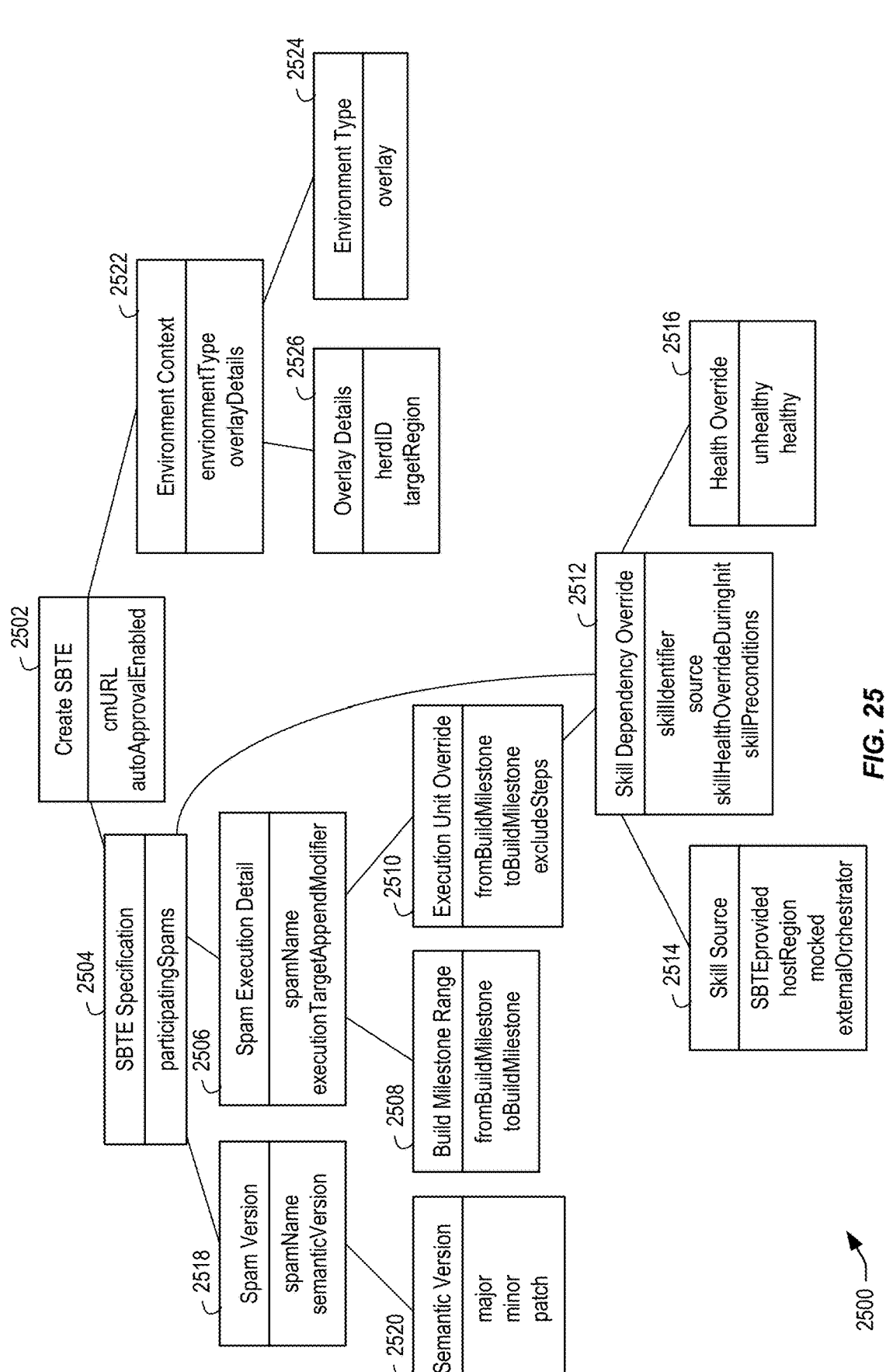
FIG. 25 is a block diagram depicting a data model representing various metadata related to a Service Build Test Execution (SBTE), in accordance with at least one embodiment.

After steps 1-12 are concluded, the process for building the ViBE 202 may be considered complete and the ViBE 202 may be considered built and ready for additional bootstrapping (e.g., the bootstrapping of various cloud services such as cloud services 2556 of FIG. 25). At any suitable time during steps 1-12, Puffin Regional 208 may receive and/or obtain alarm data from one or more alarm services (e.g., the alarm service(s) 122 of FIG. 1). In some embodiments, the alarm data may be processed by Puffin Regional 208. At any suitable time, Puffin Regional 208 may communicate the alarm data or data derived from the alarm data to Puffin Central 118 of FIG. 1. In some embodiments, Puffin Regional 208 (and/or Puffin Central 118) may communicate skill health information to Region Orchestrator 206 indicating corresponding health states associated with one or more skills. In some embodiments, Puffin Regional 208, Puffin Central 118, and/or Region Orchestrator 206 may be configured to execute operations that may pause (partially or fully) any suitable portion of the operations discussed above in connection with the method 200. In some embodiments, this may cause a regions state associated with the region within which method 200 is executed, to be updated to a state that indicates the build of the region is paused. In some embodiments, Puffin Regional 208, Puffin Central 118, and/or Region Orchestrator 206 may be configured to resume the operations of method 200 (and update the region state accordingly) based at least in part on user input, on subsequent alarm data indicating an update to a health state of one or more skills, on a skill health override value, or the like.

Figure 3:
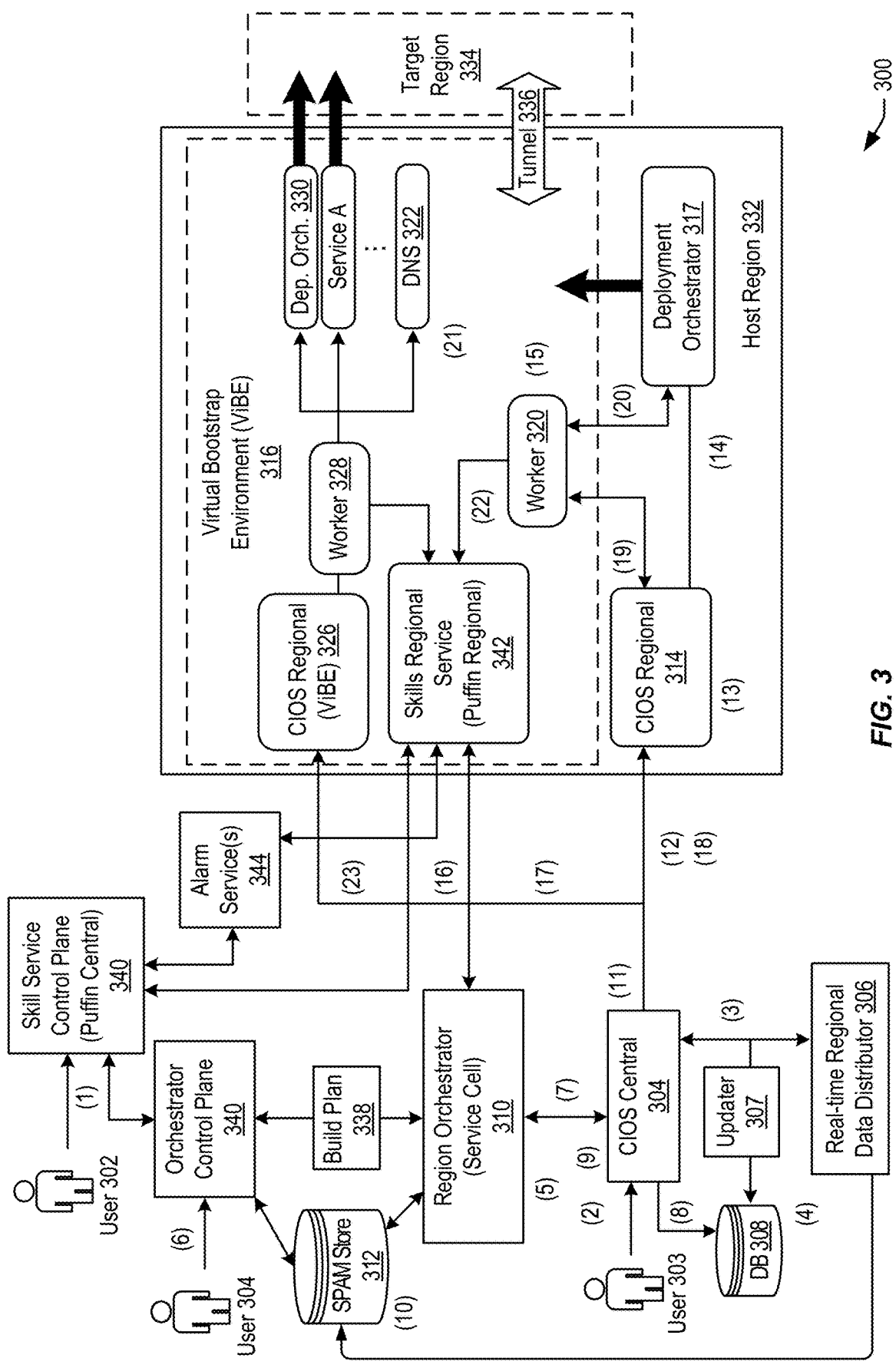
FIG. 3 is a block diagram for illustrating an environment and method for bootstrapping services to a target region utilizing the VIBE, in accordance with at least one embodiment.

FIG. 3 is a block diagram for illustrating an environment and method 300 for bootstrapping services to a target region utilizing the ViBE, according to at least one embodiment.

The method 300 may begin at step 1, where user 302 (e.g., a service team member) may interact with any suitable number of user interfaces managed by Puffin Central 340 (e.g., Puffin Central 118 of FIG. 1). Puffin Central 340 may be configured to read service and/or skill metadata from predefined files or the user 302 may enter service metadata and/or skill metadata at one or more of the provided user interfaces. In some embodiments, Puffin Central 340 may store all service and skill metadata and serve as a centralized authority for the same. At any suitable time, any suitable user may view the service and/or skill metadata such as prior to and/or during performance of the region build.

At step 2, user 303 (the same or different user as user 302) may utilize any suitable user interface provided by CIOS Central 304 (an example of CIOS Central 108 and CIOS Central 214 of FIGS. 1 and 2, respectively) to modify region data. By way of example, user 303 may create a new region to which a number of services are to be bootstrapped.

At step 3, CIOS Central 304 may execute operations to send the change to RRDD 306 (e.g., an example of RRDD 104 of FIG. 1). At step 4, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 5, Region Orchestrator 310 (an example of the Region Orchestrator 106 and/or 206 of FIGS. 1 and 2, respectively), operating in a given service cell (e.g., one of service cell(s) 109 of FIG. 1), may detect the change in region data. In some embodiments, Region Orchestrator 310 may be configured to poll RRDD 306 for changes in region data. In some embodiments, RRDD 306 may be configured to publish or otherwise notify Region Orchestrator 310 of region data changes.

At step 6, user 309 (the same or a different user as users 302 and/or 303) may utilize any suitable user interface to select a SPAM set (also referred to as a "template" herein) to identify a set of one or more SPAMs. The SPAMs corresponding to the selected SPAM set may be obtained from DB 312. In some embodiments, Orchestrator Control Plane 340 may identify any suitable number of SPAMs of the SPAM set corresponding to the infrastructure to be provisioned and artifacts to be deployed as part of a region build according to the SPAMs of the SPAM set. In some embodiments, each SPAM may identify versions corresponding to one or more flock configs and/or one or more artifacts that may be needed (or are needed) to build a single service. In embodiments in which one or more SPAMs are utilized, the SPAM(s) (or any suitable portion of the SPAM(s)) may be stored within SPAM store 312 and utilized to identify the particular flock config and/or artifact versions to be utilized for building the region. In some embodiments, the flock configs and/or artifact versions of a SPAM set may be included in the corresponding SPAM(s) and stored within SPAM store 312.

In some embodiments, any suitable manifest items may be derived from any suitable number of SPAMs and the Orchestrator Control Plane 340 may be configured to verify compliance of a flock's behavior (e.g., the build/orchestration operations identified within a flock config) complies with the process defined by a corresponding SPAM. The Orchestrator Control Plane 340 may be configured to ingest SPAMs which provide the information that may be required (or in some cases, which is required) to build an up-front plan of work and to introduce better guardrails than those available in previous implementations. By way of example, the Orchestrator Control Plane 340 generate build plan 338 based at least in part on the SPAM(s) of the SPAM set and may enforce the invariant that all SPAMs within the set are mutually compatible and composable together to form a viable build plan of releases required to build the service(s) of a region to be built. In some embodiments, a SPAM set may be used within a given regional context to improve service build progress tracking. operations composed from a SPAM set may be validated before they are applied and rejected if they are invalid. This provides an improvement over previous implementations which utilize version set item operations which were unconditionally applied. The utilization of SPAMs may enable the Orchestrator Control Plane 340 to build a deterministic plan of work prior to building a region, to block updates that would jeopardize or break an ongoing or future build, to improve the tracking of process of a service build, to detect deviations of flock behavior from the SPAM's specification, and to alert operators of deviations and status. Orchestrator Control Plane 340 may provide Build Plan 338 to Region Orchestrator 310 or Region Orchestrator 310 may otherwise obtain Build Plan 338 (e.g., from a storage location accessible to the Region Orchestrator 310).

At step 7, Region Orchestrator 310 may request CIOS Central 304 to recompile each of the flock configs associated with the SPAM set) with the current region data. In some embodiments, the request may indicate a version for each flock config and/or artifact.

At step 8, CIOS Central 304 may obtain current region data from the DB 308 (e.g., directly, or via Real-time Regional Data Distributor 306) and retrieve any suitable flock config and artifact in accordance with the versions requested by Region Orchestrator 310.

At step 9, CIOS Central 304 may recompile the obtained flock configs with the region data obtained at step 8 to inject those flock configs of the SPAM set with current region data. CIOS Central 304 may return the recompiled flock configs to Region Orchestrator 310 or the recompiled flock configs may be stored within SPAM store 312. In some embodiments, CIOS Central 304 may simply indicate compilation is done, and Region Orchestrator 310 may access the recompiled flock configs via RRDD 306.

In some embodiments, Build Plan 338 may be a region-level plan that includes every release that may be needed (or that is needed) for every service associated with a SPAM of the SPAM set to be bootstrapped within the region/data center. In some embodiments, the region build plan may be represented by a graph (e.g., a directed acyclic graph) that includes "tracks" and "steps." A "track" refers to a single thread of execution of the Build Plan 338 that may include any suitable number of steps. In some embodiments, multiple tracks may execute concurrently. A "track step" or "step," for brevity, refers to a node of the Build Plan 338 and may correspond to a single track. In some embodiments, a step may include an assertions about state (e.g., an installation of or health of a skill), an execution of an infrastructure or application release, a control flow operation for handling concurrency, or the like. In some embodiments, a track step is an atomic unit of execution of the Build Plan 338. Any suitable portion of Build Plan 338 may be presented via one or more user interfaces (e.g., one or more interfaces provided by any suitable component of CIOS 102 of FIG. 1, including Orchestrator Control Plane, CIOS Central 304, or the like).

One or more "steps" of the Build Plan 338 may correspond to building the VIBE 316 (or individual services within the ViBE such as Puffin Regional 342 and/or worker 320), another node may correspond to bootstrapping DNS 322. The steps 11-16 may correspond to deploying (via deployment orchestrator 317, an example of the deployment orchestrator 218 of FIG. 2) the resources and/or artifacts identified from a SPAM corresponding to building the VIBE 316 (e.g., an example of ViBE 116 and 202 of FIGS. 1, and 2, respectively). That is, steps 11-16 of FIG. 3 generally correspond to steps 1-6 of FIG. 2. Once notified a skill has been installed (e.g., indicating that Worker 320 and/or Puffin Regional 342, corresponding to Worker 210 and Puffin Regional 209 of FIG. 2, respectively, are deployed/available) the Region Orchestrator 310 may recommence traversal of the Build Plan 338 to identify which operations/releases to be executed next.

Region Orchestrator 310 may continue traversing the Build Plan 338 to identify that one or more releases corresponding to deploying DNS 322 are to be executed. Steps 17-22 may be executed to deploy DNS 322 (an example of the DNS 212 of FIG. 2). These operations may generally correspond to steps 7-12 of FIG. 2.

At step 22, a skill state may be updated to indicate that DNS 322 is available. In some embodiments, CIOS Regional 314 and/or Deployment Orchestrator 317 may initially communicate the installation of the skill (e.g., to Puffin Regional 342). Upon detecting the updated skill state (e.g., via data provided by Puffin Regional 342), Region Orchestrator 310 may recommence traversal of the Build Plan 338. The Region Orchestrator 310 may identify that any suitable portion of an instance of CIOS Regional (e.g., an example of CIOS Regional 314) is to be deployed to the ViBE 316. In some embodiments, steps 17-22 may be substantially repeated with respect to deploying CIOS Regional (ViBE) 326 (an instance of CIOS Regional 314, CIOS Regional 110 of FIG. 1) and Worker 328 to the ViBE 316. One or more skill states may be updated to indicate that that CIOS Regional (ViBE) 326 and worker 328 are available.

Upon detecting the CIOS Regional (ViBE) 326 is available, Region Orchestrator 310 may recommence traversal of the Build Plan 338. On this traversal, the Region Orchestrator 310 may identify that a deployment orchestrator (e.g., Deployment Orchestrator 330, an example of the Deployment Orchestrator 317) is to be deployed to the ViBE 316. In some embodiments, steps 17-22 may be substantially repeated with respect to deploying Deployment Orchestrator 330. A skill state indicating the deployment of the Deployment Orchestrator 330 is complete may be transmitted to the Puffin Regional 342, indicating that Deployment Orchestrator 330 is available.

After Deployment Orchestrator 330 is deployed, ViBE 316 may be considered available for processing subsequent requests. Upon detecting Deployment Orchestrator 330 is available, Region Orchestrator 310 may instruct subsequent bootstrapping requests to be routed to ViBE components rather than utilizing host region components (components of host region 332). Thus, Region Orchestrator 310 can continue traversing the Build Plan 338, at each node instructing release execution to the VIBE 316 via CIOS Central 304.

CIOS Central 304 may transmit release requests CIOS Regional (ViBE) 326 to effectuate release execution as instructed by Region Orchestrator 310.

At any suitable point during this process, Target Region 334 may become available. Indication that the Target Region is available may be identifiable from region data for the Target Region 334 being provided by the user 303 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the ViBE 316 to Target Region 334. As used herein, "IPSec" refers to a protocol suite for authenticating and encrypting network traffic over a network that uses Internet Protocol (IP) and can include one or more available implementations of the protocol suite (e.g., Openswan, Libreswan, strongSwan, etc.). The network may connect the VIBE 316 to the service enclave of the Target Region 334.

Prior to establishing the IPSec tunnels, the initial network connection to the Target Region 334 may be on a connection (e.g., an out-of-band VPN tunnel) sufficient to allow bootstrapping of networking services until an IPSec gateway may be deployed on an asset (e.g., bare-metal asset) in the Target Region 334. To bootstrap the Target Region's network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the ViBE 316. Once services (e.g., Deployment Orchestrator 330, Service A, etc.) in the ViBE 316 can establish an IPSec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the VIBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may transit data (e.g., a skills update) that indicates that the physical resources in the Target Region 334 have been allocated. The data may be transmitted to Puffin Regional 342 via CIOS Regional (ViBE) 326 (e.g., by Worker 328).

With the hardware allocation of the Target Region 334 established and corresponding skills are updated with Puffin Regional 342, CIOS Regional (ViBE) 326 can orchestrate the deployment of instances of core services from the VIBE 316 to the Target Region 334. This deployment may be similar to the processes described above for building the ViBE 316, but using components of the ViBE (e.g., CIOS Regional (ViBE) 326, Worker 328, Deployment Orchestrator 330) instead of components of the Host Region 332 service enclave (e.g., CIOS Regional 314 and Deployment Orchestrator 317). The deployment operations may generally correspond to steps 17-22 described above.

As a service is deployed from the ViBE 316 to the Target Region 334, the DNS record associated with that service may correspond to the instance of the service in the VIBE 316. The DNS record associated with the service may be updated at any suitable time to complete deployment of the service to the Target Region 334. Said another way, the instance of the service in the ViBE 316 may continue to receive traffic (e.g., requests) until the DNS record is updated. A service may deploy partially into the Target Region 334 and publish information indicating the avail- ability of a skill (e.g., to Puffin Regional 342) indicating that the service is at least partially deployed. For example, a service running in the VIBE 316 may be deployed into the Target Region 334 with a corresponding compute instance, load balancer, and associated applications and other soft- ware, but may wait for database data to migrate to the Target Region 334 before being completely deployed. The DNS record (e.g., managed by DNS 322) may still be associated with the service in the VIBE 316. Once data migration for the service is complete, the DNS record may be updated to point to the operational service deployed in the Target Region 334. The deployed service in the Target Region 334 may then receive traffic (e.g., requests) for the service, while the instance of the service in the VIBE 316 may no longer receive traffic for the service.

At any suitable time during method 300, Puffin Regional 342 may receive and/or obtain alarm data from one or more alarm services (e.g., the alarm service(s) 344, an example of the alarm service(s) 122 of FIG. 1). In some embodiments, the alarm data may be processed by Puffin Regional 342 (or Puffin Regional 342 may communicate the alarm data or data derived from the alarm data to Puffin Central 340). In some embodiments, Puffin Regional 342 and/or Puffin Cen- tral 340 may communicate skill health information to Region Orchestrator 310 indicating corresponding health states associated with one or more skills. In some embodi- ments, Puffin Regional 342, Puffin Central 340, and/or Region Orchestrator 310 may be configured to execute operations that pause or otherwise halt any suitable portion of the operations discussed above in connection with the method 300. In some embodiments, Puffin Regional 342, Puffin Central 340, and/or Region Orchestrator 310 may be configured to resume and/or execute any suitable portion of the operations of method 300 (e.g., based at least in part on user input, subsequent alarm data indicating an update to a health state associated with one or more skills, based at least in part on a skill health override value, or the like).

Figure 4:
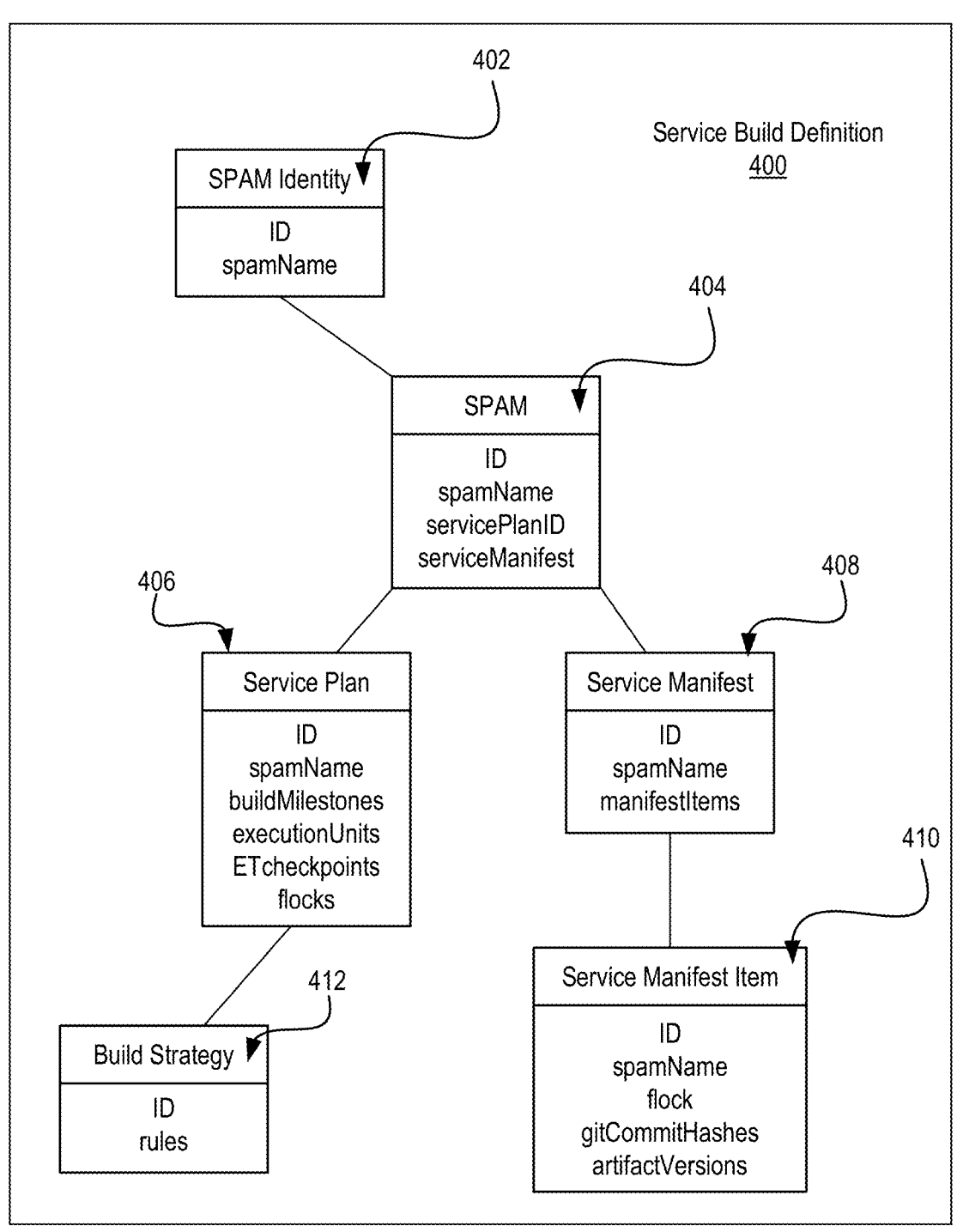
FIG. 4 is a block diagram depicting a data model representing various metadata associated with a Service Build Definition, in accordance with at least one embodiment.

FIG. 4 is a block diagram depicting a data model repre- senting various metadata associated with Service Build Definition 400, in accordance with at least one embodiment. Service Build Definition 400 may include any suitable portion of a service plan and manifest (SPAM). The data structures 402-410 may include any suitable number of attributes (pictured) with corresponding values and may collectively represent a single SPAM. These data structures may be identified within a common file or any suitable number of files. A SPAM may be maintained within the data structures 402-410 as depicted in FIG. 4 or with different data structures. The data structures 410-412 of FIG. 4 may be combined or separated in any suitable manner to maintain metadata corresponding to the SPAM.

As depicted in FIG. 4, a SPAM may be represented by a combination of the data structures (e.g., data structures 402-410) depicted in FIG. 5. Each of those data structures may include an ID (e.g., an identifier) with a corresponding value that uniquely identifies that data structure. This ID may be used to refer to a particular instance of a particular data structure. Each of the data structures v may include an attribute corresponding to a "spamName" (or another suit- able identifier) that may be used to maintain an association between the data structures 402-410 (e.g., to indicate each of the data structures 402-410 correspond to the same SPAM).

In some embodiments, SPAM data structure 404 may include any suitable data corresponding to a SPAM. Any suitable portion of SPAM data structure 404 may be included in service plan data structure 406 and/or service manifest 408. SPAM data structure 502 may include corre- sponding IDs identifying particular instances of a service plan data structure (e.g., service plan data structure 406) and a service manifest (e.g., service manifest data structure 408) via attributes "servicePlanID" and "serviceManifest," respectively. Thus, in some embodiments, SPAM data struc- ture 404 maintains a mapping between a service plan (represented by service plan data structure 406) and a manifest (represented by service manifest data structure 406).

The service plan data structure 406 may represent a service plan and the entities included in a service plan. Service plan data structure 406 may identify one or more build milestones via the attribute "buildMilestones" that may be associated with one or more values that indicate an ordered list of build milestone identifiers (e.g., names, alphanumeric strings, etc.). The "buildMilestones" attribute value may identify, include, and/or otherwise correspond to the build milestones entity 600 of FIG. 6.

In some embodiments, Service Build Definition 400 may include one or more build strategies identified within build strategy data structure 412. As depicted, build strategy data structure 412 may include an attribute "rules," the value of which may identify any suitable number of build strategies. A "build strategy" refers to an enforced description of how builds occur. A build strategy may include one or more agreements among/between teams for how their services co-operate during cycle-breaking in build, or by the Archi- tects and Region Build managers to ensure an overall strategy is achieved. For example, a build strategy can be used to gate which services build in host region vibe, or for how two services progress through co-dependent steps (each reaching a Milestone in their own SPAM before returning control to the other). These build strategies may be reviewed by Architects before being implemented in the system and may be used in validation checks to ensure changes do not introduce regressions.

In some embodiments, a build strategy may specify pre-conditions which may have functionalities/skills required and post-conditions to ensure/validate that those functionalities were implemented. Each rule in a build strategy may represent a desired/required unit of execution which may be expected (or required) to either be imple- mented by a SPAM's execution unit or may be (or in some cases must be) a nested build strategy with further details of execution. Each rule in a build strategy may specify a name or other suitable identifier (e.g., a name corresponding to a build stage or specified state) and a description, along with pre- and post-conditions. Rules may be represented by a directed graph. A build strategy may specify both rules and an expected execution order and (if applicable) parallelism. The implementation of a rule may result in changes to a set of installed functionalities/skills. "Internal steps," which refers to steps which produce no changes, may be modeled as part of a workflow implementing a rule.

A build strategy may be used to describe pre- and post- conditions that specify the conditions for a given node to be executed in terms of functionalities/skills that must be installed (and healthy, if applicable) ahead of the node and what is expected to be true after the node is executed (in terms of functionalities/skills installed or uninstalled, and their associated runtime dependencies). Build strategies may be specified at multiple levels of abstraction-a node in a build strategy may be implemented by a nested build strategy or by an execution unit directly.

FIG. 5 is a block diagram 500 depicting relationships between portions of a service plan (e.g., service plan 502, an example service plan corresponding to service plan data structure 406 of FIG. 4) and manifest (e.g., manifest 504, an example of service manifest corresponding to service manifest data structure 408 of FIG. 4), in accordance with at least one embodiment.

The service plan 502 may include any suitable combination of the build milestones entity 600 of FIG. 6, the execution unit entity 700 of FIG. 7, and the flock config entity 800 of FIG. 8. In some embodiments, the service plan 502 indicates a service build implementation at different levels of granularity. The highest level of granularity indicates the build milestones (e.g., build milestones 506-512, defined with a corresponding build milestone entity similar to build milestone entity 600). The service plan 502 may be used specify a service build to a sequence of build milestones that the service progresses through during its build. Each milestone may represent an interaction that occurs between a given service and other services (e.g., publishing a capability that unblocks other services from building, and/or consuming a new capability published by another service). These build milestones may be used to understand a high-level picture of how that service builds and the inter-service coordination required for that service without having to understand all the services' flocks and their service-internal coordination.

Build milestones 506-512 may individually be associated with a set of external capabilities on which transitioning to the build milestone depends. These capabilities may include the expected published capabilities that are relevant for external services (e.g., service 914, including the other services of the region build). As a non-limiting example, build milestone 906 may depend on skill state update 516 (corresponding to one or more skills) as defined in a corresponding execution unit transition specifying a transition to build milestone 506. Build milestones 506-512 may be associated with corresponding skill state updates that are required to start/continue the installation of another service. By way of example build milestone 508 may be associated with skill state update 518, corresponding to one or more skills that are expected to be installed prior to transitioning to build milestone 508. In some embodiments, build milestones may be used to generate a high-level sequencing diagram that may be used to identify progress in a region build.

Each build milestone may be associated with a corresponding execution unit. By way of example, build milestone 506 may be associated with execution unit 520 (corresponding to an instance of execution unit entity 700 of FIG. 7). Each execution unit, including execution unit 520, may include any suitable number of releases such as release 522, and an order by which these releases are to be executed. Each release may be expressed within the execution unit as an execution target checkpoint transition. The corresponding execution target checkpoint transition may indicate external and/or internal capabilities dependencies for the transition/release and may provide a mapping to a corresponding flock config identified in the service manifest 504. By way of example, release 522 may be ultimately mapped to a particular flock config using the service manifest item 524. The service manifest item 524 may be identified by an identifier provided in the execution target checkpoint referenced by the execution unit 520 and corresponding to the release 522.

Using the entities of the service plan, one or more acyclic graphs may be generated. As a non-limited example, a directed acyclic graph defining the service build may be generated. This DAG may be referred to as a "service DAG" and may include any suitable number of nodes representing a corresponding release and an order by which those releases are to be executed to build that service. The nodes themselves, or edges between nodes, may be associated with external and/or internal capability dependencies. In some embodiments, a graph, list, sequence diagram, or any suitable data structure may be generated for a service and/or for any suitable number of services of the region build using the build milestones corresponding to the service(s). This data structure may be referred to as a "milestone plan." As yet another example, the Build Plan 338 of FIG. 3 may be generated using the service plan (e.g., as part of a SPAM set including service plans and manifests corresponding to one or more services). As described above in FIG. 3, the Build Plan 338 may be used (e.g., by the Region Orchestrator 310 of FIG. 3) to drive region build operations (e.g., to execute a deterministic order of infrastructure and application releases for the region/data center).

In some embodiments, the service manifest 504 may be utilized to specify the flock versions and artifact versions that will be used to create releases for the execution targets specified in the service plan 502. The service manifest 504 may be used to validate the service plan 502 based at least in part on identifying that each release identified in the service plan 502 is included within the service manifest 504. In some embodiments, each service manifest item (e.g., service manifest item 524) may be mapped to a version set item such that service manifests may be used to validate a version set used by CIOS 102 to perform a region build. As a non-limiting example, a SPAM set may be constructed all SPAMs corresponding to services that are to be bootstrapped within a region/data center. The manifests of the SPAM set may be used to validate a version set, should one be used, to ensure that all flock config files and artifacts referenced in the SPAM set are included in the version set to be used to build the region.

FIG. 6 is a block diagram depicting a build milestone entity 600 of a service plan and manifest, in accordance with at least one embodiment. Build milestones entity 600 may identify any suitable number of build milestones corresponding to a service build. As depicted in FIG. 6, build milestones entity 600 identifies four build milestones corresponding to code segments 602-608. Each build milestone may include any suitable number of unique identifiers (e.g., ID, Name, etc.) with which the build milestone may be uniquely identified. Build milestones may be individually associated with one or more skills that are to be installed as part of the executing the releases of the build milestone. These skills may be published (e.g., data transmitted to transition the skill to a state of "INSTALLED") upon transitioning, or prior to transitioning to a given build milestone.

Code segment 602 identifies a build milestone entitled "absent," a corresponding ID (e.g., "service_absent"), a corresponding description, and a list of skills corresponding to functionalities/skills that are to be published as being installed upon transitioning to this build milestone. The list of functionalities, in this instance, is empty, indicating that no skills are expected to be published prior to transitioning to the build milestone "absent."

Code segment 604 identifies a build milestone entitled "service-partial," a corresponding to ID (e.g., "service_partially_available"), a corresponding description, and a list of skills corresponding to functionalities/skills that are expected to be published upon transitioning to this build milestone (also referred to as "functionalities" or the skills on which this build milestone depends). The list of functionalities, in this instance, includes "/INTERNAL/service-A_partial," indicating that a skill "serviceA_partial" corresponding to a portion of service functionality is expected/required to be published (e.g., transitioned to a state of INSTALLED) upon transitioning to the build milestone "service_partially_available." In some embodiments, "/INTERNAL/" specifies that the skill "serviceA_partial" is a skill on which the service being built (e.g., "service A") internally depends. Internal skills may be considered those on which only the service corresponding to these build milestones, and no external services, depend.

Code segment 606 identifies a build milestone entitled "service-available," a corresponding to ID (e.g., "service_fully_available"), a corresponding description, and a list of skills corresponding to functionalities/skills that are expected to be published (e.g., transitioned to a state of INSTALLED) prior to transitioning to this build milestone. The list of functionalities, in this instance, includes "/INTERNAL/serviceA_backend," indicating that a skill "serviceA_backend" corresponding to a portion of service functionality is expected/required to be published (e.g., transitioned to a state of "INSTALLED") upon transitioning to the build milestone "serviceA_fully_available." In some embodiments, "/INTERNAL/" specifies that the skill "serviceA_backend" is a skill on which the service being built (e.g., "service A") internally depends.

Code segment 608 identifies a build milestone entitled "complete," a corresponding to ID (e.g., "service_complete"), a list of skills corresponding to functionalities/skills that are expected to be published prior to transitioning to this build milestone. The list of functionalities, in this instance, includes "/PUBLIC/serviceA_complete," indicating that a skill "serviceA_complete" corresponding to a portion of service functionality is expected/required to be published (e.g., transitioned to a state of "INSTALLED") upon transitioning to the build milestone "serviceA_complete." In some embodiments, "/PUBLIC/" specifies that the skill "serviceA_complete" is a skill on which at least one other external service (a service other than service A of this example) depends.

In some embodiments, each build milestone specifies the functionalities/skills that are expected (and in some cases, required) to be published upon transitioning to the given build milestone. These functionalities/skills, as seen in FIG. 6, may be expressed as internal and/or public skills. The designator "INTERNAL" and "PUBLIC" depicted in FIG. 6 may correspond to respective namespaces. Any suitable functionality/skill may be associated with a corresponding namespace. Any suitable number of namespaces may be utilized. A set of build milestones (e.g., build milestones corresponding to code segments 602-608) may be used to indicate a high-level overview of a process for building a service and may be utilized/consumed by external consumers (e.g., other services that depend on the service to which the build milestones relate). Build milestones may be defined and utilized to express portions of functionality are available for the service. This may allow other service builds to proceed when the functionality on which the other service depends is available (expressed as expected installed skills), rather than waiting for the service in question to become fully available. Build milestones may be used for coordination between services. When building a service does not involve coordination with other services, the service plan for that service may include no build milestones or a number of default build milestones (e.g., "absent" and "complete"). In some embodiments, the build milestones defined in every service plan to be used for a region build may be used to generate a high-level graph and/or sequencing diagram. This may provide service teams a graph view of simplified complexity with which the region build process may be more easily understood and synthesized. As a non-limiting example, a graph/diagram generated using the build milestones for each corresponding service may include a reduced number of nodes (e.g., 3 per service, 4 per service, depending on the service's build milestone implementation) from the Build Plan 338 of FIG. 3 that may include dozens of nodes (representing capabilities) per service.

Returning to FIG. 4, the service plan represented by service plan data structure 406 may include an Execution Unit entity. As depicted, the service plan data structure 406 includes an "ExecutionUnit" attribute with a corresponding value that includes a set of execution units. Each execution unit may be used to describe how a service transitions from one build milestone to the next. An execution unit may describe a directed acyclic graph of releases that need to be performed. The definition of this graph centralizes the definition of how releases (e.g., flock/phase/change Type (e.g., Infra or App) interact. The order of execution units may be driven by the order of build milestones defined in a corresponding build milestones entity 600.

FIG. 7 depicts an example execution unit entity 700 of an example service plan, in accordance with at least one embodiment. Execution unit entity 700 may identify any suitable number of execution units (e.g., one for each transition between ordered pairs of build milestones identified by a corresponding build milestone entity such as build milestone entity 600 of FIG. 6). FIG. 7 depicts two such transitions (e.g., a transition between build milestones "absent" and "service-partial" and another transition between build milestones "service-partial" to "service-available"). Although names are depicted as being used and corresponding to FIG. 6, IDs may be similarly used. Another execution unit may be defined for a transition between build milestones "service-available" and "complete," but is not depicted in FIG. 7 for brevity. As the build milestones are defined as having a sequential order, so too are the execution units due to their association to the ordered build milestones.

As depicted in FIG. 7, execution unit entity 700 includes execution unit 702 and execution unit 704. Execution unit 702 may correspond to the transition between build milestones "absent" and "service-partial." Execution unit 704 may correspond to the transition between build milestones "service-partial" and "service-available." Additional execution units may be included in execution unit entity 700 but not depicted in FIG. 7.

Each execution unit may include one or more automated dependencies. By way of example, execution unit 702 specifies dependencies on a set of public skills (e.g., skills that are installed by a separate service) as depicted at 705. These automated dependencies (also referred to as "external dependencies" may include one or more skills that should (or in some instances, must) be installed (e.g., in a state of "INSTALLED") prior to executing a transition from one build milestone (e.g., the "absent" build milestone) to another (e.g., the "service-partial" build milestone). The set of automated dependencies may be the union of external skill requirements for all releases defined in the step section of the corresponding execution unit. As depicted in FIG. 7, the automated dependencies are indicated as including public skills corresponding to "/PUBLIC/functions" and "/PUB- LIC/OCI_Logging." The "PUBLIC" designation may correspond to a public namespace with which the two depicted skills are associated. Any suitable number of automated dependencies may be specified. Although public skills are depicted, it should be appreciated that any suitable combination of skills corresponding to any suitable number of namespaces (e.g., PUBLIC, INTERNAL, etc.) may be utilized. In some embodiments, an execution step may include no automated dependencies.

As another example, execution unit 704 specifies a set of public skills at 707. Although not depicted, in some embodiments, the automated dependencies at 707 may include a superset of all skills that are expected (and in some cases, required) to be installed prior to a transition from one build milestone (e.g., the "service_partial" build milestone) to another (e.g., the "service-available" build milestone).

Each execution unit may include any suitable number of steps (or groups of steps) that, when executed, move the service from one build milestone to another. By way of example, execution unit 702 specifies step section 706 which includes two flock invocations. A forward step (toward a complete build) is provided at 708. A backward step is provided at 709. The forward step at 708, when executed may progress the service toward completion, while the backward step at 709 may unwind/reverse the progress made at 708. The ID, a name for the flock config to be utilized (specified by the attribute "FlockConfig"), a change type (e.g., INFRA, APP, etc.), and one or more build flags may be specified for each flock invocation of step section 706. When more than one invocation is provided in a forward or backward step, a step type may be used to indicate the order of execution of the flock invocation identified within a section.

By way of example, a serial step type may be used to indicate that nested flock invocations are to be performed serially in the order listed within the given section. Other step types may be utilized. For example, a parallel step type may be used if flock invocations may be executed in parallel (e.g., substantially simultaneously, concurrently, and/or overlapping execution). A serial step type may be used if two flock invocations (e.g., with distinct names) have a direct dependency between one another (e.g., the corresponding releases of which are expected to be executed serially). Execution of a release may cause one or more skill states corresponding to one or more skills to be published.

All of the expected skill publications (indications that corresponding skills were installed) associated with a build milestone (e.g., the build milestone that is being transitioned to) may be published when all of the releases of a corresponding execution unit that caused the transition are complete. By way of example, the skill "/INTERNAL/serviceA_partial" may be published upon transitioning to build milestone "service-partial" as indicated in Code segment 604 of FIG. 6. This transition may be completed upon successful release execution corresponding to the two flock invocations of section 706.

As another example, execution unit 704 defines a transition from build milestone "service-partial" to build milestone "service-available." As depicted, execution unit 704 includes step section 708 which includes multiple flock invocations (e.g., corresponding to two infrastructure releases) which may be executed concurrently as indicated by the designator "Parallel" depicted at 710. The execution of the flock invocations (e.g., releases) specified in section 708 may depend on skills "/PUBLIC/serviceB_complete" and ""PUBLIC/serviceC_complete) being published (e.g., being associated with a state of "INSTALLED"). Each flock invocation may be associated with one or more build flags which are to be posted upon successful execution of the release corresponding to a given flock invocation.

FIG. 8 depicts an example flock config entity 800 of an example service plan and manifest (SPAM), in accordance with at least one embodiment. The flock config entity 800 may be used to specify the particular flock configs corresponding to the releases expressed in the execution units entity 700 of FIG. 7. A given flock config section (e.g., section 802) of flock config entity 800 may indicate any suitable ID, project, flock (e.g., a flock name), phase, execution target (ET), a hash value (e.g., a gitCommitHash uniquely identifying a hash of the flock config, and one or more build flags to be posted upon successfully completing the release corresponding to a flock config corresponding to the section.

By way of example, section 802 may specify details corresponding to one flock config. For example, section 802 may specify a flock ID of "partial_service_infra," a project "ServiceA," a flock name "partial_service_infra," a phase "$ {Realm} production_service_tenancy," where "$ {Realm} is an injectable variable that is injected with current region data when recompiled in the manner described above in connection with FIG. 3. Section 802 may further specify an ET "$ {Realm} production_service_tenancy," a Git commit hash of the flock config, and one or more build flags. As depicted in FIG. 8, flock config "partial_service_infra" is associated with one build flag "serviceA_tenancy" which is associated with an infrastructure type as depicted at 804.

Any suitable number of phases may be defined for each flock within its corresponding section. Similarly, any suitable number of execution targets may be defined for each phase. Each execution target may be associated with any suitable number of execution target (ET) checkpoints defined within a given SPAM. Infrastructure checkpoints (e.g., checkpoints related to an infrastructure change) may be grouped and provided within a given section, not depicted). Similarly, application checkpoints (e.g., checkpoints related to an application change) may be grouped and provided within application checkpoint section (not depicted). In some embodiments, the SPAM including flock config entity 800 may be validated to ensure that all references included in the SPAM reference valid components (e.g., components such as flock configs that are managed by CIOS 102 of FIG. 1).

As another example, section 806 may specify details corresponding to another flock config. For example, section 806 may specify a flock ID of "full_service_infra1," a project "ServiceA," a flock name "full_service_infra1," a phase "$ {Realm} production_service_tenancy" where "$ {Realm}" is an injectable variable that is injected with current region data when recompiled in the manner described above in connection with FIG. 3. Section 806 may further specify an ET "$ {Realm} production_service_tenancy," a Git commit hash of the flock config, and one or more build flags. As depicted in FIG. 8, flock config "full_service_infra1" is associated with two build flags (e.g., "serviceA_region" and "serviceA_registration") which are associated with an infrastructure type as depicted at 810.

One of the challenges of previous build implementations is understanding what progress should happen each time a release is executed against a particular phase and change type of a flock, particularly when the phase has optional capability dependencies. For each release that the Region Orchestrator (e.g., Region Orchestrator 106 of FIG. 1) initiated in previous implementations, it was not apparent which optional capability dependencies were needed and which capabilities should be published through the release execution. The entities of FIG. 6-8 resolve this ambiguity by stating clear expectations of the capability dependencies and capability publications for each release of an execution target.

Figure 9:
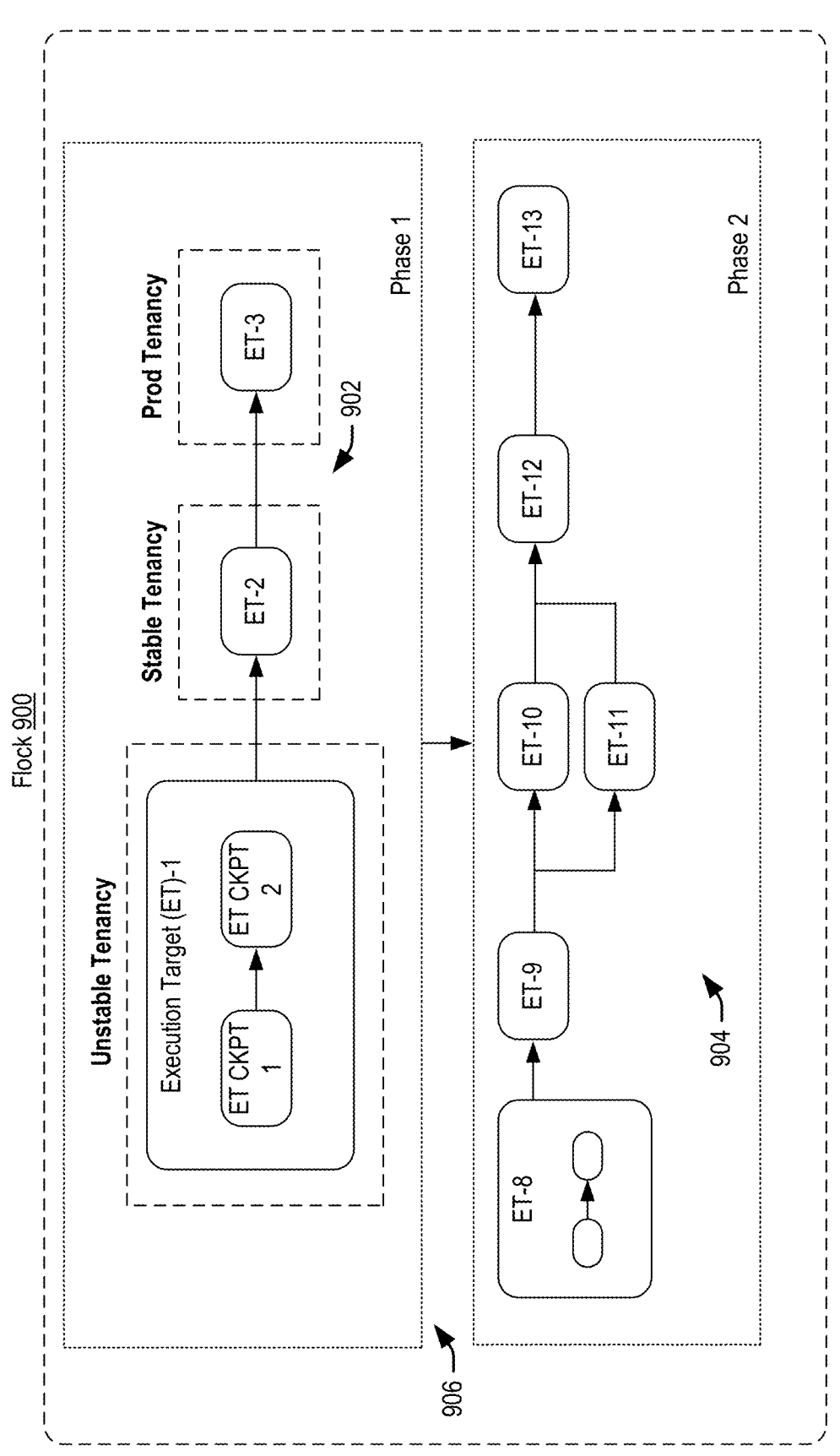
FIG. 9 is a block diagram depicting a relationship between a flock, a number of phases, a corresponding number of execution targets for each phase, and one or more execution target checkpoints of an execution target, according to at least one embodiment.

FIG. 9 is a block diagram depicting a relationship between a flock 900, a number of phases, a corresponding number of execution targets for each phase, and one or more execution target checkpoints of an execution target, according to at least one embodiment. A flock (e.g., the resources of a service) may be provisioned and deployed to multiple execution targets. Each execution target with FIG. 9 is intended to depict a different location and/or set of devices at which the flock 900 (e.g., resources corresponding to a service) is to be bootstrapped. By way of example, each execution target of FIG. 9 may depict a different data center or set of devices. For any given data center build (an example of which may be a "region build," referring to a data center build corresponding to a particular region context), a flock's resources (e.g., resources corresponding to a service) may be bootstrapped to any suitable number of execution targets. In some embodiments, bootstrapping operations for a set of execution targets may be associated with a "phase" and potentially multiple phases may be defined. Any suitable phase may be associated with a set of one or more execution targets. In some embodiments, an order by which bootstrapping operations are performed for set of execution targets (e.g., ET-1-ET-3, collectively referred to as "execution targets 902") may be defined and associated with a phase (e.g., phase 1), while another set of execution targets (e.g., ET-8-ET-13, collectively referred to as "execution targets 904") may be defined and associated with another phase (e.g., phase 2). In some embodiments, there may be a designated order by which phases are to be executed. One phase (e.g., phase 2) may be dependent on completion of the operations associated with another phase (e.g., phase 1). Similarly, one execution target (e.g., ET-2) may be dependent on operations corresponding to one or more other execution targets (e.g., ET-1) being completed. In some embodiments, a data structure (e.g., phase data structure 906) may be generated by CIOS 102 of FIG. 1 to identify a set of phases (e.g., one or more) with which bootstrapping a given service across multiple execution targets is to be executed, where each phase is associated with one or more execution targets. Any suitable number of data structures (e.g., one or more directed acyclic graphs, linked lists, or the like) may be generated for identifying a set of execution targets (e.g., execution targets 902) and an order by which bootstrapping the service across those set of execution targets is to be executed.

An execution target may be associated with a tenancy and region (e.g., unstable-tenancy/region1, stable-tenancy/region2, prod-tenancy/region3) as depicted in FIG. 9. In some embodiments, CIOS 102 of FIG. 1 may allow flocks to be modeled using many tenancies within a realm and many regions within a tenancy. However, CIOS 102 may disallow using the same region twice within a tenancy (although the same region may be utilized twice within a realm—in different tenancies). Although not depicted in FIG. 1, each of ET-8-ET13 may be associated with a corresponding tenancy and region.

Each execution target (e.g., ET-1) may be associated with one or more execution target (ET) checkpoints (e.g., ETCKPT-1 and ETCKPT-2). Phases (e.g., phase 1, phase 2, etc.), execution targets (e.g., ET-1-ET-13), execution target checkpoints may be defined and/or specified within flock config entity 800 of FIG. 8. ET checkpoints may be asso-ciated with a corresponding set of releases. ET checkpoints may be ordered (e.g., within an ordered list, or nested lists (e.g., Infra and App ordered lists), as depicted in FIG. 8) and each may represent a unit of progress of the execution target during build.

In some embodiments, Orchestrator 310 of FIG. 3 may maintain any suitable number of data structures (e.g., Build Dependency Graph 338 of FIG. 3, linked lists, directed acyclic graph(s), objects, or the like) for maintaining dependencies between flocks, phases, execution targets, execution target checkpoints, releases, and/or the like. Similarly, Orchestrator 310 may generate data structures for maintaining dependencies between build milestones, execution targets, execution target checkpoints, and/or releases.

Figure 10:
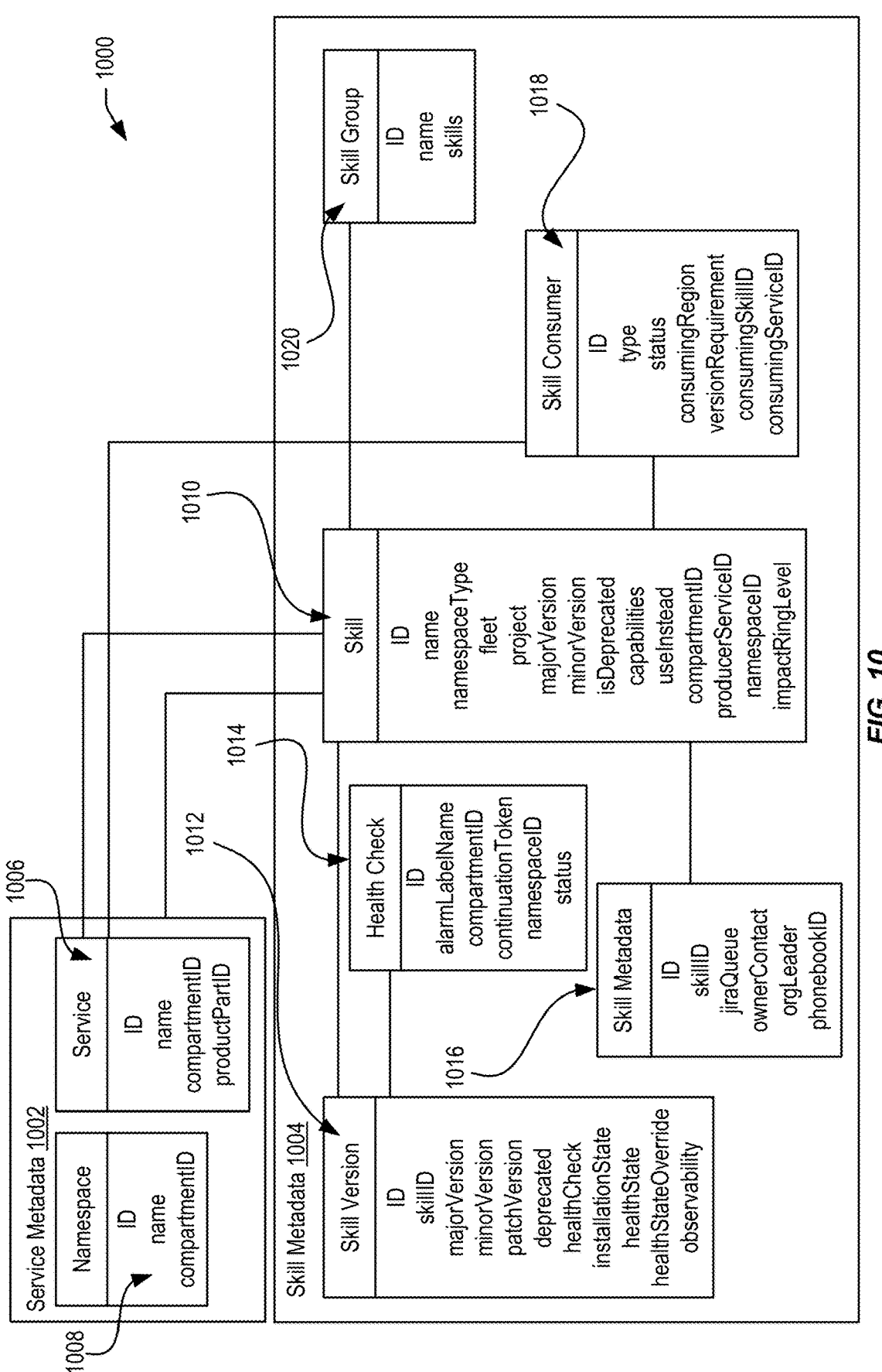
FIG. 10 is a block diagram depicting a data model representing various metadata related to a skill, in accordance with at least one embodiment.

FIG. 10 is a block diagram depicting a data model 1000 representing metadata related to a skill, in accordance with at least one embodiment. Each of the data structures depicted in FIG. 10 may include an ID (e.g., an identifier) that uniquely identifies the data structure. This ID may be used to refer to a particular instance of a particular data structure.

In some embodiments, service metadata 1002 may include any suitable data corresponding to a service. Service metadata 1002 may include any suitable attribute and corresponding value of a service, while skill metadata 1004 may similarly include any suitable attribute and corresponding value of a skill. An association between service metadata 1002 and skill metadata 1004 may indicate a relationship between a service and a skill (e.g., that the service is expected to publish the skill during build or run time). As depicted in FIG. 10, service metadata 1002 may be stored in multiple data structures (e.g., namespace data structure 1008 and service data structure 1006), although any suitable number or type of data structures may be utilized. The service metadata may include, but is not limited to, and suitable combination of ID, a service name (corresponding to a name of the service), a compartment ID (corresponding to an identifier for a compartment to which the service is to be deployed), a product part ID, a namespace ID (an identifier of a namespace associated with the service), a namespace name (a name associated with the namespace associated with the service), and/or a compartment ID corresponding to the namespace. In some embodiments, service metadata 1002 may be curated (read from memory, uploaded to Puffin Central 118 of FIG. 1, or the like). In some embodiments, service metadata 1002 may be obtained by Puffin Central 118 from another system or, generally, using a process that does not include user input of that information through any of the user interfaces provided by Puffin Central.

Skill metadata 1004 may include any suitable number of data structures (e.g., data structures 1010-420). In some embodiments, skill data structure 1010 may include attributes and values corresponding to any suitable combination of a skill ID, a skill name, a skill fleet, a major version, an isDeprecated indicator, one or more capabilities (e.g., a set of capability identifiers), a useInstead indicator, a compartment ID, a producer ID, a namespace ID, and a recovery ring level. In some embodiments, the values stored for compartment ID, producer ID, and/or namespace ID in the skill data structure 1010 may match the compartment ID, service name, or namespace name of service metadata 1002, respectively. A match between one or more of the values of these attributes may be used as an association between skill metadata 1004 and service metadata 1002 (indicating that the corresponding service is expected to publish the skill at some point).

Skill version data structure 1012 may be associated with skill data structure 1010 based at least in part on matching values of skill ID of skill version data structure 1012 and ID of skill data structure 1010. Skill version data structure 1012 may include attributes and values corresponding to any suitable combination of an ID (for a skill version), a skill ID (e.g., a unique identifier of the skill), a major version and/or a minor version that individually or collectively identify a particular implementation of the skill, a patch version (e.g., a version identifier that identifies a skill to be used to correct a previously erroneous skill version), a deprecated indicator (indicating whether the skill is deprecated or not), a health check attribute (that references one or more instances of alarm data of one or more instances of health check data structure 1014), an installation state (indicating a state of installation such as declared, selected, installing, installed, embargoed, retired, uninstalling), a health state (e.g., indicating the health of the skill such as unknown, healthy, unhealthy, etc.), and an observability attribute. The observability attribute may be used to store any suitable data identifying operations or datapoints required to gather telemetry, alarm, and/or log data for the skill version. Skill version data structure 1012 may be associated with health check data structure 1014 which may be configured to maintain any suitable number of alarm labels that is/are associated with the skill. By way of example, the health-Check attribute of skill version data structure 1012 may reference any suitable number of health check data structures corresponding to one or more instances of health check data structure 1014.

In some embodiments, the health check data structure 1014 may include any suitable combination of an alarm identifier (alarm ID, indicating a unique identifier for the alarm), an alarm label name (a name of the alarm), a compartment identifier (compartment ID, indicating a compartment to which the alarm is scoped), a continuation token (a token with which alarm transition history may be obtained), namespace identifier (namespace ID, indicating a particular namespace to which the alarm is scoped), and a status value (indicating a health status corresponding to the alarm). Alarm data corresponding to multiple alarms may be maintained in the health check data structure 1014. By way of example, alarm ID may include a list of multiple alarm IDs corresponding to a list of alarm label names stored within the alarm label name attribute. The compartment ID attribute may also be a list of compartment IDs corresponding to the alarms and labels of the alarm ID and alarm label name ID attributes of the health check data structure 1014. In some embodiments, multiple sets of attributes alarmID, alarmLabelName, compartmentID, continuationToken, and status may be stored, with each set of attributes corresponding to a single alarm.

In some embodiments, health check data structure 1014 may store data corresponding to one or more alarm service(s) (e.g., the alarm service(s) 344 of FIG. 3, the alarm service(s) 122 of FIG. 1). By way of example, the namespace identifier of health check data structure may store a namespace corresponding to a skill (e.g., corresponding to an instance of skill data structure 1010). In some embodiments, an association between a skill and an alarm may be maintained based at least in part on storing the same namespace identifier within the namespace ID attribute of an instance of the health check data structure 1014 and the namespace ID attribute of an instance of the skill data structure 1010. In some embodiments, the status attribute may store a value indicating the health of a skill and/or a status of an alarm (e.g., an alarm identified by alarmID, an alarm identified by namespaceID, etc.). In embodiments, in which status from multiple alarm services are utilized, multiple status attributes may be employed to maintain the status of each corresponding alarm (e.g., one status for an alarmID, another for a namespaceID, etc.).

Skill data structure 1010 may be associated with skill metadata data structure 1016. Skill metadata data structure 1016 may include attributes and values for any suitable combination of an ID (for an instance of the skill metadata data structure 1016), a Jira queue, an owner contact, an org leader, and a phonebook ID. A phonebook ID may be an identifier corresponding to a separate system that is configured to store contact data. Skill metadata data structure 1016 may be used to store any suitable contact data (e.g., name, email, address, phone number, etc.) for an entity (e.g., a service team member) that is associated with the skill and the service with which the skill is associated.

Skill data structure 1010 may be associated with skill consumer data structure 1018. Skill consumer data structure 1018 may include attributes and values for any suitable combination of an ID (for the skill consumer), a type, a status, a consuming region, a version requirement, a consuming skill ID, a consuming service ID. Skill consumer data structure 1018 may be configured to store any suitable information on services and/or skills which depend on the skill defined by skill metadata 1004.

Skill data structure 1010 may be associated with skill group data structure 1020. Skill group data structure may include attributes and values for any suitable combination of an ID (for the skill group), a skill group name, and a set of one or more skill IDs associated with the skill group.

Each of the data structures 1006-920 may be stored in one or more data stores and a data structure may be identified and obtained (e.g., via a lookup and/or query operation) based at least in part on a value stored in another data structure through the associations discussed above. By way of example, all skills associated with a service may be identified through a query of the data store(s) for all skill data structures that are associated with a producer ID matching the ID from service data structure 1006 of service metadata 1002.

Although a number and particular combination of data structures are presented in FIG. 10, any suitable number or type of attributes and/or values and/or data structures may be utilized. In some embodiments, data of any data structure depicted in FIG. 10 may be separated into multiple data structures or combined and stored in fewer data structures than those depicted in FIG. 10. The associations indicated between those data structures may be similar to those shown in FIG. 10, or the associations may differ. As a non-limiting example, the data depicted with data structures 1010-1020 may be similarly stored in more or fewer data structures. By way of example, the data depicted within data structures 1010-1020 may be provided in a single data structure in some embodiments.

Each data structure of FIG. 10 may be associated with other data structures of FIG. 10 based at least in part on referencing an identifier of one or more other data structures. By way of example, an instance of skill version data structure 1012 may be associated with a particular instance of skill data structure 1010 based at least in part on having a value for the skillID attribute of the skill version data structure 1012 that matches the value of the ID attribute of the particular instance of the skill data structure 1010. As another example, a skill consumer data structure 1018 may be associated with a skill based on referencing the ID of the skill data structure 1010 within its consumingSkillID attribute. As another example, an instance of skill group data structure 1020 may be associated with one or more instances of the skill data structure 1010 based on referencing the IDs of those skills with its skills attribute. As yet another example, skill version data structure 1012 may reference one or more instances of health check data structure 1014 based at least in part on references the IDs of those health check data structures within its healthCheck attribute. An instance of the skill data structure 1010 may be associated with a particular service based at least in part on referencing the ID of the service data structure 1006 corresponding to the service via its producerServiceID attribute.

Any suitable number of instances of skill metadata 1004 (corresponding to individual skills) may be associated with a single instance of service metadata 1002 and may be used to represent a process of deploying the service in which the order of deployment tasks is represented via the instances of skill metadata 1004. Each skill corresponding to an instance of skill metadata 1004 for a service may be tracked, updated, or otherwise analyzed to present information regarding the deployment process for the service, to drive deployment of the service, to validate a build plan or the Build Plan 338 of FIG. 3, or the like.

Figure 11:
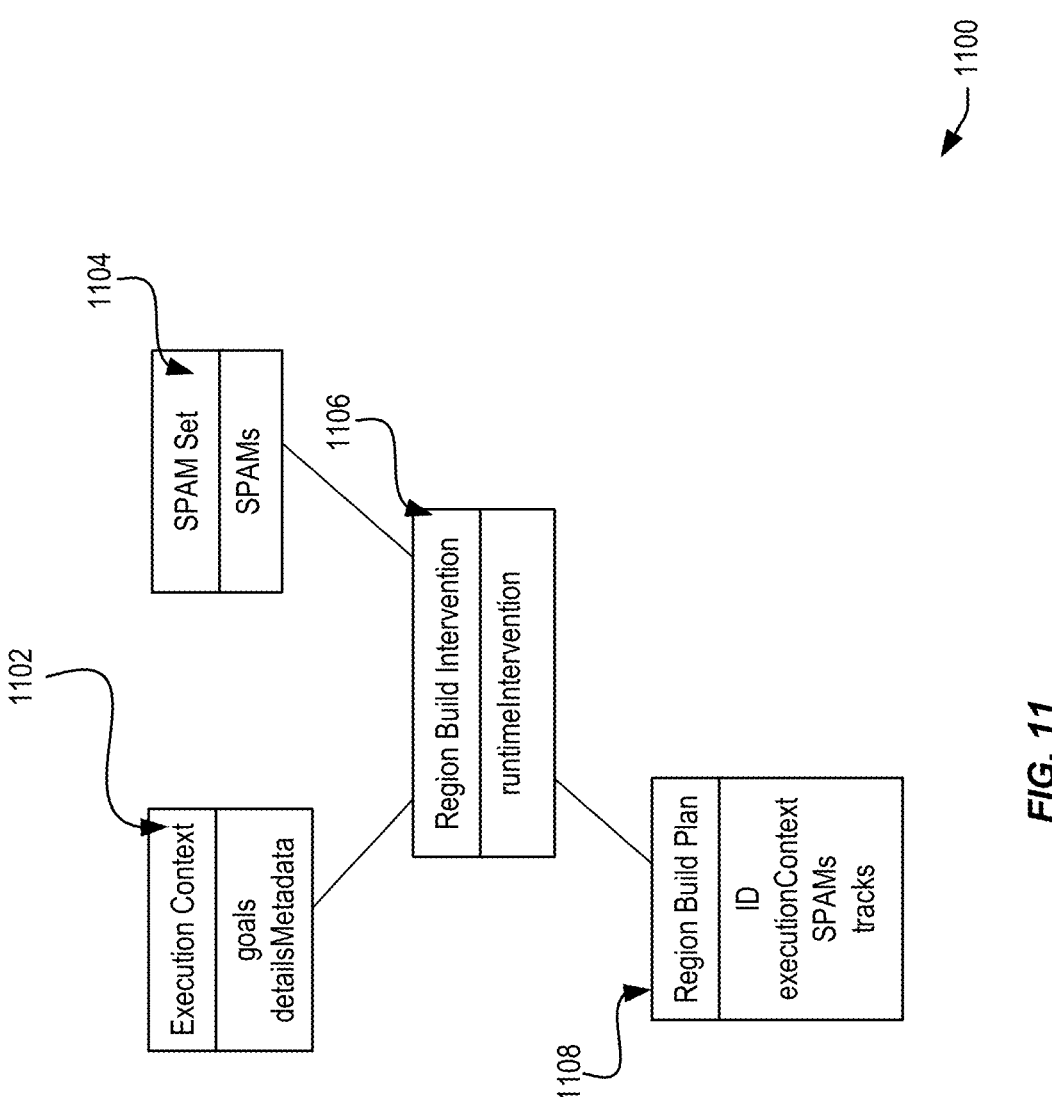
FIG. 11 is a block diagram depicting a data model representing various metadata related to a region build plan, in accordance with at least one embodiment.

FIG. 11 is a block diagram depicting a data model 1100 representing various metadata related to a region build plan, in accordance with at least one embodiment. Data model 1100 may include data structures 1102-1108.

Execution context data structure 1102 may include any suitable attributes corresponding to execution context such as one or more goals and/or details metadata as depicted in FIG. 11. By way of example, execution context data structure 1102 may store (e.g., within detailsMetadata) environment type, execution overrides, state overrides, and data indicating planned concurrency. Environment type (e.g., REGION_BUILD) may define the type of build and one or more guardrails. Execution overrides (e.g., SpamX: HALT_ON_ERROR, SpamY: HALT_BEFORE_RELEASE) may be used to deviate from normal automated modes for sub-sections of the build process. State overrides (e.g., skillHealth [skillX]=HEALTHY) may be used to overcome untrustworthy data or to support optimistic efforts. Planned concurrency data may define planned concurrencies for the build plan which may be used to configure a planning module to map necessary actions into tracks. Expected values may include a maximum concurrency value (e.g., MAX, 1, 5, etc.) that identifies a degree of allowed concurrency. By way of example, a value of "MAX" may indicate that a maximum default amount of concurrency (e.g., 10 threads at a time) may be employed during the build, while a value of "1" may be used to indicate that build execution should be executed serially. Actual release concurrency may be governed by the runtime setting of a Region Orchestrator (e.g., Region Orchestrator 106 of FIG. 1) which may limit the number of concurrent releases globally and/or by SPAM.

SPAM set data structure 1104 may include any suitable number of identifiers (e.g., SpamX: 1.0.1, SpamY: 1.2.1, SpamZ: 2.1.1, etc.) identifying any suitable number of SPAMs. These identifiers may be any suitable ID or spam-Name referenced in any suitable number of SPAM identity data structures (e.g., data structure 402 of FIG. 4) and/or SPAM data structure 404 of FIG. 4. The SPAM set data structure 1104 may identify the set of SPAMs (and through association with specific identifiers) the specific versions of those SPAMs to be used for a region build.

Region build intervention data structure 1106 may include any suitable attributes and values corresponding to one or more runtime interventions. By way of example, the attribute runtimeIntervention may include a list of runtime interventions. An example set of interventions is provided in further detail below in connection with FIG. 20. An intervention may be pushed to a region plan executor at any time (e.g., via the Orchestrator Control Plane 107 of FIG. 1). These may be changes which modify execution of the current region build plan, or a new region build plan to replace the existing one. An intervention may pause execution of one or more (or all) tracks and/or to stop state changes from occurring while debugging is happening or while a new plan update is being authored. While execution is paused, no new actions will be taken, but ongoing external actions may continue to be monitored (e.g., releases may not be stopped, but the changes in state resulting from those releases may not be reflected (e.g., via one or more user interfaces, etc.) until after execution is un-paused.

Region build data structure 1108 may include any suitable attributes and values corresponding to a region build plan such as an identifier (e.g., "ID") that uniquely identifies the region build plan, an execution context (e.g., data corresponding to the execution context data structure 1102), a set of SPAMs (e.g., data corresponding to the SPAM set data structure 1104), and a set of one or more tracks.

A region build data structure 1108 may store a region build plan which may be a detailed graph of execution. A region build plan may be represented as a set of tracks each with a sequence of steps. Each step may be an action the region orchestrator takes that affects the current execution state and possibly external systems. When a region build plan is provided to the region orchestrator it may have an initial track (when starting a new plan) or "intervention" (when updating an existing plan) which contains the steps needed to transition into the new plan.

Each track may be a linear sequence of steps. In some embodiments, one step is current within a track at a time. Tracks may be defined by execution units, by the needs of flow control, or as part of an intervention. For execution units, the steps of the workflow may correspond to the steps within the track. In some embodiments, a planner component of the system may flow control tracks based at least in part on the topological sort of the dependencies in order to invoke execution units when their preconditions will be met. Region build plan execution may begin with the initial track, which will start additional tracks based on how much concurrency is possible and permitted (e.g., based at least in part on the executionContext associated with the region build plan). A region build plan may be considered to be completed when all tracks have been executed. If a track is stuck (e.g., due to a release failing and exhausting retries), then the operator may be signaled (e.g., via a notification, an email, a user interface, or the like) and an intervention may be utilized to complete the plan. Depending on the execution context settings, other work that is not dependent on that release may continue.

Figure 12:
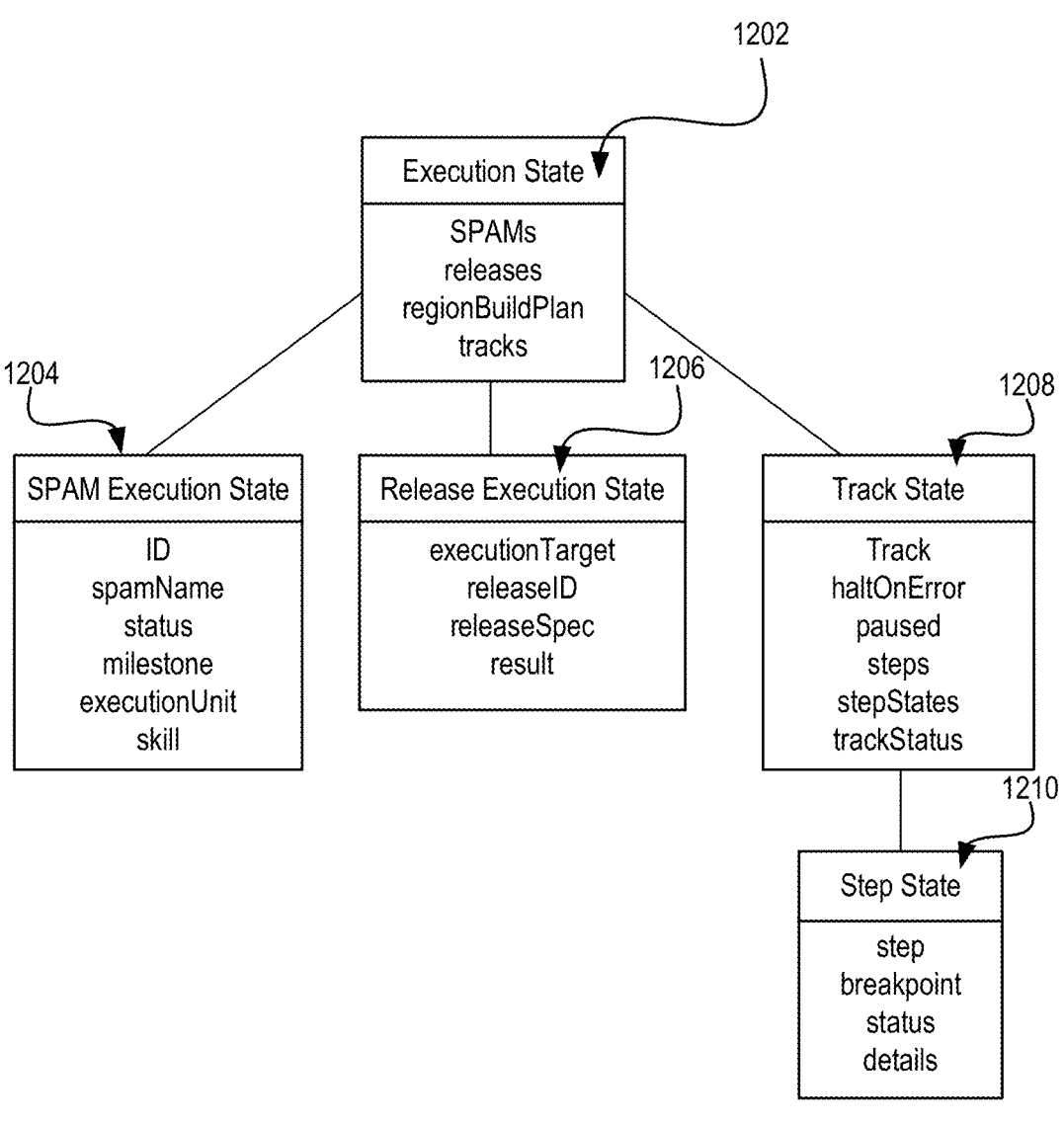
FIG. 12 is a block diagram depicting a data model representing various metadata related to maintaining an orchestration state corresponding to building a data center (e.g., a data center of a region, also referred to as a "region build"), in accordance with at least one embodiment.

FIG. 12 is a block diagram depicting a data model 1200 representing various metadata related to maintaining an orchestration state corresponding to building a data center (e.g., a data center of a region, also referred to as a "region build"), in accordance with at least one embodiment.

Data model 1200 may include data structures 1202-1210 which individually maintain state of one or more components of a given execution (e.g., an instance of a region build). By way of example, execution state data structure 1202 may include a list of SPAMs, a list of releases, the region build plan (e.g., an instance of the region build plan identified as part of region build plan data structure 1108 of FIG. 11), and a set of tracks (e.g., the tracks corresponding to the region build plan).

For each SPAM of a region build, an instance of SPAM execution state data structure 1204 may be maintained to store the execution state of the SPAM. The execution state may include any suitable combination of ID and/or spam-Name (e.g., the ID and/or spamName corresponding to FIG. 4) and a status. In some embodiments, a currently milestone (e.g., "milestone") and a current execution unit (e.g., "executionUnit") may be maintained within SPAM execution state data structure 1204.

For each release of a region build, an execution state may be maintained in an instance of release execution state data structure 1206. In some embodiments, the release execution state data structure 1206 may include any suitable combination of an execution target (ET) (e.g., "executionTarget") that identifies an execution target to which the release is expected to be applied, a release ID (e.g., "releaseID") that uniquely identifies the release, a release specification (e.g., "releaseSpec"), and a result (e.g., "result") which indicates the release is pending, successful, has failed, or the like.

For each track of a region build plan, the track state may be maintained in an instance of track state data structure 1208. The track state data structure may include any suitable combination of an identifier for the track (e.g., a value corresponding to attribute "Track"), a halt on error setting (e.g., "haltOnError"), a paused setting (e.g., "paused") which may indicate whether the track is paused, a set of steps (e.g., "steps"), a step state (e.g., "stepStates") indicating a corresponding status for each of the set of steps, and a track status (e.g., "trackStatus") that indicates an overall status of the track. In some embodiments, the step states attribute may include any suitable number of instances of the step state data structure 1210 or identifiers individually corresponding to an instance of the step state data structure 1210. An example set of track states and transitions is provided in further detail in connection with FIG. 17.

For each step of a track, a step state may be maintained in an instance of step state data structure 1210. The step state data structure 1210 may include any suitable combination of a step identifier (e.g., "step," that corresponds to one of the steps identified in track state data structure 1208), a break-point (e.g., "breakpoint"), a status, and any suitable meta-data corresponding to the step (e.g., "details"). A "step" may represent an atomic unit of execution along the path of execution—this may be executing a release (within a retry clause), guarding based on skill installation state and health (to wait to start a release or other action until dependencies are healthy), starting or waiting for other tracks to complete, or the like. Each step may be identified by a step ID (e.g., "step") and is how the current execution status of the tracks may be ascertained/known. A set of example step types are described in further detail with respect to FIG. 20.

Figure 13:
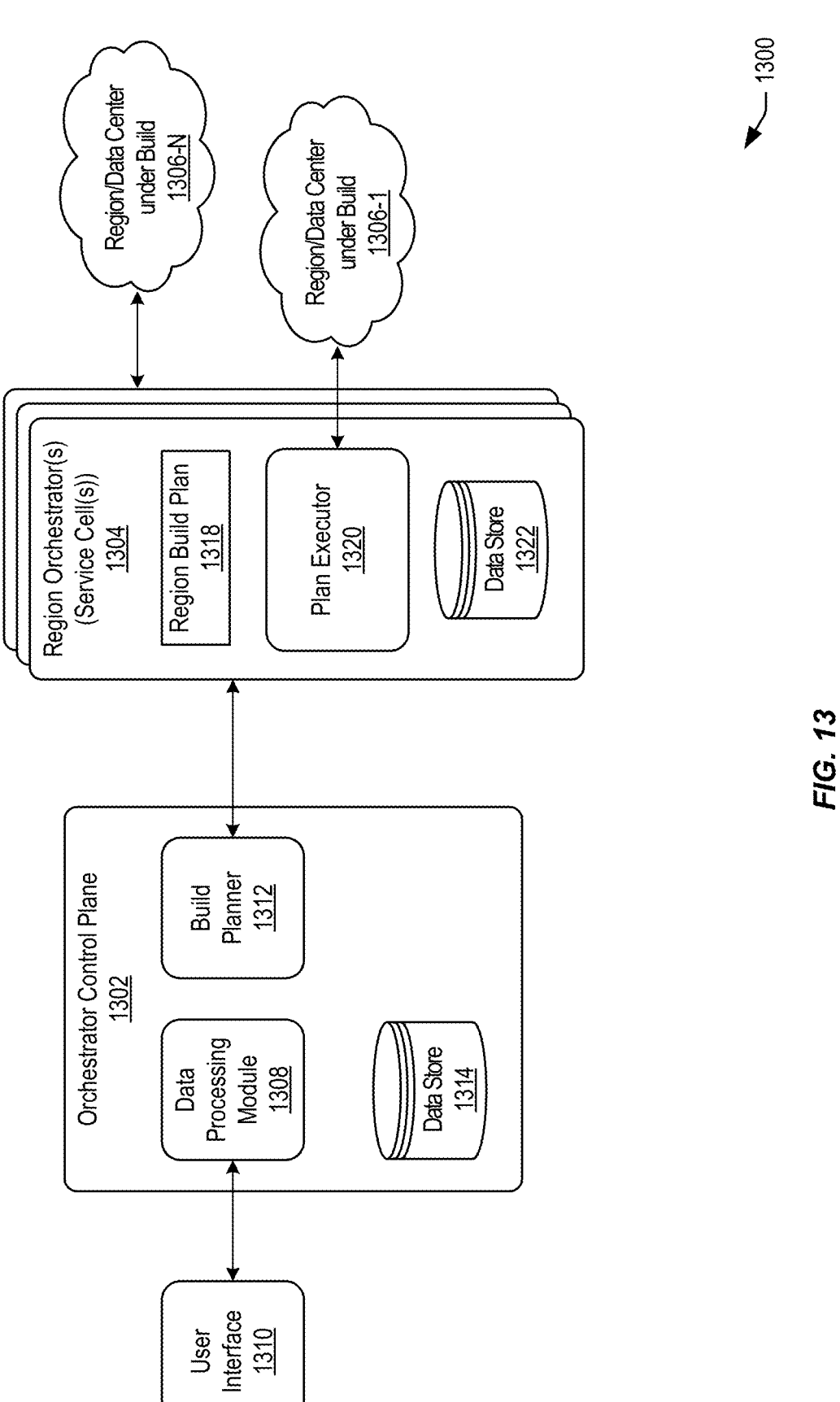
FIG. 13 is a block diagram depicting an example computer architecture including components that are configured to build a data center in an automated fashion, in accordance with at least one embodiment.

FIG. 13 is a block diagram depicting an example computer architecture 1300 including components that are configured to build a data center in an automated fashion, in accordance with at least one embodiment. Architecture 1300 may include Orchestrator Control Plane 1302 (an example of the Orchestrator Control Plane 107 of FIG. 1) and Region Orchestrator(s) 1304 (each, an example of the Region Orchestrator 106 of FIG. 1). Each of the region orchestrator(s) 1304 may individually operate in a corresponding service cell (e.g., an isolated computing environment isolated from other service cells). In some embodiments, each region orchestrator of a service cell may be configured to execute a region/data center build of a corresponding region (e.g., region/data center build 1306-1, region/data center build 1306-N, etc.).

Orchestrator Control Plane 1302 may include data processing module 1306. Data processing module 1308 may be configured to receive and transmit data from/to user interface 1310. User interface 1310 may be an example of the user interfaces 1400-1900 discussed in further detail in connection with FIGS. 14-19. Data processing module 1306 may be configured to receive any suitable user input provided via user interface 1310 and/or provide any suitable data to be presented via user interface 1310.

In some embodiments, perhaps in response to receiving user input (e.g., user input indicating a region build start request including a SPAM set and/or a set of identified services to be built as part of a region build), the functionality of the build planner 1312 (a component of the orchestrator control plane 1302) may be invoked. In some embodiments, the build planner 1312 may be configured to generate a region build plan (e.g., a set of tracks, each track including a set of steps as discussed in connection with region build plan data structure 1108 of FIG. 11) based at least in part on the SPAM set identified. In some embodiments, build planner 1312 may retrieve any suitable number of SPAMs from data store 1314 (an example of the SPAM store 312 of FIG. 3) with which the region build plan may be generated. Generating the region build plan may include parsing any suitable number of SPAMs of the SPAM set and generating an ordered list of execution tracks and corresponding steps based at least in part on the build milestones, execution units, and flock configs identified within each SPAM as well as internal and/or external skill dependencies specified within the SPAMs. Internal skill dependencies may refer to skills on which a given service publishes/updates and internally depends, while external skill dependencies refer to skills that are published/updated by other services, but on which a given service depends.

Region build plan 1316 may be an example of a region build plan generated by build planner 1312. In some embodiments, Orchestrator Control Plane 1302 may be configured to transmit region build plan 1318 to a Region Orchestrator (e.g., one of Region Orchestrator(s) 1302, corresponding to a service cell associated with a region to be built using the region build plan).

In some embodiments, each Region Orchestrator (e.g., Region Orchestrator(s) 1304) may include a plan executor 1320. Region build plan 1318 may be received by plan executor 1320 and stored in data store 1322 for subsequent use. Plan executor 1320 may be a computing component that is configured with program code to execute the steps of a region build plan (e.g., region build plan 1318). By way of example, plan executor 1320 may transmit instructions for performing any suitable number of releases to an instance of CIOS Central (e.g., CIOS Central 108 of FIG. 1, not depicted here in FIG. 13) to effectuate any suitable number of infrastructure and/or application releases according to the tracks/steps of the region build plan 1318.

Figure 14:
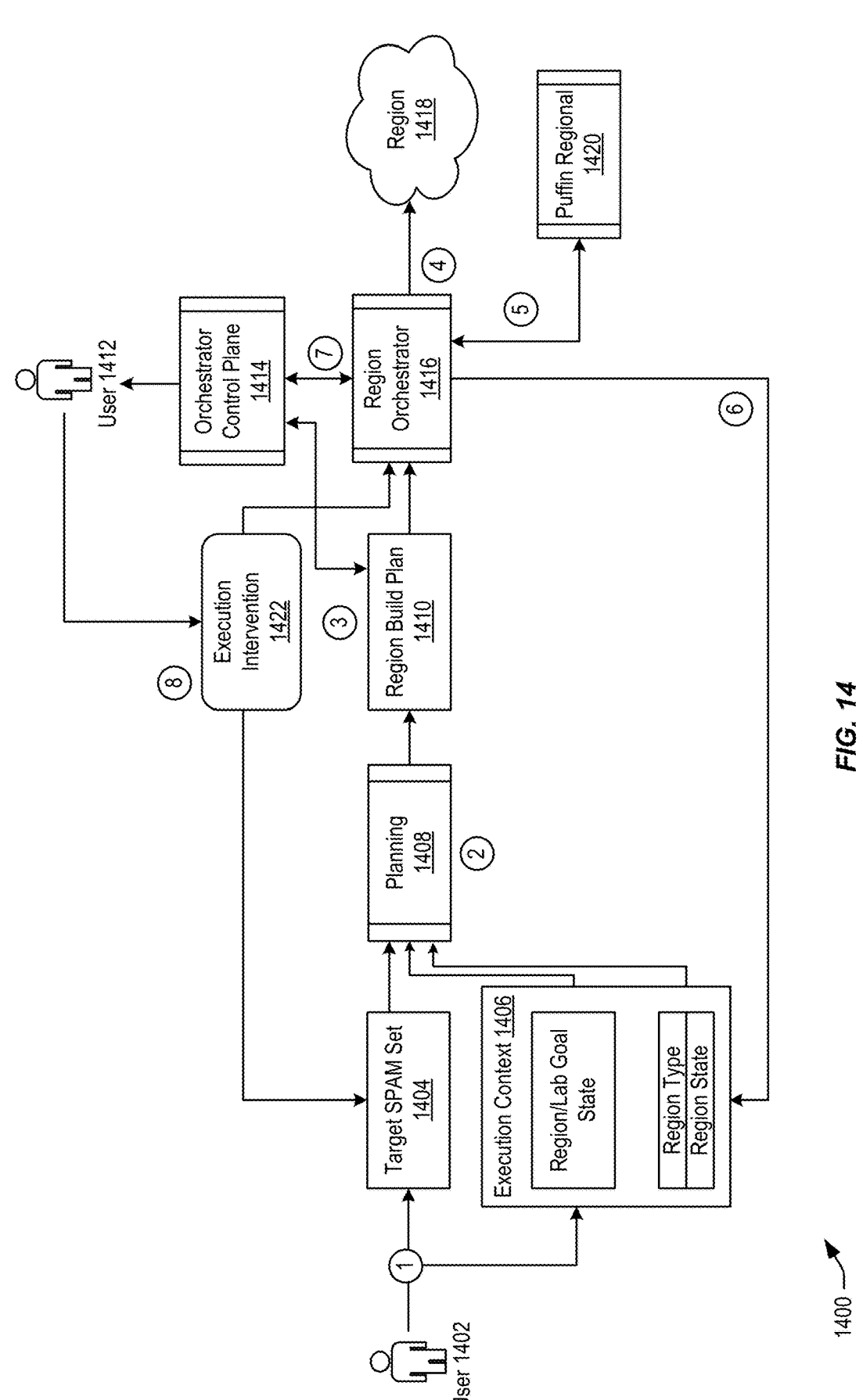
FIG. 14 is a block diagram illustrating a method of orchestrating a region build (e.g., a data center build), in accordance with at least one embodiment.

FIG. 14 is a block diagram depicting an overview of a method 1400 for orchestrating a region build (e.g., a data center build), in accordance with at least one embodiment. The method 1400 may be performed by any suitable combination of the components of CIOS 102 of FIG. 1. More or fewer operations may be included in the method 1400 and these operations may be performed in any suitable order.

At step 1, user 1402 (e.g., a region build operator, a service team member, a test operator, etc.) may utilize any suitable user interface (e.g., user interfaces managed by Orchestrator Control Plane 107 of FIG. 1) to set up a region build. In some embodiments, setting up the region build may include defining a target set of SPAMs (e.g., target SPAM set 1404) to install to a target region (or a lab region. The target SPAM set 1404 may correspond to SPAM set data structure 1104 and may include any suitable number of identifiers (e.g., SpamX: 1.0.1, Spam Y: 1.2.1, SpamZ: 2.1.1, etc.) identifying any suitable number of SPAMs. These identifiers may be any suitable ID or spamName referenced in any suitable number of SPAM identity data structures (e.g., data structure 402 of FIG. 4) and/or SPAM data structure 404 of FIG. 4. The user 1402 may further specify execution context 1406 which may be provided with the target SPAM set as input to a planning component (e.g., build planner 1312 of FIG. 13) for planning 1408. The execution context 1406 may correspond to execution context data structure 1102 and may include any suitable number of goals or details metadata as depicted in FIG. 11 above. The execution context may include any suitable combination of environment type (e.g., "REGION_BUILD"), execution overrides (e.g., SpamX: HALT_ON_ERROR, SpamY: HALT_BEFORE_RE-LEASE), state overrides (e.g., skillHealth [skillX]= HEALTHY), and data indicating planned concurrency (e.g., a maximum concurrency value (e.g., MAX, 1, 5, etc.) that identifies a degree of allowed concurrency).

At step 2, planning 1408 may be performed during which the planning component (e.g., build planner 1312) may generate region build plan 1410, an example of build plan 338 of FIG. 3, region build plan 1318 of FIG. 13, etc. The region build plan may be generated based at least in part on parsing the target SPAM set 1404. A process for generating the region build plan 1410 is discussed in further detail below in connection with FIG. 15.

At step 3, the region build plan 1410 may be presented to a user (e.g., user 1412, the same or different user than user 1402). User 1412 may view the region build plan via any suitable user interface (e.g., a user interface managed by Orchestrator Control Plane 1414 (an example of the Orchestrator Control Plane 1302 of FIG. 13). The user 1412 may be provided the option to approve the region build plan 1410 through the same user interface. If the build plan is not approved, the region build may not be performed. If approved, the method may proceed to step 4 based at least in part on the Orchestrator Control Plane 1414 instructing Region Orchestrator 1416 (an example of the Region Orchestrator 1304 of FIG. 13) to perform the build using the region build plan 1410.

At step 4, the Region Orchestrator 1416 (e.g., the plan executor 1320 of FIG. 13) may execute any suitable number of releases to build the region 1418 (e.g., target region 114 of FIG. 1). A process for building the region is discussed in further detail in connection with FIG. 16 below. Region Orchestrator 1416 may surface details regarding executing the region build plan 1410 via any suitable interface managed by the Orchestrator Control Plane 1414. This may enable user 1404 to view the status of the build for region 1418 on an ongoing basis.

At step 5, the Region Orchestrator 1416 may communicate with Puffin Regional 1420 (an example of Puffin Regional 120 of FIG. 1) to monitor the health of skills to identify when execution unit dependencies have been met. As dependencies are met, additional releases may be executed in the region 1418 in accordance with the region build plan 1410. Region Orchestrator 1416 records the installation state of skills as the plan is executed (transition-ing skills from REGISTERED to SELECTED/UNSE-LECTED and then to INSTALLING/INSTALLED as applicable).

At step 6, the Region Orchestrator 1416 may update the region state based at least in part on tracking the state of orchestration using the data structures 1202-1210 of FIG. 12. As the build is performed, Region Orchestrator 1416 may update SPAM execution states, release execution states, track states, step states and the like, each of which may be surfaced to a user interface (e.g., a dashboard) managed by the Orchestrator Control Plane 1414.

If intervention is necessary (e.g., a track has halted, because an update is needed, etc.), the user 1412 may initiate an intervention at step 8, via one or more user interfaces managed by the Orchestrator Control Plane 1414. The Region Build Plan 1410 may include explicit steps to be taken to build the region 1418. Interventions (e.g., execution intervention 1422) may modify execution as needed to address changing requirements or repair problems. An intervention may include loading a new SPAM (e.g., a new version of a SPAM) to the target SPAM set 1404 and replanning using the updated set to generate an updated version of the region build plan 1410. The Region Orchestrator 1416 may be instructed to proceed with the updated region build plan from where it left off in the previous version. An example flow for performing an intervention is discussed in further detail with respect to FIG. 21.

Figure 15:
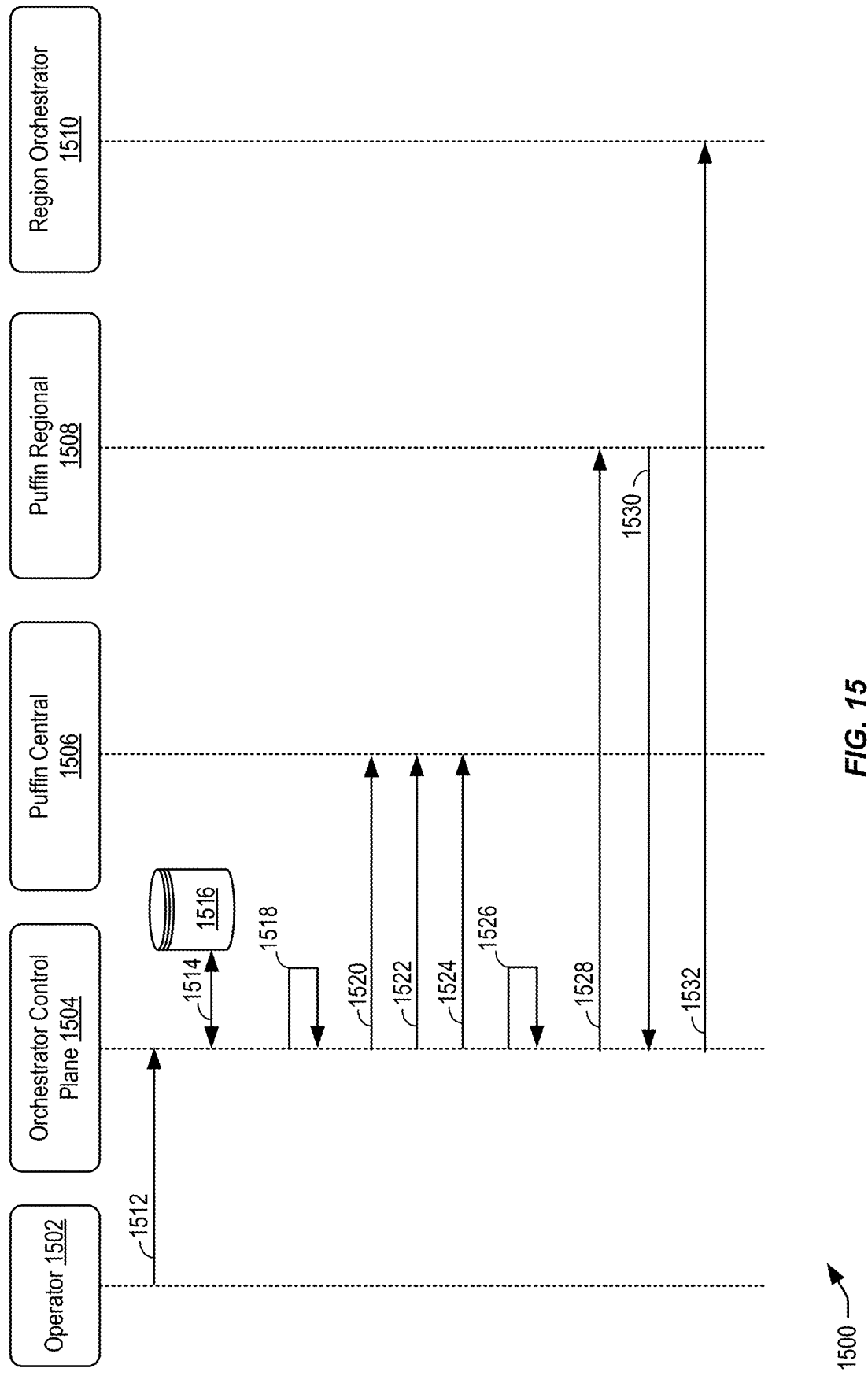
FIG. 15 is a flow diagram depicting an example method for computing a region build plan, in accordance with at least one embodiment.

FIG. 15 is a flow diagram depicting an example method 1500 for computing a region build plan, in accordance with at least one embodiment. The method 1500 may be performed by any suitable combination of the components of CIOS 102 of FIG. 1. As depicted, the method 1500 may be performed using a combination of the Orchestrator Control Plane 1504 (e.g., Orchestrator Control Plane 107 of FIG. 1), Puffin Central 1506 (e.g., Puffin Central 118 of FIG. 1), Puffin Regional 1508 (e.g., Puffin Regional 120 of FIG. 1), and Region Orchestrator 1510 (e.g., an example of Region Orchestrator 106 of FIG. 1). More or fewer operations may be included in the method 1500 and these operations may be performed in any suitable order.

At 1512, operator 1502 may initiate a region build (or test build) via one or more user interfaces managed by Orchestrator Control Plane 1504. This selection may generally correspond to step 1 of FIG. 14. As part of selecting the option to initiate a region build, the operation 1502 may designate or otherwise select a target SPAM set.

At 1514, Orchestrator Control Plane 1504 (e.g., build planner 1312 of FIG. 13) may obtain the one or more SPAMs of the target SPAM set identified at 1512. In some embodiments, the SPAMs may be obtained from data store 1516 (e.g., SPAM store 312 of FIG. 3).

At 1518, Orchestrator Control Plane 1504 (e.g., build planner 1312 of FIG. 13) may generate a region build plan (e.g., build plan 338 of FIG. 3). In some embodiments, generating the region build plan may include parsing each of the SPAMs of the target SPAM set to identify build milestones (each an example of the build milestone entity 600 of FIG. 6), execution units (each an example of the execution unit entity 700 of FIG. 7, and flock configs (each an example of the flock config entity 800 of FIG. 8). In some embodiments, dependencies between execution units and/or build milestones may be identified to determine a deterministic order by which releases are to be conducted. In some embodiments, each SPAM may include one or more tracks, each track having one or more steps. An example track with example steps is provided in connection with FIG. 21.

At 1520, Orchestrator Control Plane 1504 (e.g., build planner 1312 of FIG. 13) may validate all skills identified within the target SPAM set are registered with Puffin Central 1506. If skills are identified in one or more SPAMs of the target SPAM set which are not registered with Puffin Central 1506, the request to initiate the region build may fail and the operator 1502 may be notified via one or more user interfaces. If each of the skills references in the SPAMs has previously been registered with Puffin Central 1506, the method 1500 may proceed to 1522.

At 1522, Orchestrator Control Plane 1504 (e.g., build planner 1312 of FIG. 13) may validate all skill consumers identified within the target SPAM set match the planned skill consumers previously identified by service teams via the Puffin Service. This may include checking that the skill consumers identified within the target SPAM set match a set of consumers stored by Puffin Central 1506. If the skill consumers identified within the target SPAM set do not match the skill consumers known to Puffin Central 1506, the request to initiate the region build may fail and the operator 1502 may be notified via one or more user interfaces. If each of the skills consumers identified in the SPAMs match the skill consumers known to Puffin Central 1506, the method 1500 may proceed to 1524.

At 1524, Orchestrator Control Plane 1504 (e.g., build planner 1312 of FIG. 13) may validate all skill producers identified within the target SPAM set match the planned skill producers previously identified by service teams via the Puffin Service. This may include checking that the skill producers identified within the target SPAM set match a set of producers stored by Puffin Central 1506. If the skill producers identified within the target SPAM set do not match the skill producers known to Puffin Central 1506, the request to initiate the region build may fail and the operator 1502 may be notified via one or more user interfaces. If each of the skills producers identified in the SPAMs match the skill producers known to Puffin Central 1506, the method 1500 may proceed to 1526.

At 1526, Orchestrator Control Plane 1504 may compute a region context descriptor. This region context descriptor may include any suitable combination of a region context for the region to be built, a set of skills to clone and/or import (each being associated with a "SELECTED" or "UNSELECTED" value), or the like.

At 1528, Orchestrator Control Plane 1504 may register the region context with Puffin Regional 1508. This may include informing Puffin Regional 1508 of the set of skills that are to be used for the region build. If each of the skills are known, Puffin Regional 1508 may return a value indicating that the skills are ready. If at least one skill is not known to Puffin Regional 1508, a value may be returned that indicates the skill(s) are unknown and the request to initiate the region build may fail.

At 1532, Orchestrator Control Plane 1504 may instruct Region Orchestrator 1510 to begin orchestration. This may trigger the execution of method 1600 of FIG. 16, discussed in more detail below.

Figure 16:
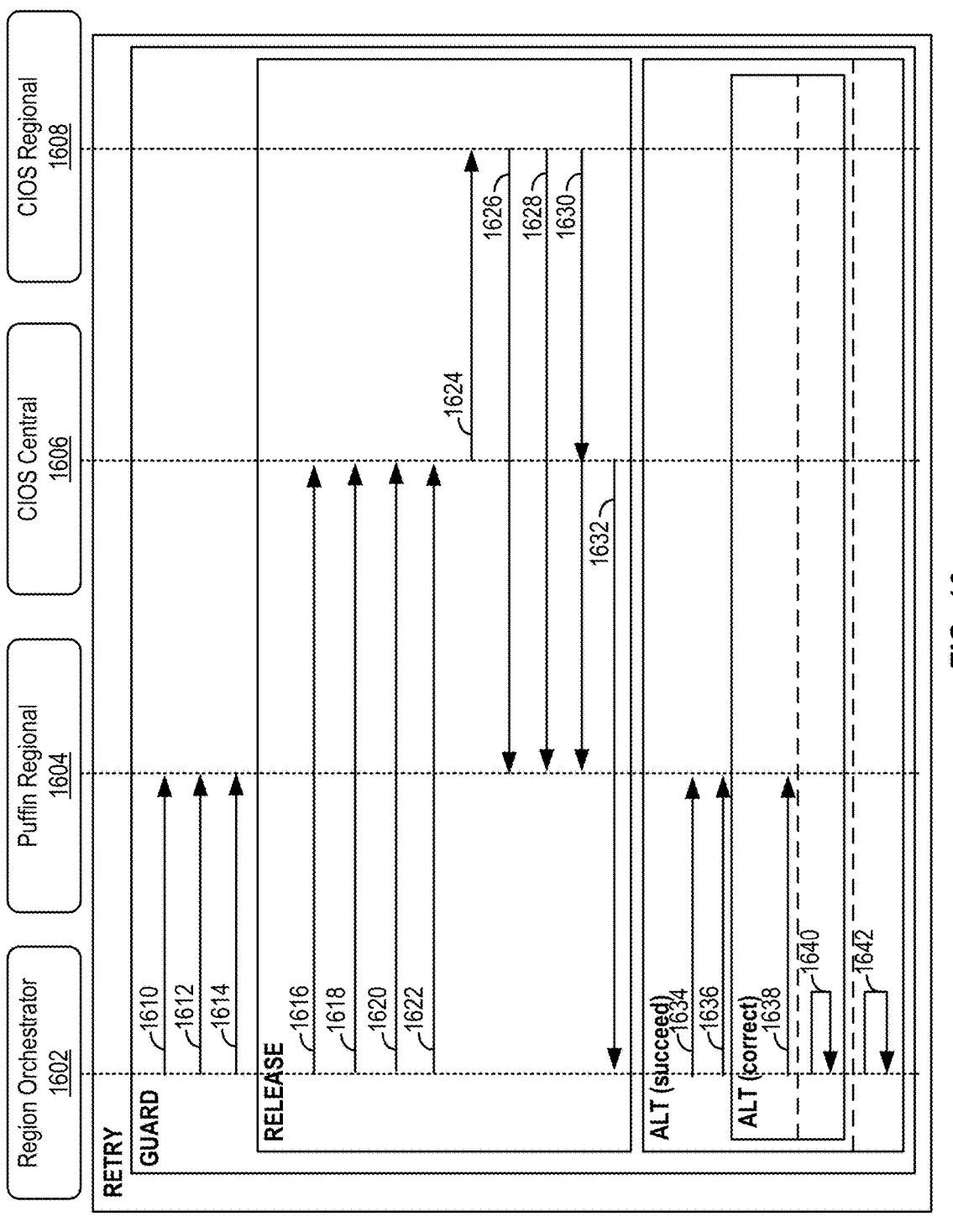
FIG. 16 is a flow diagram depicting an example method for orchestrating a region build plan, in accordance with at least one embodiment.

FIG. 16 is a flow diagram depicting an example method 1600 for orchestrating a region build plan, in accordance with at least one embodiment. The method 1600 may be performed by any suitable combination of the components of CIOS 102 of FIG. 1. As depicted, the method 1600 may be performed using a combination of the Region Orchestrator 1602 (e.g., Region Orchestrator 106 of FIG. 1), Puffin Regional 1604 (e.g., Puffin Regional 120 of FIG. 1), CIOS Central 1606 (e.g., CIOS Central 108 of FIG. 1), and CIOS Regional 1608 (e.g., CIOS Regional 110 of FIG. 1). More or fewer operations may be included in the method 1600 and these operations may be performed in any suitable order. The method 1600 may be repeated for each execution unit of a region build plan.

The method 1600 may begin at 1610, where installed skill preconditions for the execution unit are asserted by the Region Orchestrator 1602. In some embodiments, this may include transmitting a list of skills (in accordance with a "guard" step type) for which installation is a precondition for creating a release.

At 1612, the Region Orchestrator 1602 may wait until precondition skills are in a state of HEALTHY. At 1614, once a skill that is a precondition for a release is HEALTHY, Region Orchestrator 1602 may begin polling Puffin Regional 1604 periodically for status changes in that skill. If the skill becomes UNHEALTHY prior to 1622, the release may not be executed.

At 1616, Region Orchestrator 1602 may perform operations to create a release. This may include sending instructions to CIOS Central 1606 that identify any suitable combination of a project, a phase, an execution target, and/or a flock config corresponding to the release to be created.

At 1618, Region Orchestrator 1602 may perform operations to plan a release. This may include executing an application programming interface to instruct CIOS Central 1606 to plan the release. As part of planning the release, CIOS Central 1606 may present information identifying details of the release for display.

At 1620, Region Orchestrator 1602 may perform operations to approve the planned release. This may include executing an application programming interface to indicate to CIOS Central 1606 that the planned release has been approved. As part of approving the release, CIOS Central 1606 may present information indicating that the release has been approved.

At 1622, Region Orchestrator 1602 may perform operations to execute the approved release. This may include executing an application programming interface to instruct CIOS Central 1606 to execute the release. As part of planning the release, CIOS Central 1606 may present information indicating that the release is being executed.

In response to receiving the instructions at 1624, CIOS Central 1606 may perform operations to instruct CIOS Regional 1608 to execute the approved release. CIOS Regional 1608 may perform any suitable operations for performing infrastructure provisioning and/or application deployment in accordance with the data identified for the release. Upon a successfully executed release, CIOS Regional 1608 may perform operations for updating the skill consumers states at 1626. This may include transmitting data to Puffin Regional 1604 to update any suitable combination of the attributes values corresponding to the skill consumer data structure 1018 of FIG. 10.

At 1628, CIOS Regional 1608 may perform any suitable operations for updating skill version states corresponding to the skills that were published due to successful execution of the release. This may include transmitting any suitable data to Puffin Regional 1604 to update any suitable combination of the attribute values corresponding to the skill version data structure 1012 of FIG. 10. By way of example, the installationState and/or healthState corresponding to skills published through execution of the release may be updated.

At 1630, CIOS Regional 1608 may update Puffin Regional 1604 and CIOS Central 1606 with data indicating the result of the release (e.g., successful/unsuccessful).

At 1632, CIOS Central 1606 may transmit data notifying Region Orchestrator 1602 of the result of the release (e.g., successful or unsuccessful).

If the release was successfully executed, the method 1600 may proceed to 1634 where Regional Orchestrator 1602 may check the skill consumer state. This may include transmitting a request to Puffin Regional 1604 for status of skill consumers. At 1636, Regional Orchestrator 1602 may similarly check for status of the skill version state based at least in part on transmitting a request to Puffin Regional 1604.

If the skill consumer and skill version states are as expected, Region Orchestrator 1602 may transmit instructions to Puffin Regional 1604 to remove said updates at 1638. Alternatively, Region Orchestrator 1602 may execute operations to halt the execution of the current track for which the release applies.

If the release failed, the method 1600 may proceed from 1632 to 1642, where Region Orchestrator 1602 may read the precondition skill's health and either retry the release or halt. The decision of whether the retry or halt may be based at least in part on a predefined retry policy corresponding to the release.

FIG. 17 is a block diagram depicting an example lifecycle 1700 for a track, in accordance with at least one embodiment. Lifecycle 1700 may include any suitable number of states. As depicted, lifecycle 1700 includes states such as future, run, halt, wait, and complete. The states of lifecycle 1700 may correspond to the track state data structure 1208 of FIG. 12, specifically, the trackStatus attribute of the track state data structure 1208.

Example track statuses may include, but are not limited to, "future" (e.g., not yet started), "run" (e.g., currently running), "halt_error" (e.g., halted due to terminal error such as a guard assertion failed or a release failed, and/or is out of retries), "halt_break" (e.g., halted due to breakpoint set). "wait_retry" (e.g., step is waiting between attempts where a prior attempt has failed), "wait_skill" (e.g., waiting for a skill to be installed or to become healthy), "wait_join" (e.g., waiting on a join after a fork step), "wait_concurrency" (e.g., waiting due to a concurrency limit of the execution context discussed above), "complete" (e.g., ran to completion), or the like.

At step 1, the state of a track may transition to a "future" state that indicates the track has not yet run. Each track may correspond to an execution unit.

At step 2, when a step corresponding to an execution unit start has been executed, the state may transition to "run."

At step 3, while running, the track may be halted. This may be due to error or based on hitting a step of the region build plan that corresponds with a breakpoint being set (e.g., SET_BREAKPOINT).

At step 4, at any suitable time, the track may be transitioned back to "run" if an intervention is executed to restart the track from the halt state.

At step 5, at any suitable time, the track may be transitioned to "wait." The track may be transitioned from "run" to a wait state based on a number of conditions. For example, if a prior attempt at executing the step failed, the track may be transitioned to a "wait_retry" state. If the wait is due to waiting for a skill to be installed or deemed healthy, the track may be transitioned to a "wait_skill" state. In some embodiments, if a fork step type was executed to start multiple tracks, the track may be waiting for those threads to complete. In this instance, the track may be transitioned to a "wait_join" state. As yet another example, if the track is waiting due to a concurrency limit being exceeded, the track may be transitioned to a "wait_concurrency" state.

At step 6, the condition upon which the track was waited may be resolved at any suitable time, causing the track state to be transitioned back to "run." This may occur when a release was successful, when a skill was deemed installed and/or healthy, when all forks tracks have been identified as being completed, or when a number of concurrently running tracks falls below a concurrency threshold value.

The transitions between "run," "halt," and "wait" statuses may be performed any suitable number of times until all steps of the track have been executed. Upon determining that all of the steps associated with the track have been executed, the track state may be transitioned to a "complete" track state. A "complete" track state may be used to indicate that execution of the track has been completed.

Figure 18:
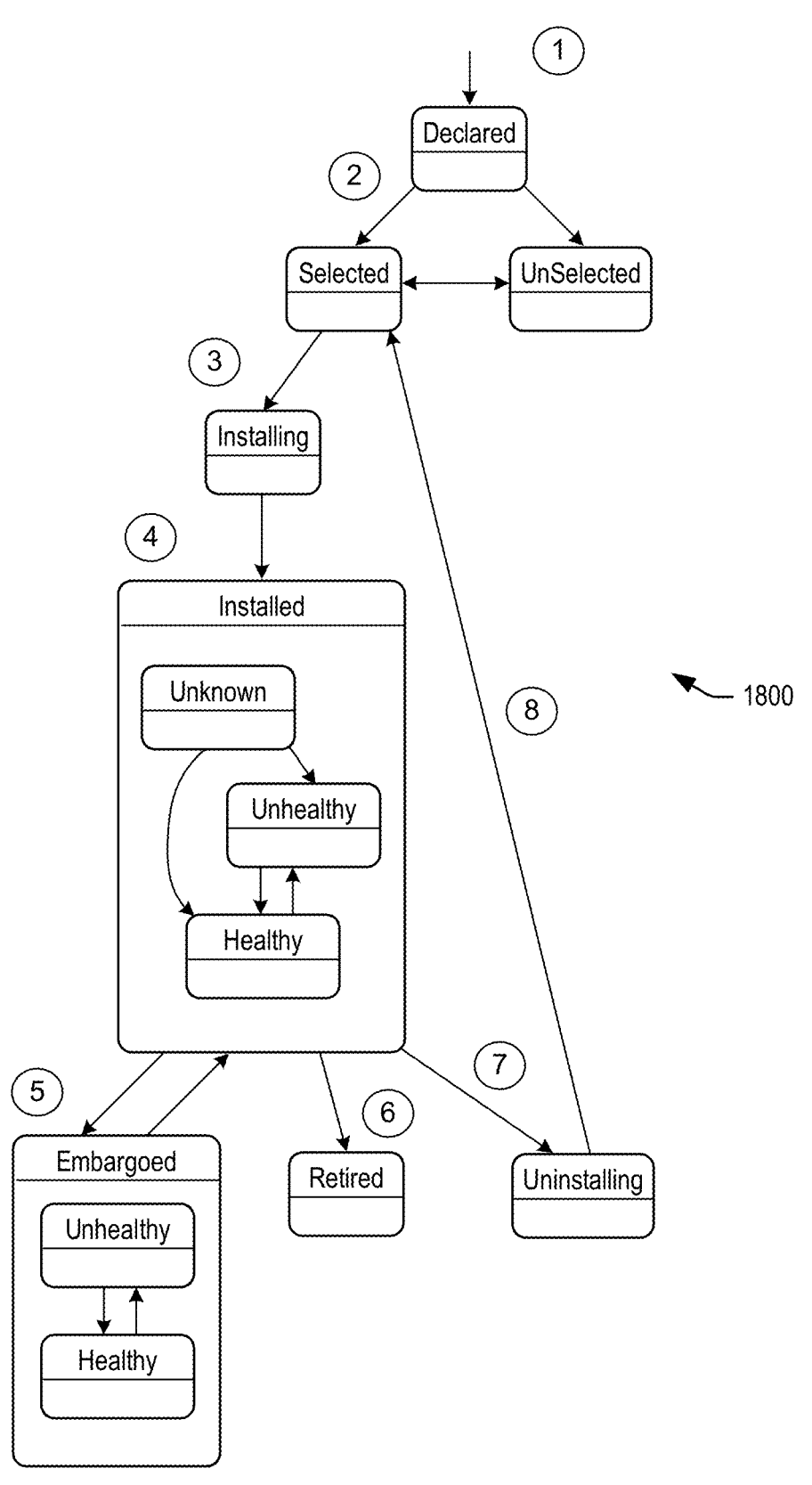
FIG. 18 is a block diagram depicting an example lifecycle for a skill, in accordance with at least one embodiment.

FIG. 18 is a block diagram depicting an example lifecycle 1800 for a skill, in accordance with at least one embodiment. Lifecycle 1800 may include any suitable number of states. As depicted, lifecycle 1800 includes states such as declared, selected, unselected, installing, installed, embargoed, retired, and uninstalling, although other combinations of lifecycle states are contemplated. A lifecycle state may correspond to the installationState attribute of the skill data structure 1010 of FIG. 10. In some embodiments, a lifecycle state may be associated with any suitable number of substates. Each of these substates may correspond to the healthState of skill version data structure 1012 of FIG. 10. As depicted in FIG. 18, a skill that is associated with a lifecycle state of "installed" may be associated with one of three substates (e.g., "unknown," "unhealthy," and "healthy"). Likewise, a skill associated with an "embargoed" state may be associated with a "healthy" or and "unhealthy" substate. Descriptions for the conditions indicated by each state are provided below.

| State | Health Monitored | Description |
|---|---|---|
| Declared | | A skill version resource (e.g., skill version data structure 1012 of FIG. 10) has been created by the Puffin Service and is known to the system (e.g., stored in a database and accessible by any suitable component of CIOS 102 of FIG. 1) |
| Selected | | The skill version resource is selected (e.g., by Region Orchestrator 106 of FIG. 1) for installation into the target region |
| Unselected | | The skill version resource is unselected (e.g., by Region Orchestrator 106 of FIG. 1) to ensure the skill version is not (or never) installed in the target region |
| Installing | | Installation of the Service producing the associated Skill is currently underway in the target region. |
| Installed | Y | Installation of the Service producing the associated Skill has completed successfully. Puffin begins/continues periodic health monitoring of the Skill. |

-continued

| State | Health Monitored | Description |
|-------|------------------|-------------|
| Uninstalling | | Uninstallation of the Service producing the associated Skill is currently underway in the target region. |
| Retired | | The skill version is installed in the target region but no longer provides any meaningful value to any consumers. This state may be utilized by ephemeral Skills in the context and utility of region build. |
| Embargoed | Y | Installation of the Service producing the associated Skill has completed successfully. Puffin begins/continues periodic health monitoring of the skill but the skill version should be treated as Installed only by Skill dependencies of the same producing Service. |

In some embodiments, at step 1, upon selecting the option publish a skill an instance of skill version data structure 1012 of FIG. 10 corresponding to the skill may be created and updated to indicate an installation state of "declared." At step 2, the Region Orchestrator 106 may select the skill for installation within the target region (e.g., target region 114) and transmit data indicating the selection (or a state transition to "selected"). Upon receipt of this data, the Puffin Service may update the skill version data structure 1012 to "selected." At step 3, the Region Orchestrator 106 of FIG. 1 may begin deploying a resource of the service producing the associated skill and may transmit a new indication that the installation state of the skill is to be set to "installing." Upon receipt, the Puffin Service may update the skill version data structure 1012 to "installing." At step 4, the installation state of the skill may be updated to "installed" when the installation of the Service producing the associated skill has been successfully completed. Generally, any of the state transitions described herein may be initiated by the Region Orchestrator 106 (on receiving indications from CIOS Regional or CIOS Central that one or more releases have been successfully executed). Receipt of any suitable indication of a state transition occurring may cause the Puffin Service to update the installation state of the skill version data structure 1012. While the skill is associated with an "installed" state, the Puffin Service may monitor the health of the skill.

In some embodiments, monitoring the health of a skill may include monitoring for indications that one or more alarms associated with the skill (e.g., alarms indicated with the alarmLabelName attribute of health check data structure 1014 of FIG. 10) have been triggered (e.g., by an alarm service such as a telemetry service and/or a sentinel service, each an example of one of the services of cloud services 2556 of FIG. 25). In some embodiments, if an alarm service (e.g., a telemetry service) configured to provide these alarms is unavailable, a substate corresponding to the "healthState" attribute of skill version data structure 1012 may be updated to indicate an "unknown" health state of an installed skill. If no alarm has been triggered for at least a threshold period of time, the healthState attribute of the skill version may be set to a value to indicate a "healthy" state of the installed skill. Receipt of an indication that an alarm that is associated with the skill has been triggered may cause the Puffin Service to update the healthState attribute of the skill version to an "unhealthy" state for the installed skill.

At step 5, the installation state may be updated to an "embargoed" state (e.g., by the Region Orchestrator, the Puffin Service, and/or based on user input) to indicate that health monitoring should continue but that only skills of the same producing service should treat the embargoed skill as being installed. In some embodiments, the installation state of the skill may revert to "installed."

In some embodiments, a skill version may be retired (e.g., via user input) at step 6. While in the retired state, the skill version may not (or cannot) be utilized by other skills and/or in any build or run. In some embodiments, the skill version's installation state may not be modified once the skill has transitioned to the retired state.

In some embodiments, a skill version's installation state may transition from an "installed" state" to an "uninstalling" state based at least in part on operations performed by the orchestrator and/or by user input. In some embodiments, the Region Orchestrator 106 may determine service deployments are to be reversed. In these situations, the Region Orchestrator 106 may "unwind" installation of one or more services. During these operations, when the service is being uninstalled at step 7, the skill version associated may be updated to indicate a state of "uninstalling." When the service associated with the skill version has been successfully uninstalled, the skill version's installation state may be updated to "selected" at step 8.

A number of transitions between the various states and substates are contemplated. The lifecycle states and transitions depicted in FIG. 18 are illustrative and are not intended to limit the scope of the disclosure.

FIG. 19 is a table 1900 depicting an example set of step types, in accordance with at least one embodiment. One example step type of table 1900 may include an EXECUTION_UNIT_START step type which may take as input a SPAM identifier and an execution unit identifier corresponding to a transition between two build milestones. A step type corresponding to an EXECUTION_UNIT_START step type may be used to indicate the beginning of an execution unit within a SPAM.

Another example step type provided by table 1900 includes an EXECUTION_UNIT_END step type which may take as input a SPAM identifier and an execution unit identifier corresponding to a transition between two build milestones. A step corresponding to an EXECUTION_UNIT_END step type may be used to indicate the end of an execution unit within a SPAM.

Another example step type provided by table 1900 includes a RELEASE step type which may take as input a release which may include a SPAM, an ET alias, a release type, a checkpoint identifier, a change type, and one or more artifacts to be used for the release. A step corresponding to a RELEASE step type may be used to execute a release attempt. In some embodiments, the RELEASE step may fail if the release fails.

Another example step type provided by table 1900 includes a SKILLS_UPDATE step type which may take as input an execution unit identifier and a skill version identifier and a value to which the state of the skill may be updated (e.g., "INSTALLING," "INSTALLED," "UNINSTALLING," "SELECTED," "RETIRED," etc.). A step corresponding to a SKILLS_UPDATE step type may be emitted to set a skill version state (e.g., the skill version state discussed above in connection with FIG. 4).

Another example step type provided by table 1900 includes a SKILLS_SELECT step type which may take as input a set of selected skills. A step corresponding to a SKILLS_SELECT step type may be used to update all Skills for the region to SELECT the correct skills (and UNSELECT the rest that are unresolved). In some embodiments, a SKILLS_SELECT step may be used to inform Puffin which skills are expected to be installed (SELECTED) and which of the skills known to Puffin will not be installed (UNSELECTED).

Another example step type provided by table 1900 includes a GUARD step type which may take as input a list of skill guard specifications, a skill guard identifier, a guard type, and an install state. A GUARD step may be used to specify preconditions for another step. If execution has been paused during a guard, all GUARDS will be rechecked before continuing to execution the step.

Another example step type provided by table 1900 includes a SERIAL step type which may be used to specify a series of steps that will be run in series/sequence. Another example step type provided by table 1900 includes a FORK step type which may be used to specify a series of tracks to be started. Another example step type provided by table 1900 includes a JOIN step type which may be used to specify a set of tracks to complete before continuing.

Another example step type provided by table 1900 includes a RETRY step type which may be used to specify a retry policy. By way of example, a RETRY step may take as input a retry or backoff policy. A RETRY step may be used to run a step, if it fails, the retry step will be re-attempted according to a the retry policy/backoff policy. If the number of retries run out as defined by the policy, the step may be halted.

FIG. 20 is a table 2000 depicting an example set of interventions, in accordance with at least one embodiment.

One example intervention of table 2000 includes a "CONTINUE" intervention. A CONTINUE intervention may utilize a track reference (e.g., "TrackRef"), a track state (e.g., "TrackState"), and an expected current step reference (e.g., "ExpectedCurrentStepRef") as input. A CONTINUE intervention may be utilized to continue the identified track and may be valid only when the target track is eligible for CONTINUE. In some embodiments, the track may be halted (in a stated of "HALT," due to error or breakpoint), running (e.g., in a state of "RUN"), or waiting (e.g., in a state corresponding to "WAIT") for any reason. A CONTINUE intervention for a waiting step (e.g., a step that is in a state of WAIT) may cause the current step to end and an advancement to the next step. A CONTINUE intervention for a running step (e.g., a step that is in a state of RUN), may cause the CONTINUE to wait for the step to complete, and then continue to the next step, even if the step would have failed due to an error. This permits an intervention to specify the next step even if a release is running.

One example intervention of table 2000 includes a "CONTINUE_TO" intervention which may take as input a track reference (e.g., "TrackRef"), a track state (e.g., "TrackState"), an expected current step reference (e.g., "ExpectedCurrentStepRef") and a next step reference (e.g., "NextStepRef"). A CONTINUE_TO intervention may be used to continue the identified track, setting the next turn to execute to the step identified by the next step reference rather than the immediate next step in the build plan.

Table 2000 further includes interventions such as a "SET_BREAKPOINT" or a "CLEAR BREAKPOINT" intervention, each of which may take as input a list of step references. These runtime interventions may be used to set or clear breakpoints on steps. Breakpoints may be used to pause execution before a specified step (e.g., HALT_BREAKPOINT). In some embodiments, a validation error may result for an intervention if the step is unreachable from a current execution state (e.g., it has already run and it is too late to break before execution).

Another example of a runtime intervention of table 1900 may include a "TRACK_HALT_ON_ERROR" or a "CLEAR_TRACK_HALT_ON_ERROR," each of which may take as input a list of step references. These runtime interventions may be used to set of clear a track halt on error (e.g., within a RETRY). They be intended to be used to have the execution of the build halt when a release fails, when it would typically exhaust retries before halting without the intervention.

Table 1900 further includes a "SET_SKILL_OVERRIDE" and a "CLEAR_SKILL_OVERRIDE" intervention, each of which may take as input an override scope (e.g., "OverrideScope"), a skill reference (e.g., "SkillRef"), a skill version (e.g., "SkillVersion"), a skill install status (e.g., "SkillInstallStatus"), and a skill health status (e.g., "SkillHealthStatus"). In some embodiments, the skill reference, skill version, skill install status, and skill health status may be associated with one or more of the attributes of skill data model 900 of FIG. 9. These runtime interventions may be used to set of clear a track halt on error (e.g., within a RETRY). They be intended to be used to set skill health install or provide a health override to be scoped globally/for the build plan, to a SPAM, or to an execution unit. A CLEAR_SKILL_OVERRIDE intervention may take as input the same parameters and may be used to clear a specific skill install/health override.

Table 1900 further includes a "EXECUTION_OVERRIDE" intervention, which may take as input an override scope (e.g., "OverrideScope") such as a SPAM scope, an execution unit scope, or a step scope, and an execution override value (e.g., "executionOverride") such as "NONE, HALT_BEFORE_BEGIN, SKIP, HALT_ON_ERROR, or the like. In some embodiments, the execution override value may be utilized (e.g., as part of planning) for a given scope of steps (e.g., all steps in the SPAM, all steps in the EU, the next step, etc.) to skip, automatically halt before execution, halt on error (e.g., go directly to a track state of "halt_error" on failure rather than executing a retry.

Table 1900 further includes a "SKILL_OVERRIDE" intervention, which may take as input an override scope (e.g., "OverrideScope") such as a SPAM scope, an execution unit scope, or a step scope, and skills data (e.g., "skillID," "majorVersion," "minor Version" "installation Status," and/or "healthState" corresponding to skill version data structure 1012 of FIG. 10). In some embodiments, the "SKILL_OVERRIDE" intervention may be used to emit suitable SET/CLEAR_SKILL_OVERRIDE steps as part of plan to bring Execution State up to date.

Figure 21:
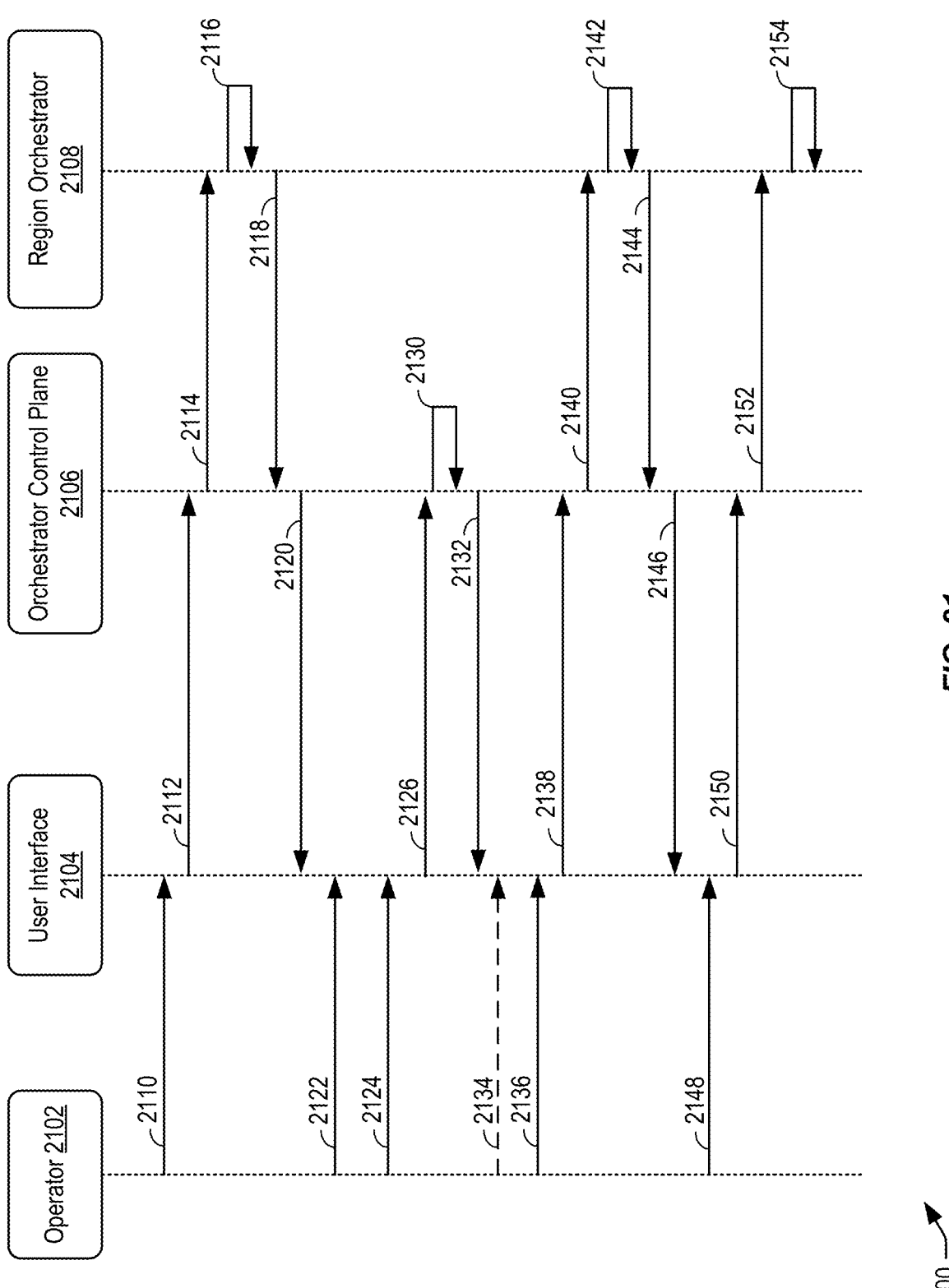
FIG. 21 is a flow diagram depicting an example method for performing an intervention during a data center/region build, in accordance with at least one embodiment.

FIG. 21 is a flow diagram depicting an example method 2100 for performing an intervention during a data center/region build, in accordance with at least one embodiment. The method 2100 may be performed by any suitable combination of user interface 2104, Orchestrator Control Plane 2106 (e.g., Orchestrator Control Plane 107 of FIG. 1), and Region Orchestrator 2108 (Region Orchestrator 106 of FIG. 1). In some embodiments, Orchestrator Control Plane 2106 may receive and transmit data from/to user interface 2104. More or fewer operations may be included in the method 2100 and these operations may be performed in any suitable order. The method 2100 may be repeated any suitable number of times.

The method 2100 may begin at 2102, where operator 2102 may provide user input via user interface 2104 to begin an intervention. In some embodiments, the user input may include a region identifier and a scope (e.g., one or more tracks).

At 2112, user interface 2104 may transmit the user input to Orchestrator Control Plane 2106 which, in turn, may transmit the data to Region Orchestrator 2108 at 2114.

At 2116, Region Orchestrator 2108 may perform operations to pause the one or more tracks corresponding to the identified scope. At 2118, Region Orchestrator 2108 may return a current state of the pause to Orchestrator Control Plane 2106.

At 2120, Orchestrator Control Plane 2106 may transmit data to user interface 2104 to cause user interface 2104 to present the current state of the paused tracks. In some embodiments, user interface 2104 may present an indication that the region build is ready for intervention.

At 2122, operator 2102 may utilize user interface 2104 to create a plan replace operations. This may include updating one or more SPAM version(s), updating retry policies, resolving ambiguous states, updating transition operations, or the like. As a non-limiting example, the operator 2102 may update the SPAM version to utilize a newly modified SPAM that may differ by at least one attribute from a corresponding SPAM previously utilized in this region build.

At 2124, operator 2102 may select an option via user interface 2104 to replace the region build plan with a new plan.

At 2126, user interface 2104 may transmit data to Orchestrator Control Plane 2106 indicating a new plan is to be generated. At 2128, Orchestrator Control Plane 2106 may be configured to generate the new region build plan (a "replacement plan") according to the data indicated at 2122. At 2130, Orchestrator Control Plane 2106 may validate the replacement plan. This may include rechecking that skill names, skill consumers, and skill producers, match corresponding data maintained by the Puffin Service (e.g., Puffin Central 118 of FIG. 1, Puffin Regional 120 of FIG. 1). In some embodiments, the replacement plan may be validated against the current region state.

At 2132, the replacement plan and/or validation results may be transmitted by the Orchestrator Control Plane 2106 to user interface 2104 for presentation.

At 2134, operator 2102 may optionally continue editing SPAMs, retry policies, states, or the like and the method may return to 2126. Steps 2126-2134 may be repeated any suitable number of times as the operator 2102 edits the plan.

At 2136, operator 2102 may select an option via user interface 2104 to approve the plan. A replace plan request may be transmitted from the user interface 2104 to Orchestrator Control Plane 2106 at 2138.

At 2140, Orchestrator Control Plane 2106 may perform any suitable replace plan operation to cause Region Orchestrator 1208 to update the current region build with modified steps at 2142. A particular example of this update is discussed in more detail with respect to FIGS. 22 and 23.

A result of this replacement may be returned to Orchestrator Control Plane 2106 at 2144. At 2146, Orchestrator Control Plane 2106 may transmit the result to user interface 2104, where it may be viewed by operator 2102.

At 2148, operator 2102 may provide user input via user interface 2104 that indicates an option to end the intervention. At 2150, user interface 2104 may transmit the user input to Orchestrator Control Plane 2106, which in turn may transmit the data to Region Orchestrator 2108 at 2152. Upon receiving such data, Region Orchestrator 2108 may execute any suitable operations at 2154 to un-pause the previously paused track(s).

FIG. 22 is a code segment depicting an example track of a region build plan 2200 (e.g., region build plan 338 of FIG. 3, in accordance with at least one embodiment. Region build plan 2200 may include any suitable number of tracks corresponding to any suitable number of execution units. An execution unit/track may correspond to a set of releases defined by a component of an execution unit entity (e.g., execution unit 702 of FIG. 7 of execution unit entity 700 of FIG. 7).

As depicted in FIG. 22, region build plan 2200 include a specification for track T1 which defines 8 steps (designated steps UP0-0 to UP0-7). Statement 2202 specifies that this track, T1, has 8 steps which are to be executed serially (as specified by the designator "SERIAL"). Any suitable track of a region build plan, including track T1, may include any suitable number and combination of steps, each step corresponding to one of the step types provided in table 1900 of FIG. 19.

Step UP0-0, depicted at 2204, may be of a step type "EXECUTION_UNIT_START" of table 1900 ("EU-START," for brevity) and may specify the start of an execution unit. The parameter "dns: 1.0.0" may designate a SPAM (e.g., SPAM "dns" version 1.0.0) and an execution unit transition (e.g., "absent" corresponding to one build milestone to "VIBE_initial," corresponding to another build milestone).

Step UP0-1, depicted at 2206, may be a of a step type "SKILLS_UPDATE" corresponding to table 1900 and may specify an instruction to update a skill to a particular state. In this instance, the step may take as parameters a SPAM (e.g., "dns: 1.0.0"), an execution unit (e.g., "absent" corresponding to one build milestone to "VIBE_initial" corresponding to another build milestone), a skill state (e.g., "INSTALLING"), and a skill version (e.g., "INTERNAL/InitialVibe: 1.0.0"). Executing operations corresponding to step UP0-1 (e.g., by CIOS Regional 108 of FIG. 1), may cause data to be transmitted to Puffin Regional 120 of FIG. 1 to update the skill "INTERNAL/Initial Vibe: 1.0.0" to a state of "INSTALLING."

Step UP0-2, depicted at 2208, may be a of a step type "RELEASE" corresponding to table 1900 and may specify an instruction to perform a release. This step may take as parameters a SPAM (e.g., "dns: 1.0.0"), an execution unit (e.g., "absent" corresponding to one build milestone to "VIBE_initial" corresponding to another build milestone), and release metadata 2209 including a project (e.g., "dns"), a flock (e.g., "dns_ControlPlane"), a phase (e.g., "\$ {REGION} _vibe_permissions" where \$ {REGION} is an injectable variable that is replaced with region data upon compilation as descried in FIG. 3), an execution target "\$ {REGION} _vibe_permissions"), a milestone (e.g., "vibe_permissions"), a release type (e.g., "INFRA"), and a commit ID (e.g., "dns-cp-git-commit-id1"). Executing operations corresponding to step UP1-1 (e.g., by CIOS Regional 108 of FIG. 1, may cause the corresponding release to be executed in the designated region and at the designated execution target.

If the release corresponding to step UP0-2 fails, step UP0-3 may be executed. Step UP0-3, depicted at 2210, may correspond to a RETRY step type. Step UP0-3 may take as a parameter a specification of a retry policy (e.g., "spec"). As an example, if the retry policy specifies that the release is to be retried twice, then executing the operations corresponding to the step depicted at 2210 will cause step UP0-2 depicted at 2208 to be retried up to two more times. If still unsuccessful, the Region Orchestrator executing the track may halt the track and notify the Orchestrator Control Plane.

If the release corresponding to step UP0-2 is successful, another release corresponding to UP0-4, depicted at 2212, may be attempted. UP0-4 is of the same step type as UP0-2 and, when operations corresponding to this step are executed, another release may be attempted, that release corresponding to the release metadata 2213. Step UP0-5 depicted at 2214 may be similar to UP0-3 in step type and function and may cause step UP0-4 to be retried a number of times according to the predefined policy provided (e.g., "spec").

If the release corresponding to step UP0-4 is successful, operations corresponding to step UP0-6, depicted at step 2216, may be executed to perform another skills update. Step UP0-6 may be similar to step UP0-1 and may be used to update the same skill to the state "INSTALLED."

Step UP0-7, depicted at 2218, may be of a step type "EXECUTION_UNIT_END" of table 1900 (depicted as "EU-END," for brevity) and may specify the end of an execution unit. The parameter "dns: 1.0.0" may designate a SPAM (e.g., SPAM "dns" version 1.0.0) and an execution unit transition (e.g., "absent" corresponding to one build milestone to "VIBE_initial," corresponding to another build milestone).

Statement 2220 may be used to initialize the track T1.

FIG. 23 is a code segment depicting an example modified track 2300 of the region build plan 2200 (e.g., region build plan 338 of FIG. 3, in accordance with at least one embodiment. The track T1 of FIG. 23 depicts a modified version of the track T1 of FIG. 22. The modification may occur based at least in part on halting the first track T1 of FIG. 22 due to release failure. For example, the Region Orchestrator may execute operations corresponding to UP0-0 to UP0-3. Presuming the release corresponding to UP0-2 of FIG. 22 ultimately fails (even after retires), track T1 may be halted at step 2210. As discussed in connection with FIG. 21, an operator may modify a SPAM or other suitable data to attempt to remedy the underlying issue. As a non-limiting example, the operator in this example may update the SPAM to use a flock configuration file corresponding to commit "dns-cp-git-commit-id2."

A new build plan may be generated. This new region build plan may include steps 2302 which correspond to the updated SPAM. In some embodiments, the new and previous region build plan may be combined such that the new steps are used to overwrite the previous steps of the region build plan from the point which at which the track was halted. In this example, the steps which were already reached (e.g., UP0-0 through UP0-3) are left unchanged, while UP0-4 through UP0-7 are overwritten with steps UP1-0 through UP1-5. UP1-0 corresponds to a new release similar to UP0-2 above, with a different flock configuration file. By way of example, the ID depicted at 2304 for the flock configuration file commit "dns-cp-git-commit-id2" differs in metadata of the release corresponding to UP1-0 than the ID originally used for the release corresponding to UP0-3 as can be seen at 2306.

The statement depicted at 2308 may be reached after resuming the track. The statement may correspond to an intervention and may include any suitable intervention such as one of the interventions describe in connection with FIG. 20. In this example, the statement depicted at 2308 includes a "CONTINUE" intervention that continues the thread from the HALT_ERROR experienced at UP0-3 and continues the track T1 to execute the steps corresponding to UP1-0 to UP1-5, serially. The execution of the statement at 2310 may cause the actual overwrite of steps UP0-4 to UP0-7 with the steps UP1-0 to UP1-5.

Testing Environments and Techniques

Figure 24:
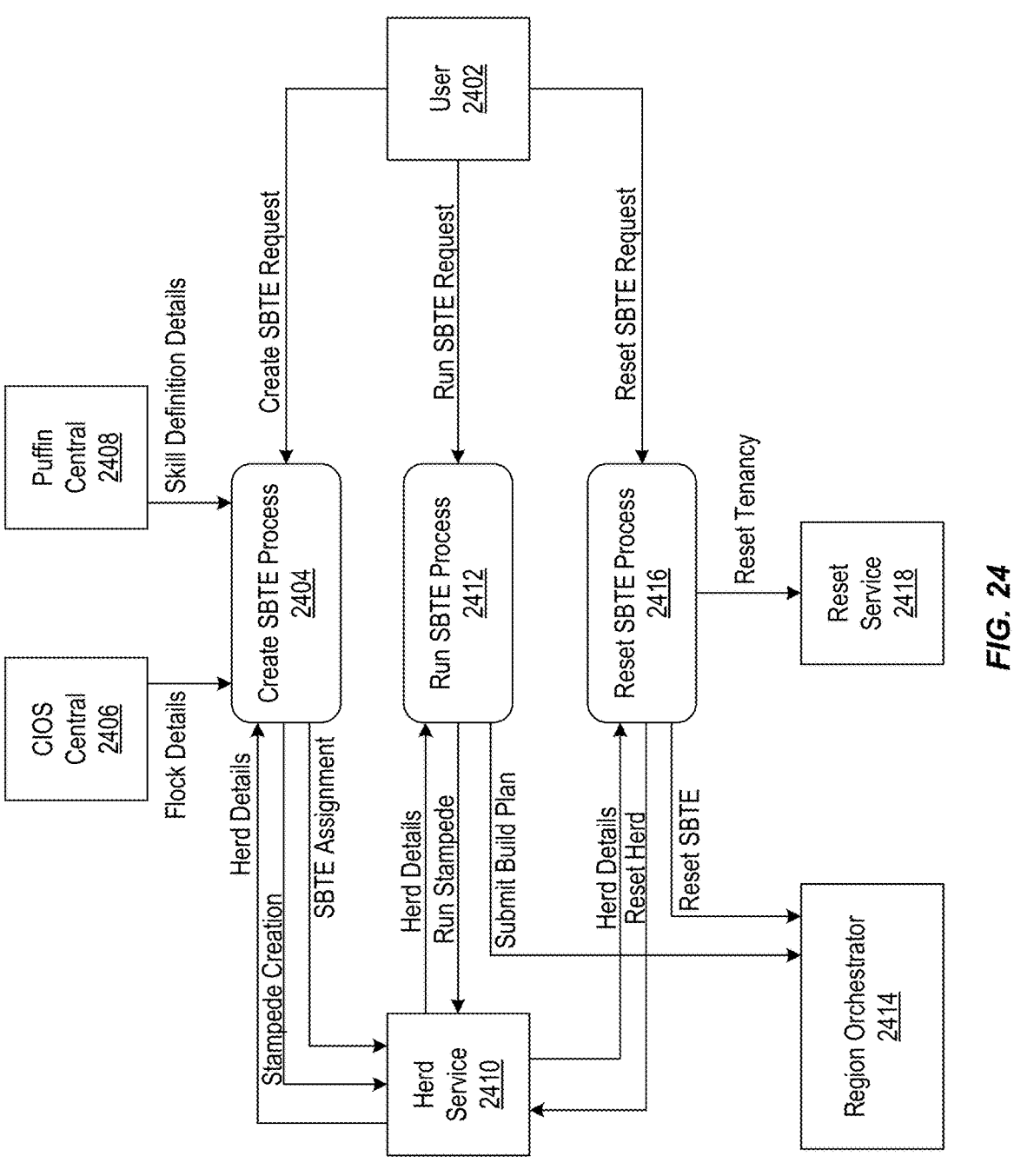
FIG. 24 is a block diagram depicting an example method for performing a Service Build Test Execution (SBTE), according to at least one embodiment.

FIG. 24 is a block diagram depicting an example method 2400 for performing a Service Build Test Execution (SBTE), according to at least one embodiment. Method 2400 may be performed using any suitable combination of the components of CIOS 102 of FIG. 1. More or fewer operations than the ones provided in FIG. 24 may be included in method 2400. The operations may be performed in any suitable order.

A SBTE may be a process and environment (e.g., in the overlay network) to have Region Orchestrator 2414 (e.g., Region Orchestrator 108 of FIG. 1) execute one or more service build automations in an isolated environment. In some embodiments, this isolation may be achieved by having an SBTE run in the context of a herd, which is primarily defined by a set of participating flocks and tenancies. Relying on the head for the context for a SBTE maintains the Herds Service 2410 as a centralized location for ensuring that test tenancies are only used by a single test execution at any one time (either Stampede or SBTE). Tenancies may be pre-created, only associated to a single heard, onboarded to Reset Service 2418, and pre-subscribed to regions used for a test. Services may be onboarded to the Reset Service 2418 to be able to participate in a herd. A herd, and also its associated tenancies, may be restricted to having a single test run active at a time. In some embodiments, execution targets may need to exist that are associated with a herd identifier (e.g., a herdID) that is associated with the herd.

Each SBTE may be managed by a dedicated instance of Region Orchestrator 2414 and executed in a service cell that is isolated from other service cells. A cell may be created for the SBTE when the SBTE is started and the cell may be torn down once the SBTE has been reset. The Region Orchestrator 2414 may be configured to treat an SBTE as another region build. All of the functionalities available during region build may be similarly available to the service owner operating the SBTE as well.

At any suitable time, user 2402 may utilize any suitable interface (e.g., an interface managed by the Orchestrator Control Plane 107 of FIG. 1) to generate a create SBTE request. Receipt of this request may invoke the create SBTE Process 2404. During execution of the create SBTE process 2404 (e.g., by Orchestrator Control Plane 107), Flock details and skill definition details may be obtained from CIOS Central 2406 (e.g., CIOS Central 108 of FIG. 1) and Puffin Central 2408 (Puffin Central 118 of FIG. 1), respectively. The create SBTE request may include a set of specified service plans and manifests (SPAMs) and/or a test range (e.g., specifying a starting build milestone and an ending build milestone).

As part of executing the create SBTE process 2404, head details may be obtained from Herd Service 2410. Herd Service 2410 may be a service that is configured to manage a collection of flocks, test tenancies, and metadata that may be used to test an overlay service build within an isolated environment (e.g., a service cell such as one of orchestrator cell(s) 3918 corresponding to Lab Region Builder Subnet 3950 of FIG. 39). In some embodiments, the Herd Service 2410 may operate as part of CIOS Central 108 of FIG. 1 and may perform similar functions as CIOS Central 108 within an isolated testing environment. The herd details may include any suitable data identifying one or more flocks (e.g., CIOS-managed resources and/or a set of execution targets that can be deployed as a unit), one or more tenancies, and any suitable metadata related to testing an overlay service build.

As part of executing the create SBTE process 2404, a stampede may be created. A stampede refers to an instance of a Service Build Test of provided flocks into test tenancies associated to a herd and targeting a particular region. A herd may only have a single stampede active at a time. The SBTE may be assigned to the Herd Service 2410 at any suitable time. As part of executing the create SBTE process 2404, a region build plan may be generated in a similar manner as discussed in connection with FIG. 15. The region build plan may be composed based on the create SBTE request and may use the specific SPAMs and test range provided in the request.

Once an SBTE has been created, the user 2402 may utilize any suitable user interface (e.g., any suitable user interface managed by the Orchestrator Control Plane 107) to generate a run SBTE Request which may be received by the Orchestrator Control Plane 107. Receipt of the run SBTE request may invoke execution of the run SBTE process 2412. As part of executing the run SBTE process, herd details may be obtained from the Herd Service 2410. A command to execute the previously created stampede may be issued to the Herd Service 2410 and the region build plan may be submitted to Region Orchestrator 2414 (e.g., Region Orchestrator 108 of FIG. 1). Orchestration may occur in accordance with the region build plan in a similar manner as discussed in connection with FIG. 16. For example, the Region Orchestrator 2414 may be configured to issue releases to an instance of CIOS Regional 108 within the cell for execution targets that are associated with the herdID. Region Orchestrator 2414 may call the Puffin Service (e.g., Puffin Central 118, Puffin Regional 120 of FIG. 1) to read and update skills that are associated with the herdID.

At any suitable time after running the stampede, the user 2402 may utilize any suitable user interface (e.g., a user interface managed by Orchestrator Control Plane 107) to generate a reset SBTE request. Receipt of the reset SBTE request (e.g., by the Orchestrator Control Plane 107) may cause a reset SBTE process 2416 to be executed. As part of executing the reset SBTE process 2416, herd details may be obtained from the Herd Service 2410. A reset herd command may be transmitted to the Herd Service 2410 to cause a process for resetting the herd to be executed. The Orchestrator Control Plane may delete any tracking data (e.g., skills and/or capabilities posted, etc.). The Herd Service 2410 may be configured to clean up the test tenancies involved in the SBTE.

A command to reset the tenancy may be issued to a Reset Service 2418. The Reset Service 2418 may be configured to search for and delete all internal/public resources created during the SBTE. In some embodiments, Reset Service 2418 may search any suitable state files (e.g., files including the data discussed in connection with FIG. 12) to discover all existing resources in the compartment/tenancy. In some embodiments, the Reset Service 2418 may iterate over all discovered resources during execution of a teardown procedure that causes these resources to be deleted. By way of example, the Reset Service 2418 may review execution target state (e.g., of release execution state data structure 1206 of FIG. 12) to discover every internal and public resource that was created during the SBTE. In some embodiments, the Reset Service 2418 may be preconfigured with custom discovery and teardown handling procedures according to resource types. Therefore, in some embodiments, there may be a custom adapter for each resource type that calls the corresponding control plane for discovery (e.g., returning a list of resources controlled by the given control plane component such as block storage, compute, etc.) and performs teardown operations.

In some embodiments, the Reset Service 2418 may be configured to merge two or more state files to generate one state file per compartment. This may be true when the state files have a disjoint set of resources. This ensures that all resources which have cross compartment associations are in a common state file and are deleted in order during teardown procedure execution. This ensures if a resource created by one flock depends on a resource created by another flock, they are in the same state file and are deleted in an order according to that dependency. In some embodiments, a declarative provisioning tool (e.g., Terraform) utilized by CIOS Regional 110 perform a process to discover resources within the compartment/tenancy. If this resource discovery was executed after state files have been generated, the tool's discovery data may be utilized for teardown and the state data corresponding to these resources may be removed from the merged state data.

Executing the teardown process may utilize one or more procedures. An important aspect of deleting resources is that resources might have associations and require deletion in a specific order. For example, if a RouteTable has a RouteRule for Local Peering Gateway (LPG), RouteTable may need to be deleted first before LPG as deletion in the reverse order will fail. A declarative provisioning tool may be used to destroy all resources for a given state file (e.g., the merged state file discussed above). The declarative provisioning tool may be configured to delete resources in accordance with the known associations. In some embodiments, some resources may be discovered that may require special handling and could not be deleted by the declarative provisioning tool. In these examples, a predefined custom adapter may be utilized by calling respective application programming interfaces (APIs) directly. The custom adapter may be preconfigured with a set of rules that define a static order for deleting resources to ensure that resources are deleted in the proper order to account for dependencies.

In some embodiments, certain resources may be excluded from the reset SBTE process 2418. By way of example, identity access policies for users, CIOS components, and the like may be labeled (e.g., tagged) as being excluded from reset procedures. The Reset Service 2418 may be configured to refrain from performing teardown operations on such labeled resources.

In some embodiments, the Reset Service 2418 may be configured with a validation component that may be configured to validate if the required resources have been deleted. This validation component may cause the Reset Service 2418 to execute a discovery process after teardown has been complete to verify that all remaining resources in the compartment/tenancy are ones that do not require deletion. The validation phase might find resources if 1) a test tenancy is being used outside the given Herd environment which is creating new resources, or 2) the teardown process includes errors resulting in a resource leak (e.g., resources not being As FIG. 25 is a block diagram depicting a data model 2500 representing various metadata related to a Service Build Test Execution (SBTE), in accordance with at least one embodiment. Each of the data structures described below may be an example of a class.

Data model 2500 may include create SBTE data structure 2502, which may include attributes such as "cmUrl" and "autoApprovalEnabled." In some embodiments, the "cmUrl" may specify a change management ticket that is associated with the test execution. The "autoApprovalEnabled" attribute may be set to true or false to indicate whether releases are to be automatically approved.

SBTE specification data structure 2504 may include an attribute "participatingSpams" which may include a set of SPAM identifiers (e.g., spamNames, IDs, etc.) of each SPAM to be participating in the SBTE. The SPAMs identified and/or the SBTE specification data structure 2504 may be associated with any suitable combination and number of the data structures 2506-2520. By way of example, each SPAM of the participating SPAMs identified in SBTE specification data structure 2504 may be associated with an instance of spam execution detail data structure 2506. Spam execution detail data structure 2506 may include attributes "spamName" and "executionTargetAppendModifier." The attribute value corresponding to "spamName" may specify a name for the SPAM. The attribute value corresponding to "exectionTargetAppendModifier" may specify how to append the HerdID to an execution target name specified by the SPAM. An example expected value may be "-{herdID}", such that an execution target name of "over-lay-cp" would become "overlay-cp-ocid.herd.abc" where "ocid.herd.abc" is the herdID.

In some embodiments, each participating SPAM may be associated with a build milestone range data structure 2508 which may specify what build milestone range of the SPAM the test should run. This range may be specified with a "fromBuildMilestone" attribute, the corresponding value of which may specify a starting build milestone for the SPAM, and a "toBuildMilestone" attribute, the corresponding value of which may specify an ending build milestone for the SPAM. The range specified may be required to be correctly ordered but may not be required to be adjacent build milestones, in which case the intervening build milestones will be included in the run.

In some embodiments, each SPAM may be associated with an execution unit override data structure 2510 which may specify for what build milestone range an execution unit override should apply. This range may be specified with a "fromBuildMilestone" attribute, the corresponding value of which may specify a starting build milestone for which an execution unit override is to be applied, and a "toBuildMilestone" attribute, the corresponding value of which may specify an ending build milestone for the application of the execution unit override. The range specified may be required to be correctly ordered but may not be required to be adjacent build milestones, in which case execution unit overrides may be applied to any intervening build milestones. The execution unit override data structure 2510 may include an "excludeSteps" attribute which may be associated with a value corresponding to a set of one or more steps to be excluded. This override may be used to designate particular steps of an execution unit which are not appropriate to execute in the context of a test.

In some embodiments, an SBTE may be associated with a skill dependency override data structure 2512 which provide special rules for configuring the Skills for the test run at a "global" level, applying to all SPAMs. This may include overriding the health of a skill or specifying that it should be sourced from the host region. A skill may not be allowed to be overridden if it is provided by the SPAM(s) participating in the execution. The attribute value corresponding to "skillIdentifier" (e.g., "{SkillNamespace}/{SkillName}: {Skill VersionInfo}") may specify the skill to which an override applies. In some embodiments, "SkillVersionInfo" may be in the semantic version format "{major Version}. {minor Version}. {patch Version}" for Skills that have a SkillSource of "Mocked". In some embodiments, the "SkillVersionInfo" may be of the format "{majorVersion}.\*.\*" for skills that have a SkillSource of "HostRegion", such that the version can be determined from the Host. In some embodiments, the "SkillVersionInfo" may be of the format "{major Version}.\*.\*" for skills that have a source of "externalOrchestrator", and the skill version may be discovered from Puffin at skill installation time. In some embodiments, the "skillVersionInfo" may be of the format "{major Version}.\*.\*" for skills that have a source of "SBTEProvided", and the skill version may be extracted from the SPAM that provides it.

In some embodiments, skill dependency override 2512 may include a "source" attribute which may be an instance of the skill source data structure 2514, the value of which may include an enumeration (e.g., SBTEProvided (default), HostRegion, Mocked, ExternalOrchestrator, etc.). The "source" attribute may be used to specify where the skill should be drawn from. If "HostRegion", the HostRegion's current state of the skill+major version may be leveraged for determining the semantic version, installation state, and health from the Host Region. If the source attribute is "Mocked", all three skill version fields may be populated, as well as the "skillHealthOverrideDuringInit." If the source attribute is equal to "externalOrchestrator", the major version may be required to determine Skill identity and the skill version may be discovered from Puffin at skill installation time. If the source attribute is equal to "SBTEProvided", the major version may be required to determine skill identity and the full skill version will extracted from the SPAM that provides it.

In some embodiments, the skill dependency override data structure 2512 may include an attribute "skillPreconditions" may specify skill identifiers that are the preconditions for the skill for determining timing. For "HostRegion" and "Mocked", the listed Skills may be used to express when the overriden Skill will appear as installed. For "externalOrchestrator", the field may be used to specify to the Region Orchestrator when to expect the external orchestrator will start the work installing the Skill for expressing what is being waited upon at the correct time. It may be invalid to have SkillPreconditions for a SkillSource of "SBTEProvided", as the SPAM(s) may already express that information.

The skill dependency override data structure 2512 may be associated with a health override data structure 2516 which may include an enumeration that indicates the skill override value (e.g., healthy, unhealthy, etc.). The value maintained in the health override data structure 2516 may be used to override a skill's health at the start of a region build.

Each SPAM of the participating SPAMs identified in SBTE specification data structure 2504 may be associated with an instance of spam version data structure 2506. Spam version data structure 2506 may include attributes "spamName" and "semantic Version." "SpamName" may specify the name of the SPAM, while the semantic version attribute may indicate one or more value depicted as part of semantic version data structure 2520 (e.g., major, minor, patch).

Create SBTE data structure 2502 may be associated with an instance of environment context data structure 2522, which may include any suitable number of attributes such as "environmentType" and "overlayDetails." In some embodiments, environmentType may be associated with environment type data structure 2524, the value of which may indicate an environment type (e.g., "overlay"). Environment context data structure 2522 may be associated with overlay details data structure 2526 which may include attributes "herdID" and "targetRegion." In some embodiments, the attribute value for "herdID" represents a Herd instance that has already been created in the Herd Service (e.g., the Herd Service 2410 of FIG. 14). The attribute "targetRegion" may identify the target region.

Figure 26:
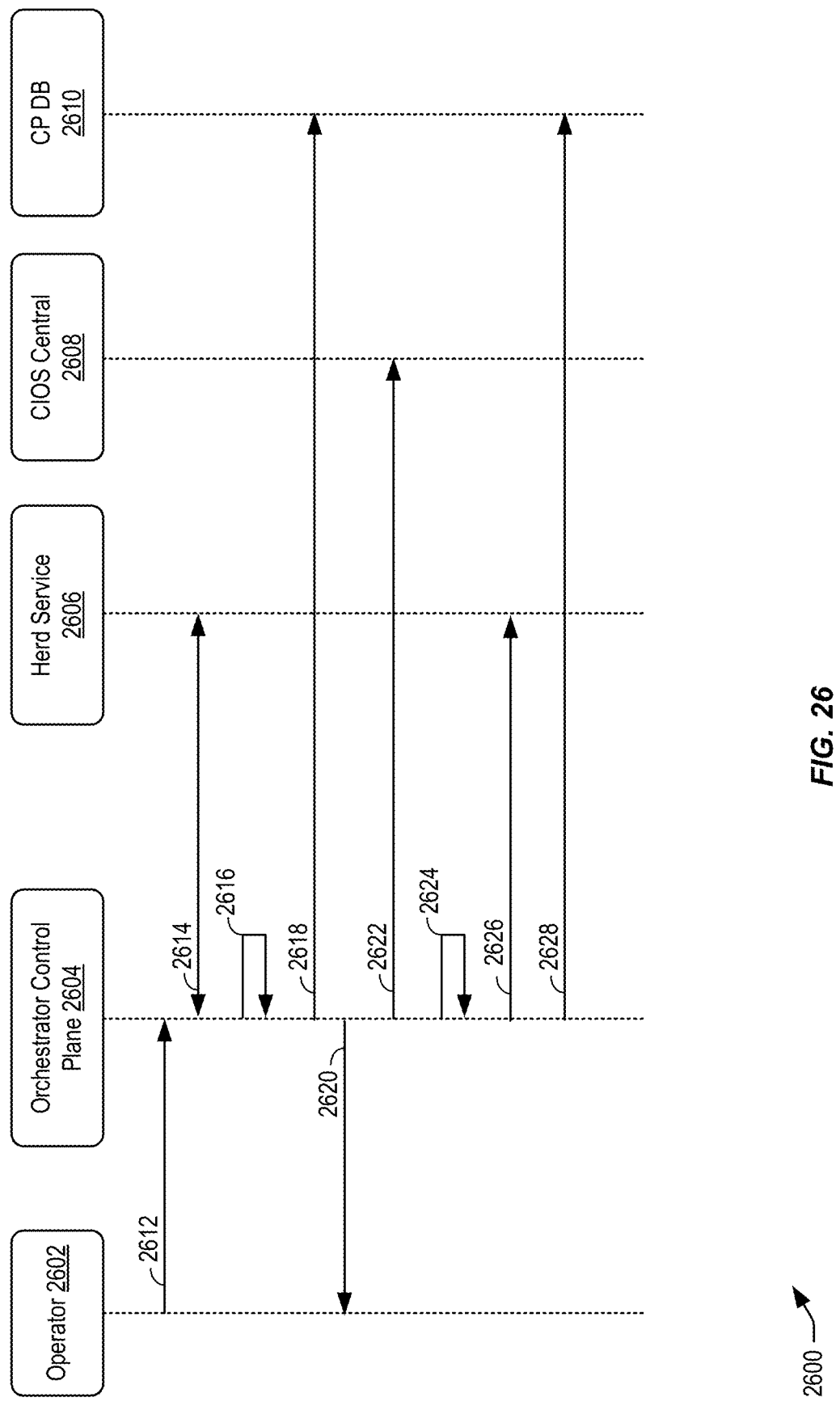
FIG. 26 is a flow diagram depicting an example method for creating a Service Build Test Execution (SBTE), in accordance with at least one embodiment.

FIG. 26 is a flow diagram depicting an example method 2600 for creating a Service Build Test Execution (SBTE), in accordance with at least one embodiment. Method 2600 may be performed using any suitable combination of the components of CIOS 102 of FIG. 1 such as Orchestrator Control Plane 2604 (e.g., Orchestrator Control Plane 107 of FIG. 1), Herd Service 2606 (e.g., Herd Service 2410 of FIG. 24), CIOS Central 2608 (e.g., CIOS Central 108 of FIG. 1), and Control Plane Database (CP DB) 2610. More or fewer operations than the ones provided in FIG. 26 may be included in method 2600. The operations may be performed in any suitable order.

Method 2600 may begin at 2612 where operator 2602, using any suitable user interface managed by the Orchestrator Control Plane 2604, may issue a create SBTE request (e.g., the create SBTE request discussed in connection with FIG. 24). In some embodiments, the request may include any suitable combination of the data described in connection with FIG. 25. The create SBTE request may identify any suitable number of SPAMs and associated metadata regarding build milestones, applicability, overrides, and environment context. In some embodiments, the request may include a user principal that serves as an identity credential for the operator 2602.

At 2614, the Orchestrator Control Plane 2604 may transmit to Herd Service 2606 a request to obtain the herd identified by the request. If the herd is known, any suitable metadata and/or resources may be returned by the Herd Service 2606. In some embodiments, the Herd Service 2606 may utilize the user principal for authorization processing to ensure that the operator 2602 is authorized to obtain herd details.

At 2616, the Orchestrator Control Plane 2604 may verify the create SBTE request's correctness against the herd. In some embodiments, if the SBTE request identifies resources that are not included in the herd, the request may be rejected and the operator 2602 may be notified via the interface. Otherwise, the method 2600 may proceed to 2618.

At 2618, the Orchestrator Control Plane 2604 may persist the SBTE details in CP DB 2610 (e.g., environment DB 3954 of FIG. 39) and may generate a unique identifier (e.g., a "SBTEID") for the SBTE.

At 2620, the Orchestrator Control Plane 2604 may return the SBTEID and a status of the request to the operator 2602 via a user interface (e.g., the user interface with which the create SBTE request was submitted at 2612).

At 2622, the Orchestrator Control Plane 2604 may validate the SPAM flock information with CIOS Central 2608. This may include identifying whether the SPAM has authorization to modify resources within the tenancy. In some embodiments, this may include transmitting a service principal credential associated with Orchestrator Control Plane 2604 and acting with the service principal on behalf of the SPAM. In some embodiments, CIOS Central 2608 may be used to verify the flocks used by the participating SPAMs have execution targets properly associated to the herd.

At 2624, the Orchestrator Control Plane 2604 may compose a region build plan based at least in part on the participating SPAMs identified. The region build plan (e.g., region build plan 338 of FIG. 3) may be built in a similar manner as discussed in connection with FIG. 15, by parsing the SPAMs, identifying dependencies, and generating a directed acyclic graph from which a serial set of instructions may be generated.

At 2626, the Orchestrator Control Plane 2604 may transmit the SBTEID to the Herd Service 2606, which may cause the SBTEID to be associated with the herdID.

At 2628, the Orchestrator Control Plane 2604 may store the region build plan in CP DB 1210 and set a status associated with the SBTE to "created."

In some embodiments, the Herd Service 2606 may be utilized to assign the SBTEID to the herd, to prevent any other SBTE or stampede from operating against the associated test tenancies. However, in this use case, the Herd Service 2606 may not perform any orchestration tasks. Orchestration, in this use case, may be handled by the Region Orchestrator (e.g., Region Orchestrator 2414 of FIG. 24).

Figure 27:
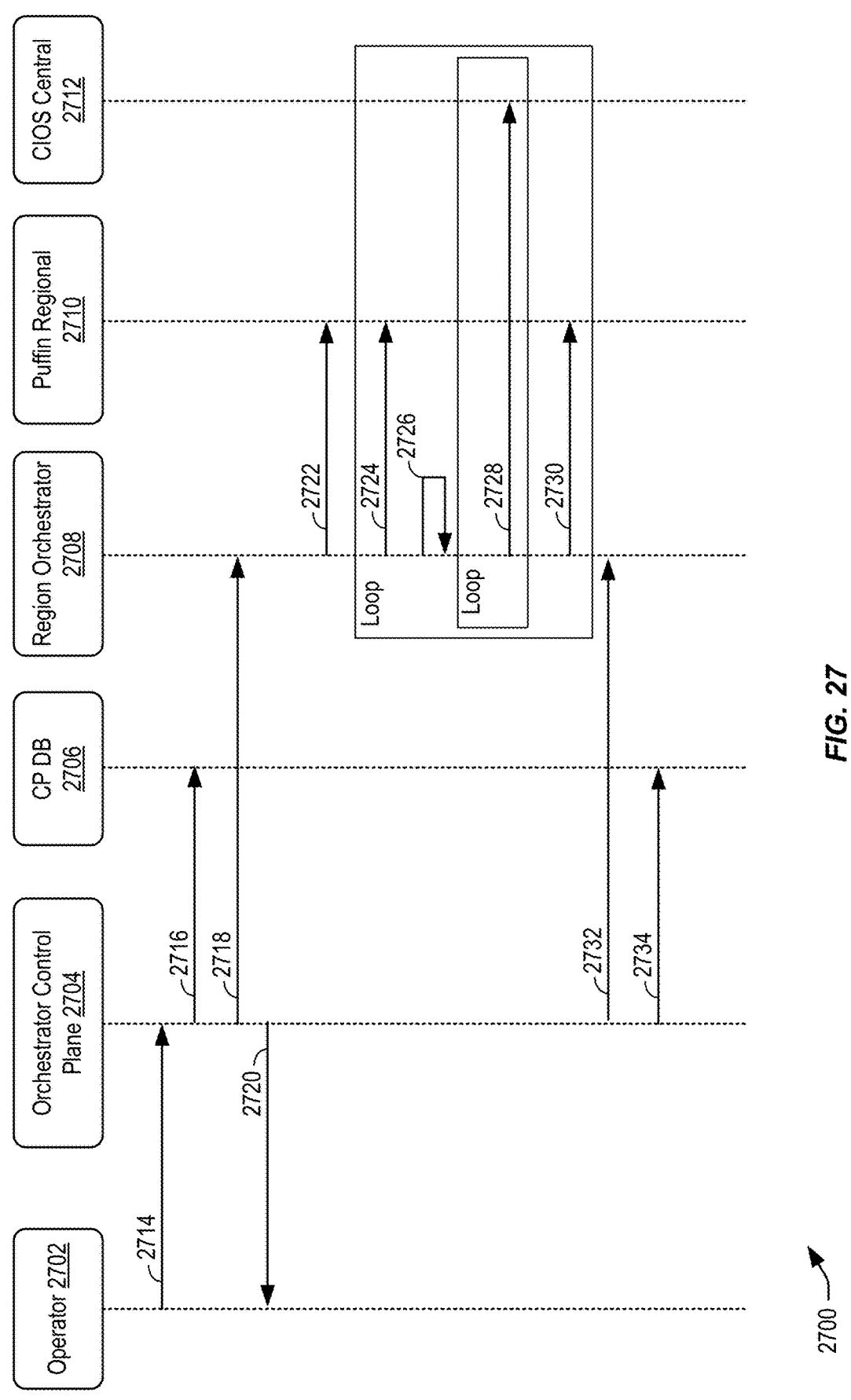
FIG. 27 is a flow diagram depicting an example method for running a Service Build Test Execution (SBTE), in accordance with at least one embodiment.

FIG. 27 is a flow diagram depicting an example method 2700 for running a Service Build Test Execution (SBTE), in accordance with at least one embodiment. Method 2700 may be performed using any suitable combination of the components of CIOS 102 of FIG. 1 such as Orchestrator Control Plane 2704 (e.g., Orchestrator Control Plane 107 of FIG. 1), Region Orchestrator 2708 (e.g., Region Orchestrator 106 of FIG. 1), Puffin Regional 2710 (e.g., Puffin Regional 120 of FIG. 1), and CIOS Central 2712 (e.g., CIOS Central 108 of FIG. 1). More or fewer operations than the ones provided in FIG. 27 may be included in method 2700. The operations may be performed in any suitable order.

The method 2700 may begin at 2714, where a start SBTE request (e.g., the start SBTE request discussed in connection with FIG. 24) may be issued to Orchestrator Control Plan 2704 (e.g., using any suitable user interface and/or command line interface).

At 2716, the Orchestrator Control Pane 2704 may identify, from data stored in Control Plane Database (CP DB) 2706, a service cell for the SBTE.

At 2718, the region build plan created in connection with method 2600 of FIG. 26 may be submitted, along with the SBTE specification received in the initial create SBTE request (e.g., received at 2612 of FIG. 26, to Region Orchestrator 2708. An SBTE state of "started" may be returned at 2620. This status may be provided in any suitable manner (e.g., via the interface used to issue the start SBTE request at 2714).

At 2722, the Region Orchestrator 2708 may prime Puffin Regional 2710 with mock skills for the SBTE with herdID assigned to the fleet. In some embodiments, multiple messages may be utilized (e.g., one message per SPAM). In some embodiments, the data transmitted to Puffin Regional 2710 may include a service principal associated with Region Orchestrator 2708. In some embodiments, a header associated with each transmission may indicate a respective SPAM associated with the skill(s) and the herdID.

At 2724, the Region Orchestrator 2708 may obtain skills associated with the herdID. Based at least in part on the skill dependencies associated with each SPAM, the Region Orchestrator 2708 may start the next execution unit(s) of the region build plan at 2726.

At 2728, the Region Orchestrator 2708 may perform a release for each release associated with the execution unit (e.g., via section 706 of FIG. 7) based at least in part on instructing CIOS Central 2710 to perform the release (e.g., via CIOS Regional 110 of FIG. 1). In some embodiments, each release may include the service principal credential of the Region Orchestrator 2708 with a header that indicates the herdID and a respective SPAM that is associated with the release.

At 2730, when a release is identified (e.g., by CIOS Central 2710) as being successful, Region Orchestrator 2708 may transmit data to Puffin Regional 2710 to update the skill to a state of "INSTALLED." This transmission may include (e.g., via a header) the service principal credential of the Region Orchestrator 2708, the herdID, and a respective SPAM that is associated with the release.

At 2732, Orchestrator Control Plane 2704 may identify (e.g., via state data) that the SBTE is complete and may record (e.g., via CP DB 2706) a status that indicates the SBTE is complete at 2734.

At any suitable time during execution of the SBTE, one or more interventions may be executed in the manner discussed in connection with FIG. 21.

Figure 28:
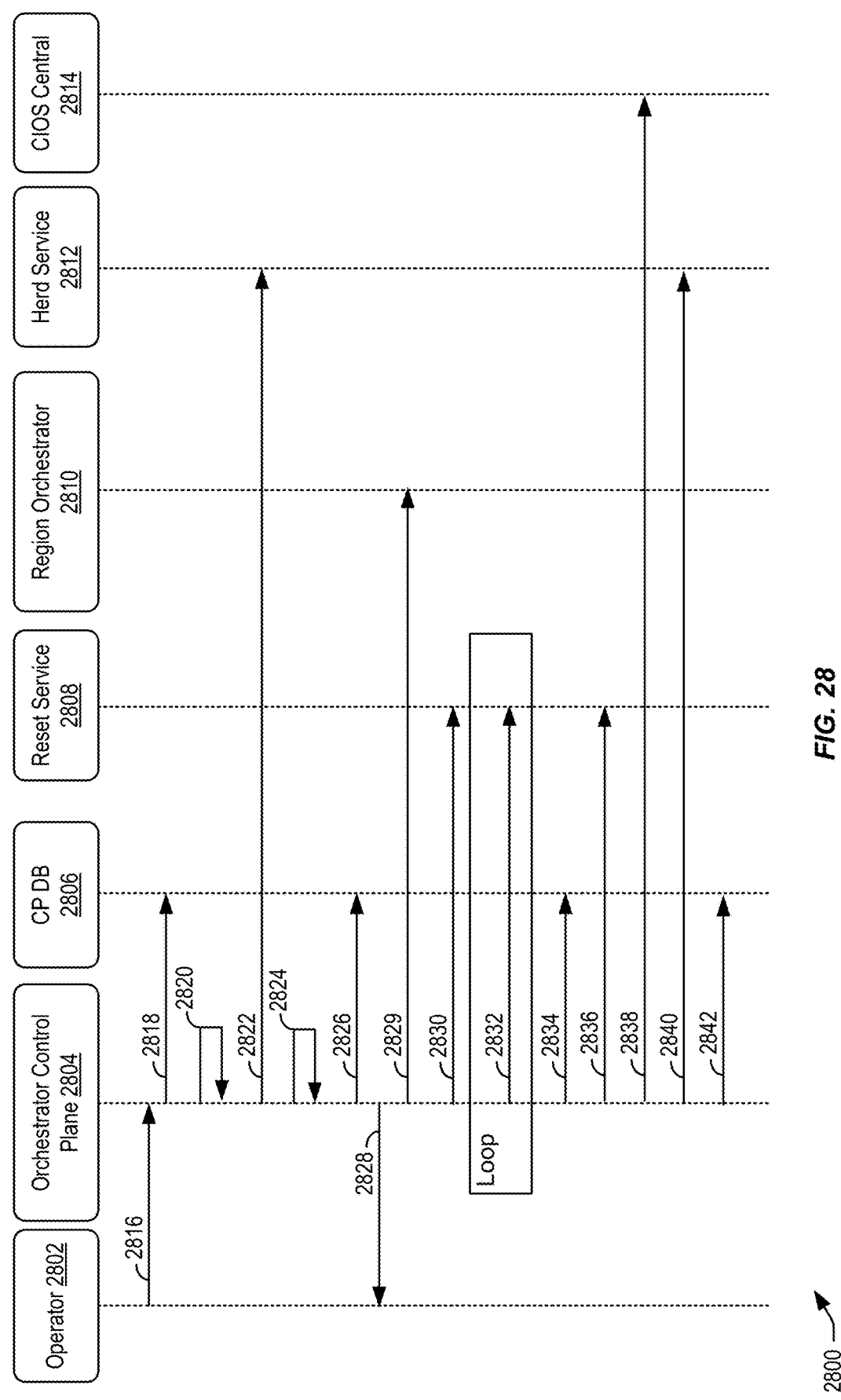
FIG. 28 is a flow diagram depicting an example method for resetting a Service Build Test Execution (SBTE), in accordance with at least one embodiment.

FIG. 28 is a flow diagram depicting an example method 2800 for resetting a Service Build Test Execution (SBTE), in accordance with at least one embodiment. Method 2800 may be performed using any suitable combination of the components of CIOS 102 of FIG. 1 such as Orchestrator Control Plane 2804 (e.g., Orchestrator Control Plane 107 of FIG. 1), Reset Service 2808 (e.g., Reset Service 2418 of FIG. 24), Region Orchestrator 2810 (e.g., Region Orchestrator 106 of FIG. 1), Herd Service 2812 (e.g., Herd Service 2410 of FIG. 1), and CIOS Central 2814 (e.g., CIOS Central 108 of FIG. 1). More or fewer operations than the ones provided in FIG. 28 may be included in method 2800. The operations may be performed in any suitable order.

The method 2800 may begin at 2816, where an reset SBTE request (e.g., the reset SBTE request discussed above in connection with FIG. 24) may be issued (e.g., by operator 2802 via a user interface or command line interface managed by Orchestrator Control Plane 2804).

At 2818, Orchestrator Control Plane 2804 may retrieve the status of the SBTE from Control Plane Database (CP DB) 2806 (e.g., environment database 3954 of FIG. 39) and may verify the SBTE status for the reset request at 2820. In some embodiments, a reset may only be allowed if the SBTE status indicates a certain set of status values (e.g., paused, complete, etc.).

At 2822, the Orchestrator Control Plane 2804 may retrieve herd status from the Herd Service 2812 and may verify the herd status for the reset request at 2824. In some embodiments, a reset may only be allowed if the herd status indicates one of a certain set of status values (e.g., paused, complete, etc.).

At 2826, the Orchestrator Control Plane 2804 may set the status of the SBTE to "reset" and may persist this status in CP DB 2806.

At 2828, the Orchestrator Control Plane 2804 may transmit data (e.g., via the user interface from which the reset SBTE request was issued at 2816) with which the operator 2802 may be notified of the status of the SBTE. In some embodiments, the status may indicate that the SBTE is in a "resetting" state.

At 2829, the Orchestrator Control Plane 2804 may transmit data to the Region Orchestrator 2810 notifying the Region Orchestrator 2810 of the reset.

At 2830, the Orchestrator Control Plane 2804 may transmit reset requests to the Reset Service 2808 requesting that each execution target associated with the test tenancies for the participating SPAMs be reset. In some embodiments, the reset requests may include a service principal credential associated with the Orchestrator Control Plane 2804 and/or a user principal associated with the operator 2802. In some embodiments, the service and/or user principal may be used to identify whether the service (e.g., Orchestrator Control Plane 2804) and/or the user (e.g., operator 2802) is authorized to reset execution targets. Transmitting such data may cause the Reset Service 2808 to perform any suitable operations for resetting the execution targets associated with the test tenancies of the SPAMs as discussed above in connection with FIG. 24.

At 2832, the Orchestrator Control Plane 2804 may periodically request reset results until the reset has reached completion. At 2834, the Orchestrator Control Plane 2804 may record the reset results within CP DB 2806.

At 2836, the Orchestrator Control Plane 2804 may retrieve a reset state file from the Reset Service 2808. In some embodiments, this may be transmitted to CIOS Central 2814 at 2838. In some embodiments, this transmission may include a service principal credential associated with the Orchestrator Control Plane and may include data indicating a SPAM as the calling entity and the herdID.

At 2840, the Orchestrator Control Plane 2804 may transmit data to Herd Service 2812 to remove an identifier associated with the SBTE (e.g., the SBTEID discussed in connection with FIG. 24) from the herd.

At 2842, the Orchestrator Control Plane 2804 may record the status of the reset as "completed."

Figure 29:
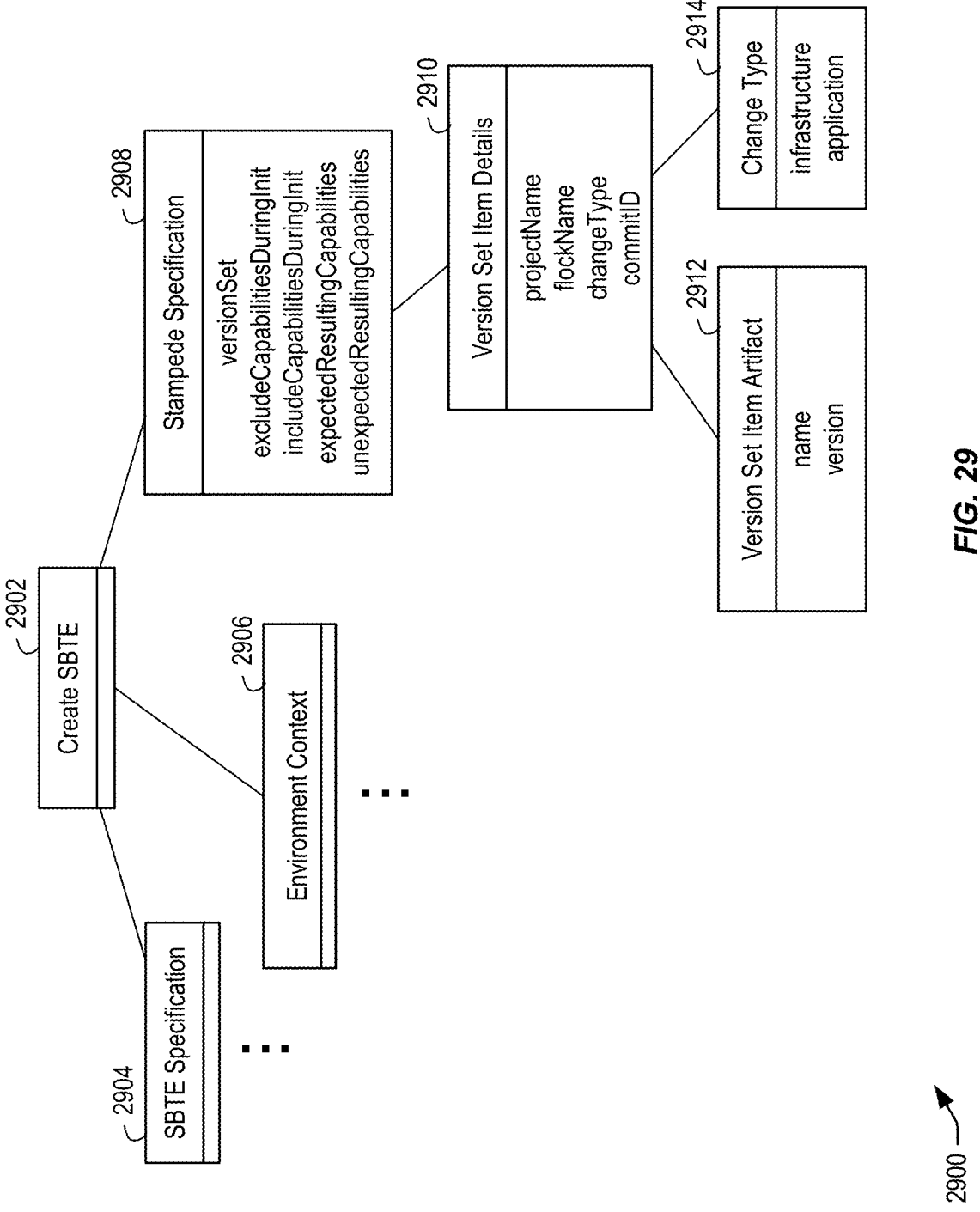
FIG. 29 is a block diagram depicting a data model representing additional metadata related to a Service Build Test Execution (SBTE), in accordance with at least one embodiment.

FIG. 29 is a block diagram depicting a data model 2900 representing additional metadata related to a Service Build Test Execution (SBTE), in accordance with at least one embodiment. In some embodiments, multiple orchestration techniques may be employed at the same time. For example, a capabilities-based orchestration technique from previous implementations of the CIOS system may be employed at the same time as the skill-based orchestration techniques employed by the Region Orchestrator discussed herein (e.g., Region Orchestrator 106 of FIG. 1). Testing techniques may be employed that enable an SBTE to be conducted when some service builds are implemented via flocks and status of releases is published via capabilities and when some service builds are implemented via corresponding SPAMs and publication of skills. A method for managing compatibility between capabilities and skills is discussed below in connection with FIG. 30. To enable this use case, additional data may be provided with the create SBTE request in this use case. Data model 2900 depicts this additional data via a number of data structures. Create SBTE data structure 2902 may be an example of the create SBTE data structure 2502 discussed above in connection with FIG. 25 and may include the same or similar data as discussed in connection with FIG. 25. Likewise, SBTE specification 2904 may be an example of the SBTE specification data structure 2504 and environment context data structure 2906 may be an example of the environment context data structure 2522 of FIG. 25. Each of the SBTE specification data structure 2904 and the environment context data structure 2906 may include similar data as their corresponding counterpart of FIG. 25.

In addition to the data discussed above in connection with FIG. 25, the create SBTE request may include data corresponding to the stampede specification data structure 2908. Stampede specification data structure 2908 may include attributes such as a "versionSet" attribute, the value of which may specify a set of flock configuration file versions corresponding to participating flocks. The stampede specification data structure 2908 may include attributes "excludeCapabiltiesDuringInit" and "excludeCapabiltiesDuringInit" that may individually include a list of capability identifiers that may be excluded or included, respectively, during initialization. The attribute "expectedResultingCapabilities" may include a list of capability identifiers that correspond to the capabilities to be posted during the SBTE. Similarly, attribute "unexpectedResultingCapabilities" may include a list of capability identifiers that correspond to the capabilities that are not expected to be posted during the SBTE.

Each item of the version set (e.g., a list of the artifacts being deployed) may be associated with an instance of version set item details data structure 2910. Version set item details data structure 2910 may include attributes for "projectName" (e.g., indicating a name associated with a project), a "flockName" (e.g., indicating a name for the flock), a change type, and a commit identifier (ID). The change type attribute may be associated with a change type data structure 2914, the attribute value of which may indicate that the change type is an "infrastructure" change or an "application" change. Each version set item may be associated with an instance of a version set item artifact data structure 2912 that includes attributes indicating a "name" of the version set item and a "version" associated with the version set item. By way of example, the version set item artifact may indicate a name and version of a flock config associated with the commitID of version set item details data structure 2910.

Figure 30:
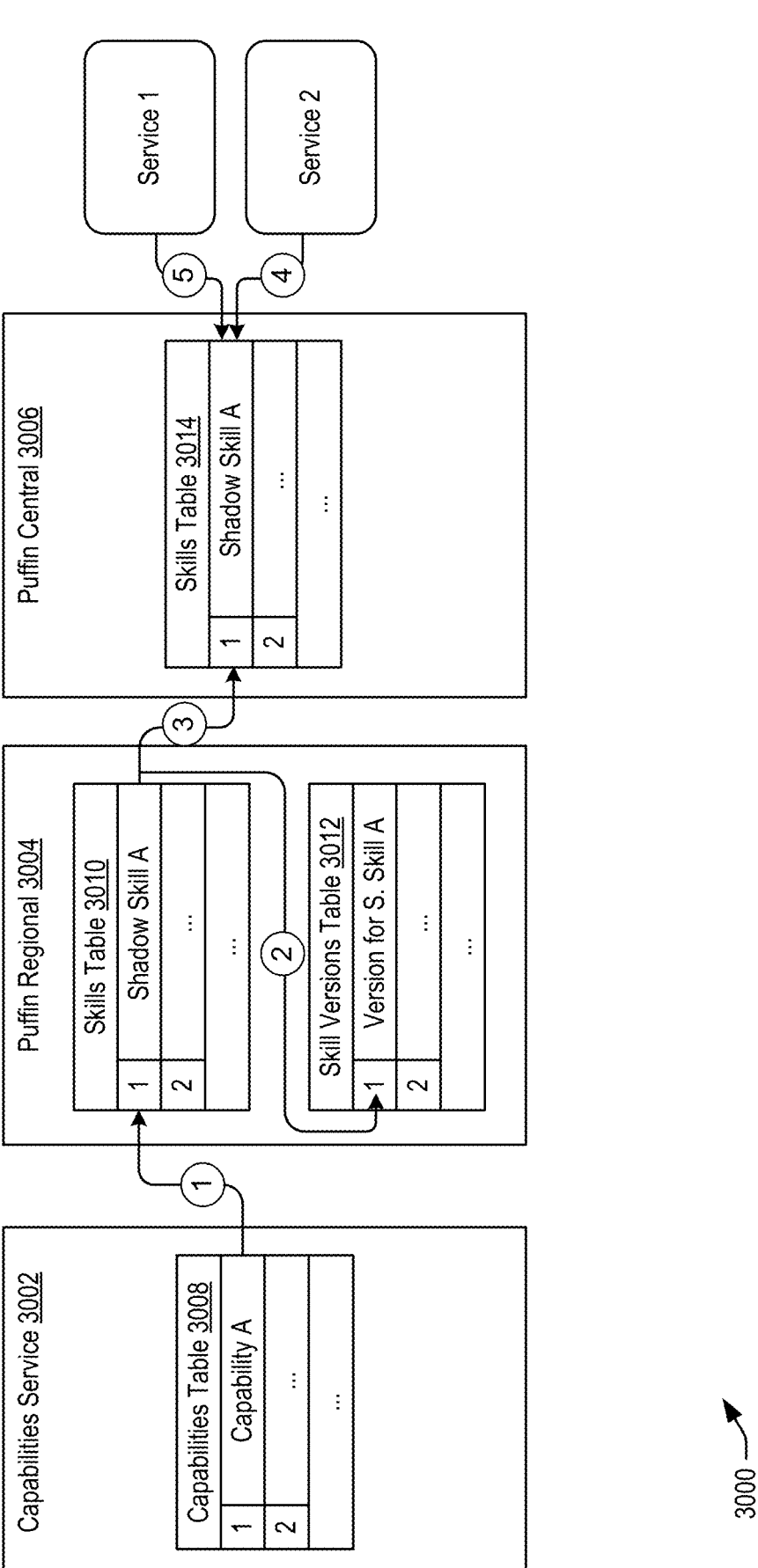
FIG. 30 is a block diagram depicting an example method for managing compatibility between capabilities and skills, in accordance with at least one embodiment.

FIG. 30 is a block diagram depicting an example method 3000 for managing compatibility between capabilities and skills, in accordance with at least one embodiment. The method 3000 may be performed with any suitable combination of a Capabilities Service 3002, Puffin Regional 3004 (e.g., Puffin Regional 120), and Puffin Central 3006 (e.g., Puffin Central 118 of FIG. 1). More or fewer operations may be included in method 3000 than the ones described in connection with FIG. 30. The operations of method 3000 may be performed in any suitable order.

Prior to execution of method 3000, a Capabilities Service 3002 may be configured to receive data (e.g., from CIOS Regional 110 of FIG. 1, Worker 320 of FIG. 3, Worker 328 of FIG. 3, etc.) indicating a capability is available in the region, or in other words, a capability has been published. A capability may correspond to a label and/or tag that, when published, indicates the availability of associated functionality. Capabilities may be from legacy implementations of the system, prior to being improved upon by skills. Capabilities Service 3002 may be configured to maintain a table or other suitable record (e.g., capabilities table 3008) which may be stored locally or at a storage location accessible to any suitable combination of components of CIOS 102 of FIG. 1. Capabilities table 3008 may include each previously published capability in the region. Additional details regarding the Capabilities Service 3002 is discussed in more detail in U.S. patent application Ser. No. 18/520,103, entitled "Tracking Data Center Build Dependencies with Capabilities and Skills," filed Nov. 27, 2023, the disclosure of which is herein incorporated by reference in its entirety for all purposes.

At step 1, at any suitable time, Puffin Regional 3004 may receive or obtain an indication that capability A has been published. Puffin Regional 3004 may be configured to manage or otherwise maintain any suitable records for all known skills (e.g., user defined and/or system generated skills, the latter being referred to as a "shadow skill"). By way of example only, Puffin Regional 3004 may manage skills table 3010 and skill versions table 3012. In some embodiments, skill table 3010 may include identifiers and/or skill data structures (e.g., each corresponding to skill data structure 1010 of FIG. 10) to maintain a record of all known skills. Skill versions table 3012 may be used to maintain knowledge of all versions corresponding to each skill as any suitable number of versions of a skill may be defined. In some embodiments, upon receiving/obtaining an indication that capability A has been published or is otherwise identified as being available, Puffin Regional 3004 may query skill table 3010 (or lookup or otherwise identify skills data structures) that are associated with capability A. This may include identifying from a skill data structure that a capabilities attribute of the structure is associated with a value corresponding to an identifier of capability A. If no skills are identified as being associated with capability A, Puffin Regional 3004 may be configured to generate a shadow skill (e.g., an instance of any suitable combination of the data structures of skills metadata 1004 of FIG. 10) and set the attributes of the shadow skill to default and/or specific values in accordance with a predefined protocol and/or according to attributes of the capability (e.g., the capability's identifier). As a non-limiting example, Puffin Regional 3004 may generate an instance of skill data structure 1010 at step 1. This instance of skills metadata may be referred to as "skill A" and may be used to represent capability A.

At step 2, if a shadow skill is generated at step 1, Puffin Regional 3004 may generate a skill version data structure 1014 for shadow skill A. In some embodiments, the value for the data structure attributes associated with shadow skill A may be set to values according to a predefined protocol. In some embodiments, a skill's version may be used to track runtime information of the skill (e.g., whether the skill is installed and/or heathy). The term "skills" may be utilized herein to refer to any suitable combination of user-defined skills and/or system-generated shadow skills.

At step 3, at any suitable time, Puffin Regional 3004 may execute an application programming interface (API) call to Puffin Central 3006 to inform Puffin Central 3006 of Skill A's existence. In some embodiments, the data provided via this API call may include any suitable portion of skill A's metadata as generated and/or modified by Puffin Regional 3004. Puffin Regional 3004 may present any suitable information corresponding to shadow skill A via any suitable user interface on demand.

As a non-limiting use case example, Service 2 may have once depended on capability A, but is not associated with a flock config and/or SPAM that utilizes skills to express the process for building Service 2. Based at least in part on the existence of shadow skill A, Service 2 may register a dependency against shadow skill A at step 4, enabling a dependency of Service 2 on capability A to be expressed using a skill (shadow skill A) instead of capability A. The use of the shadow skill enables Puffing Central 3006 and/or Puffing Regional 3004 to track region build process using a single construct, skills, which include attributes that enable the tracking functionality previously lacking with respect to capabilities.

At step 5, perhaps after Service 1 is associated with an region build plan that is executed in terms of skills, rather than capabilities, one or more user interfaces of Puffin Central 3006 may be utilized for shadow skill A to be claimed by Service 1 (e.g., via a user interface managed by Puffin Central 3006).

Figure 31:
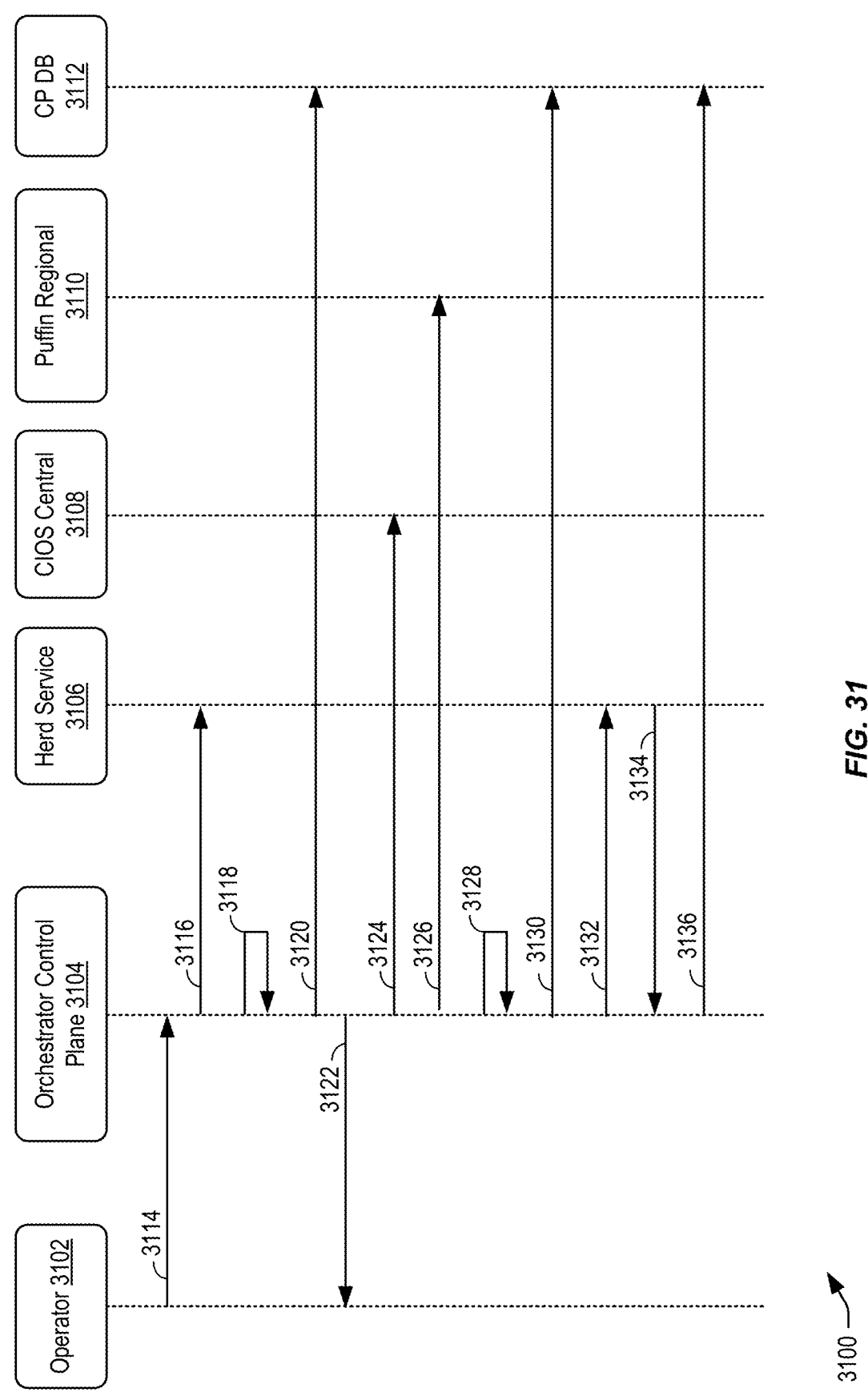
FIG. 31 is a flow diagram depicting another example method for creating a Service Build Test Execution (SBTE), in accordance with at least one embodiment.

FIG. 31 is a flow diagram depicting another example method 3100 for creating a Service Build Test Execution (SBTE), in accordance with at least one embodiment.

Method 2600 may be performed using any suitable combination of the components of CIOS 102 of FIG. 1 such as Orchestrator Control Plane 3104 (e.g., Orchestrator Control Plane 107 of FIG. 1), Herd Service 3106 (e.g., Herd Service 2410 of FIG. 24), CIOS Central 3108 (e.g., CIOS Central 108 of FIG. 1), Puffing Regional 3110 (e.g., Puffin Regional 120 of FIG. 1), and Control Plane Database (CP DB) 3112. More or fewer operations than the ones provided in FIG. 31 may be included in method 3100. The operations may be performed in any suitable order.

Method 3100 may begin at 3114 where operator 3102, using any suitable user interface managed by the Orchestrator Control Plane 3104, may issue a create SBTE request (e.g., the create SBTE request discussed in connection with FIG. 24). In some embodiments, the request may include any suitable combination of the data described in connection with FIGS. 25 and 29. The create SBTE request may identify any suitable number of SPAMs and associated metadata regarding build milestones, applicability, overrides, and environment context. In some embodiments, the request may include a user principal that serves as an identity credential for the operator 2602. The operations performed at 3114-3124 may generally correspond to the operations performed at 2612-2622 of FIG. 26.

At 3126, the Orchestrator Control Plane 3104 may transmit verify that the skills and capabilities to be published are compatible with one another based at least in part on providing any suitable data from the create SBTE request to Puffin Central 3110. In some embodiments, the data may be transmitted with a service principal credential associated with Orchestrator Control Plane 3104 and an indication of the SPAM for which the skill(s) and/or capabilities relate. In some embodiments, Puffin Central 3110 may be configured to perform authorization processing with the service principal credential and, if authorized, identify whether the skills and capabilities are compatible (e.g., by checking the capabilities table 3008 and skills table 3014 of FIG. 30 for compatibility).

At 3128, the Orchestrator Control Plane 3104 may compose a region build plan based at least in part on the participating flocks and SPAMs identified. The region build plan (e.g., region build plan 338 of FIG. 3) may be built in a similar manner as discussed in connection with FIG. 15, by parsing the SPAMs, identifying dependencies, and generating a directed acyclic graph from which a serial set of instructions may be generated. In some embodiments, synthetic external execution units may be included for the shadow skills published by the stampede execution (e.g., the orchestration tasks corresponding to the identified flocks and orchestrated by the Herd Service 3106).

At 3130, the Orchestrator Control Plane 3104 may store the region build plan in CP DB 3112.

At 3132, the Orchestrator Control Plane 3104 may create a stampede run with the stampede specification data discussed in connection with FIG. 29. A participating SBTE identifier (an "SBTEID") may be generated. The request to create a stampede run may be transmitted to the Herd Service 3106 and may include the service principal credential of the Orchestration Control Plane 3104 and/or a user principal credential with which authentication and/or authorization processing may be conducted for the Orchestrator Control Plane 3104 and operator 3102, respectively.

If stampede creation is successful, the Orchestrator Control Plane 3104 may receive a stampede identifier (e.g., a "stampedeID") at 3134. At 3136, the stampedeID may be transmitted to the CP DB 3112 for storage and the status of the SBTE may be set to "created."

Figure 32:
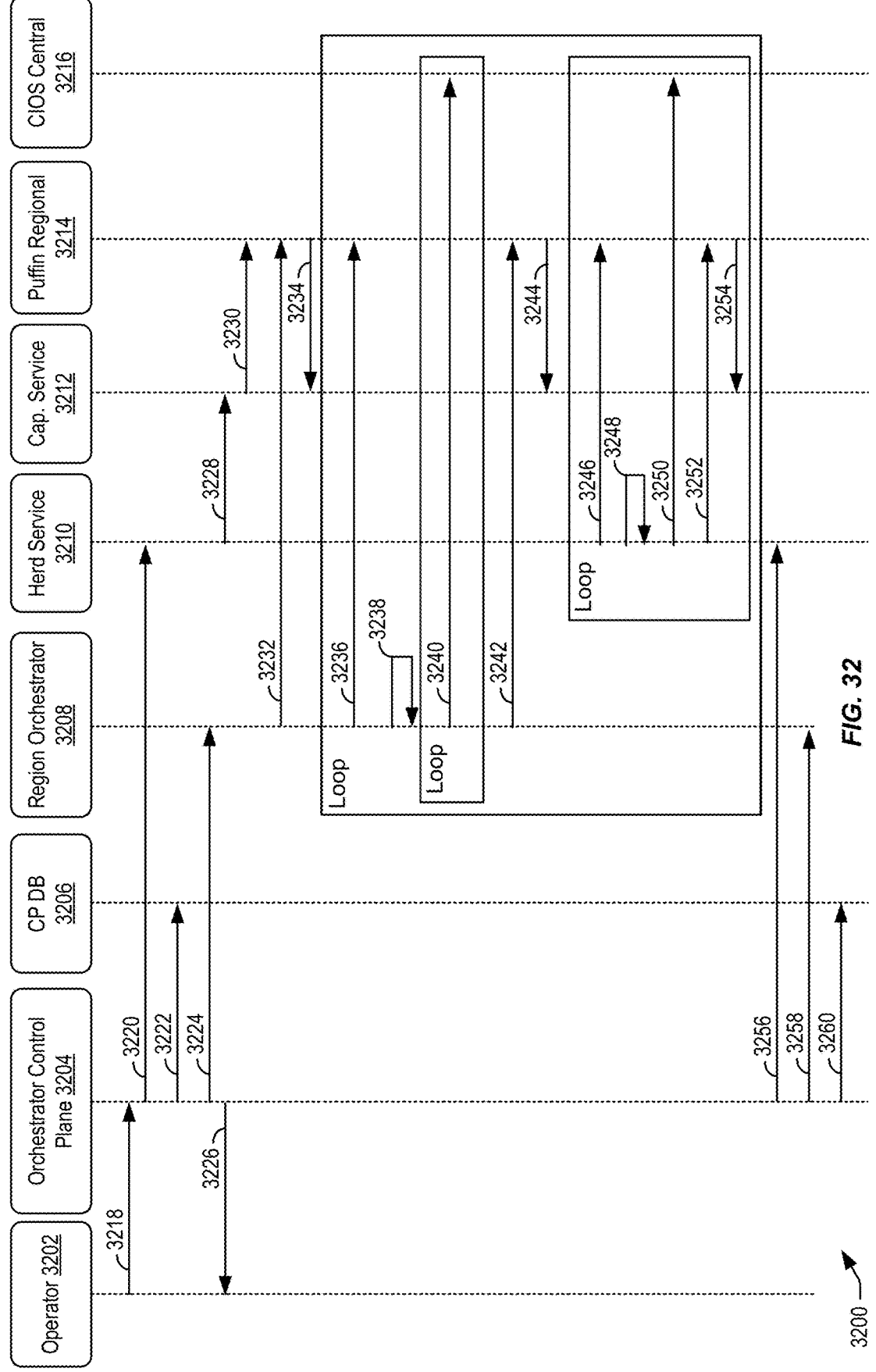
FIG. 32 is a flow diagram depicting another example method for running a Service Build Test Execution (SBTE), in accordance with at least one embodiment.

FIG. 32 is a flow diagram depicting another example method 3200 for running a Service Build Test Execution (SBTE), in accordance with at least one embodiment. Method 3200 may be performed using any suitable combination of the components of CIOS 102 of FIG. 1 such as Orchestrator Control Plane 3204 (e.g., Orchestrator Control Plane 107 of FIG. 1), Region Orchestrator 3208 (e.g., Region Orchestrator 106 of FIG. 1), Herd Service 3210 (e.g., the Herd Service 2410 of FIG. 24), Capabilities Service 3212 (a component of a legacy implementation of CIOS 102 of FIG. 1), Puffin Regional 3214 (e.g., Puffin Regional 120 of FIG. 1), and CIOS Central 3216 (e.g., CIOS Central 108 of FIG. 1). More or fewer operations than the ones provided in FIG. 32 may be included in method 3200. The operations may be performed in any suitable order.

The method 3200 may begin at 3218, where a start SBTE request (e.g., the start SBTE request discussed in connection with FIG. 24) may be issued to Orchestrator Control Plan 3204 (e.g., using any suitable user interface and/or command line interface).

At 3220, the Orchestrator Control Pane 2704 may execute any suitable call to invoke functionality of the Herd Service 3210 to start a stampede. The data transmitted at 3220 may include a service principal credential associated with the Orchestration Control Plane 3104 and/or a user principal credential associated with the operator 3202 with which authentication and/or authorization processing may be conducted for the Orchestrator Control Plane 3104 and operator 3102, respectively.

At 3222, the Orchestrator Control Pane 2704 may identify, from data stored in Control Plane Database (CP DB) 3206, a service cell for the SBTE.

At 3224, the region build plan created in connection with method 3100 of FIG. 31 may be submitted, along with the SBTE specification received in the initial create SBTE request (e.g., received at 3114 of FIG. 31, to Region Orchestrator 3208. An SBTE state of "started" may be returned at 3226. This status may be provided in any suitable manner (e.g., via the interface used to issue the start SBTE request at 3218).

At 3226, the Region Orchestrator 3208 may prime the Capabilities Service 3212 with the capabilities needed for stampede execution. Transmitting these capabilities may cause the Capabilities Service 3212 to create, at 3228, shadow skills with Puffin Regional 3214 corresponding to the primed capabilities. Puffin Regional 3214 may maintain the associations between these capabilities and shadow skills in a similar manner as discussed above in connection with FIG. 30.

At 3232, the Region Orchestrator 3208 may prime Puffin Regional 3214 with mock skills for the SBTE with herdID assigned to the fleet. In some embodiments, multiple messages may be utilized (e.g., one message per SPAM). In some embodiments, the data transmitted to Puffin Regional 3214 may include a service principal associated with Region Orchestrator 2708. In some embodiments, a header associated with each transmission may indicate a respective SPAM associated with the skill(s) and the herdID.

At 3234, Puffin Regional 3214 may create shadow capabilities from primed skills identified at 3234. In some embodiments, associations between the primed skill and shadow capabilities may be maintained in the manner discussed in connection with FIG. 30.

At 3236, the Region Orchestrator 3208 may obtain skills and shadow skills associated with the herdID. Based at least in part on the skill dependencies associated with each SPAM, the Region Orchestrator 3208 may start the next execution unit(s) of the region build plan at 3238.

At 3240, the Region Orchestrator 3208 may perform a release for each release associated with the execution unit (e.g., via section 706 of FIG. 7) based at least in part on instructing CIOS Central 3216 to perform the release (e.g., via CIOS Regional 110 of FIG. 1). In some embodiments, each release may include the service principal credential of the Region Orchestrator 3208 with a header that indicates the herdID and a respective SPAM that is associated with the release.

At 3242, when a release is identified (e.g., by CIOS Central 3216) as being successful, Region Orchestrator 3208 may transmit data to Puffin Regional 3214 to update the skill to a state of "INSTALLED." This transmission may include (e.g., via a header) the service principal credential of the Region Orchestrator 3208, the herdID, and a respective SPAM that is associated with the release. In some embodiments, a shadow capability corresponding to the installed skill may be generated and/or updated at 3244.

The operations at 3246-3254 may be performed any suitable number of times until all the expected capabilities identified with the data corresponding to FIG. 29 have been generated.

At 3246, the Herd Service 3210 may obtain capabilities (e.g., from Puffin Regional 3214) and shadow capabilities corresponding to the herdID.

At 3248, based on the capabilities and shadow capabilities obtained, the Herd Service 3210 may identify the next release to execute (e.g., based at least in part on identifying dependencies between capabilities/shadow capabilities associated with those releases).

At 3250, data may be transmitted by the Herd Service 3210 to CIOS Central 3216 to cause the release identified at 3248 to be attempted. If successful, the method may proceed to 3252.

At 3252, the Herd Service 3210 may publish a capability or otherwise mark the capability as being installed. This may include transmitting data identifying the capability to Puffin Regional 3214. A shadow skill corresponding to the installed capability may be generated and/or updated at 3254.

At 3256, Orchestrator Control Plane 3204 may identify (e.g., via state data) that the stampede is complete.

At 3258, Orchestrator Control Plane 3204 may identify (e.g., via state data) that the SBTE is complete.

At 3260, based at least in part on identifying that the stampede and the SBTE are complete, the Orchestrator Control Plane 3204 may record (e.g., via CP DB 3206) data that indicates the stampede and the SBTE executions are complete.

At any suitable time during execution of the SBTE, one or more interventions may be executed in the manner discussed in connection with FIG. 21.

Figure 33:
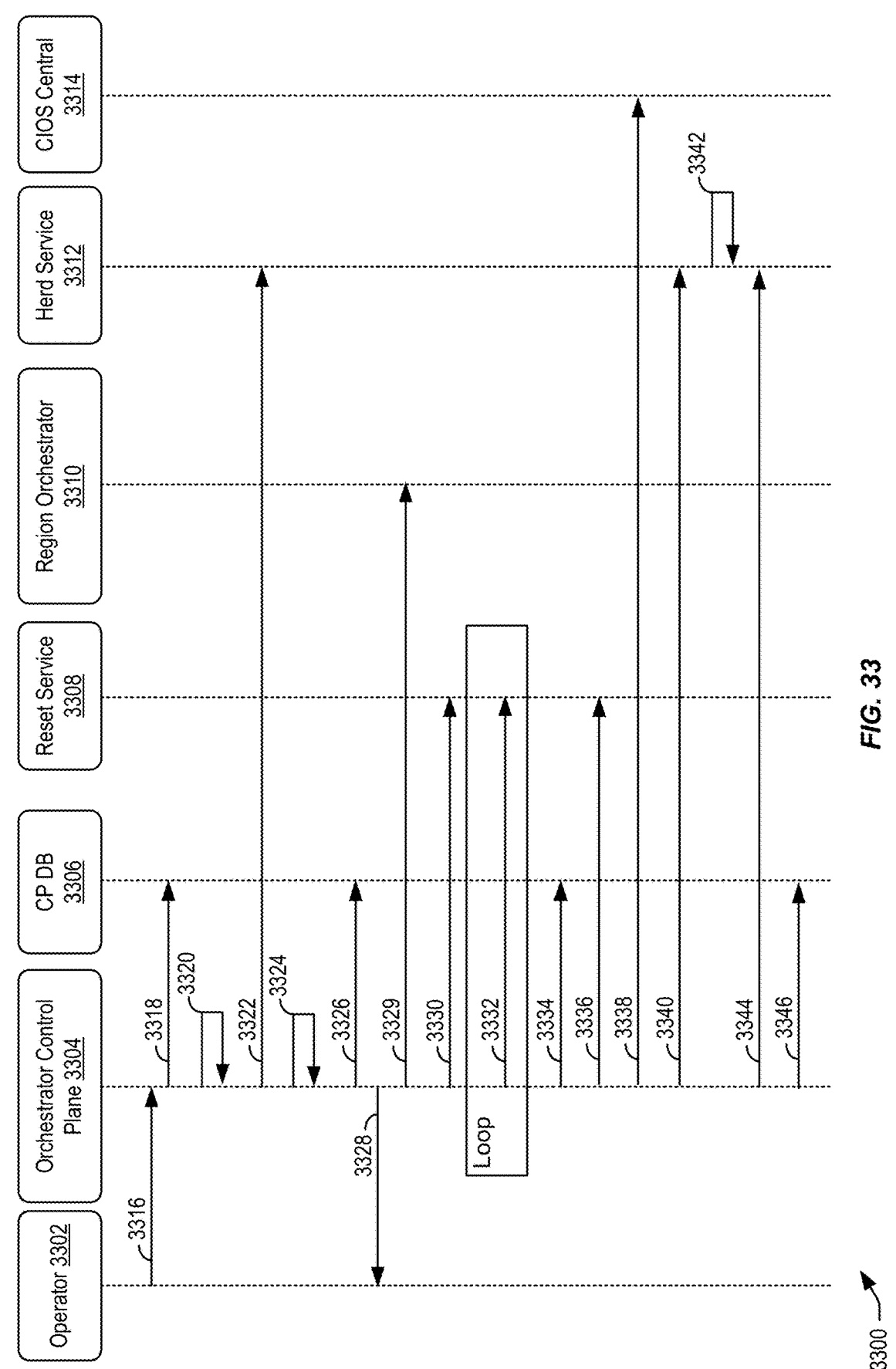
FIG. 33 is a flow diagram depicting another example method for resetting a Service Build Test Execution (SBTE), in accordance with at least one embodiment.

FIG. 33 is a flow diagram depicting an example method 3300 for resetting a Service Build Test Execution (SBTE), in accordance with at least one embodiment. Method 3300 may be performed using any suitable combination of the components of CIOS 102 of FIG. 1 such as Orchestrator Control Plane 3304 (e.g., Orchestrator Control Plane 107 of FIG. 1), Reset Service 3308 (e.g., Reset Service 2418 of FIG. 24), Region Orchestrator 3310 (e.g., Region Orchestrator 106 of FIG. 1), Herd Service 3312 (e.g., Herd Service 2410 of FIG. 1), and CIOS Central 3314 (e.g., CIOS Central 108 of FIG. 1). More or fewer operations than the ones provided in FIG. 33 may be included in method 3300. The operations may be performed in any suitable order.

The method 3300 may begin at 3316. The operations performed at 3316-3329 may generally correspond to the operations performs at 2816-2829 of FIG. 28.

At 3330, the Orchestrator Control Plane 3304 may transmit reset requests to the Reset Service 3308 requesting that each execution target associated with the test tenancies for the participating stampede and SPAMs be reset. In some embodiments, the reset requests may include a service principal credential associated with the Orchestrator Control Plane 3304 and/or a user principal associated with the operator 3302. In some embodiments, the service and/or user principal may be used to identify whether the service (e.g., Orchestrator Control Plane 3304) and/or the user (e.g., operator 3302) is authorized to reset execution targets. Transmitting such data may cause the Reset Service 3308 to perform any suitable operations for resetting the execution targets associated with the test tenancies of the SPAMs as discussed above in connection with FIG. 24.

At 3332, the Orchestrator Control Plane 2804 may periodically request reset results until the reset has reached completion. At 3334, the Orchestrator Control Plane 2804 may record the reset results within CP DB 3306.

At 3336, the Orchestrator Control Plane 3304 may retrieve a reset state file from the Reset Service 3308. In some embodiments, this may be transmitted to CIOS Central 3314 at 3338. In some embodiments, this transmission may include a service principal credential associated with the Orchestrator Control Plane and may include data indicating a SPAM as the calling entity and the herdID.

At 3340, the Orchestrator Control Plane 3304 may transmit data to Herd Service 3312 to initiate a minimal stampede reset. In some embodiments, initiating a minimal stampede reset may skip a reset service call. In some embodiments, this data may include a service principal credential associated with the Orchestrator Control Plane 3304 and/or a user principal associated with the operator 3302. In some embodiments, the Herd Service 3312 may use the service and/or user principal to identify whether the service (e.g., Orchestrator Control Plane 3304) and/or the user (e.g., operator 3302) is authentic and/or authorized to perform a minimal stampede reset.

At 3342, the Herd Service 3312 may clear an internal state in response to receiving the data transmitted at 3340.

At 3344, the Orchestrator Control Plane 3304 may transmit data to Herd Service 3312 to remove an identifier associated with the SBTE (e.g., the SBTEID discussed in connection with FIG. 24) from the herd.

At 3346, the Orchestrator Control Plane 3304 may record the status of the reset as "completed."

Unwind

Moving backwards in the installation process to a previously stable state (referred to as "unwinding") may be beneficial to trouble shoot issues or to recover from an error state. When a service team needs to update their service build definition, the Orchestrator Control Plane (e.g., Orchestrator Control Plane 107 of FIG. 1) may facilitate integration of the updates into a new plan. The new plan may be validated and will replace the old plan so execution can pick up from where the old plan has reached. This enables teams to introduce fixes and test these fixes to their service build while being able to revert to a previous state and begin again.

Once scenario in which unwinding a service build is useful is to recover from an error state. In this scenario, a backward workflow of relevant execution units are invoked to undo the effects of a forward transition. A new region build plan may be introduced. The new region build plan may include new SPAM(s), additional forward/backward execution units to existing SPAM(s), manifest changes, or the like. The change may be validate to ensure the execution can be continued from the current point and that the goat state is reachable. A valid plan may be executed to move forward with the build.

Using the ability to unwind build progress, service teams may perform rapid iterations on the plan involving replacing steps in forward/backward execution units while developing a SPAM. Breakpoints may be used to pause execution and resume it, so that engineers working on development can inspect, debug, and resume execution, potentially unwinding and progressing forward any number of times to correct service build errors and to develop their SPAM.

The unwind techniques discussed herein may be employed in a standard region build (e.g., discussed in connection with FIGS. 2, 3, and 16) and/or a test environment (e.g., using the testing techniques and environment discussed in connection with FIGS. 24-33).

Figure 34:
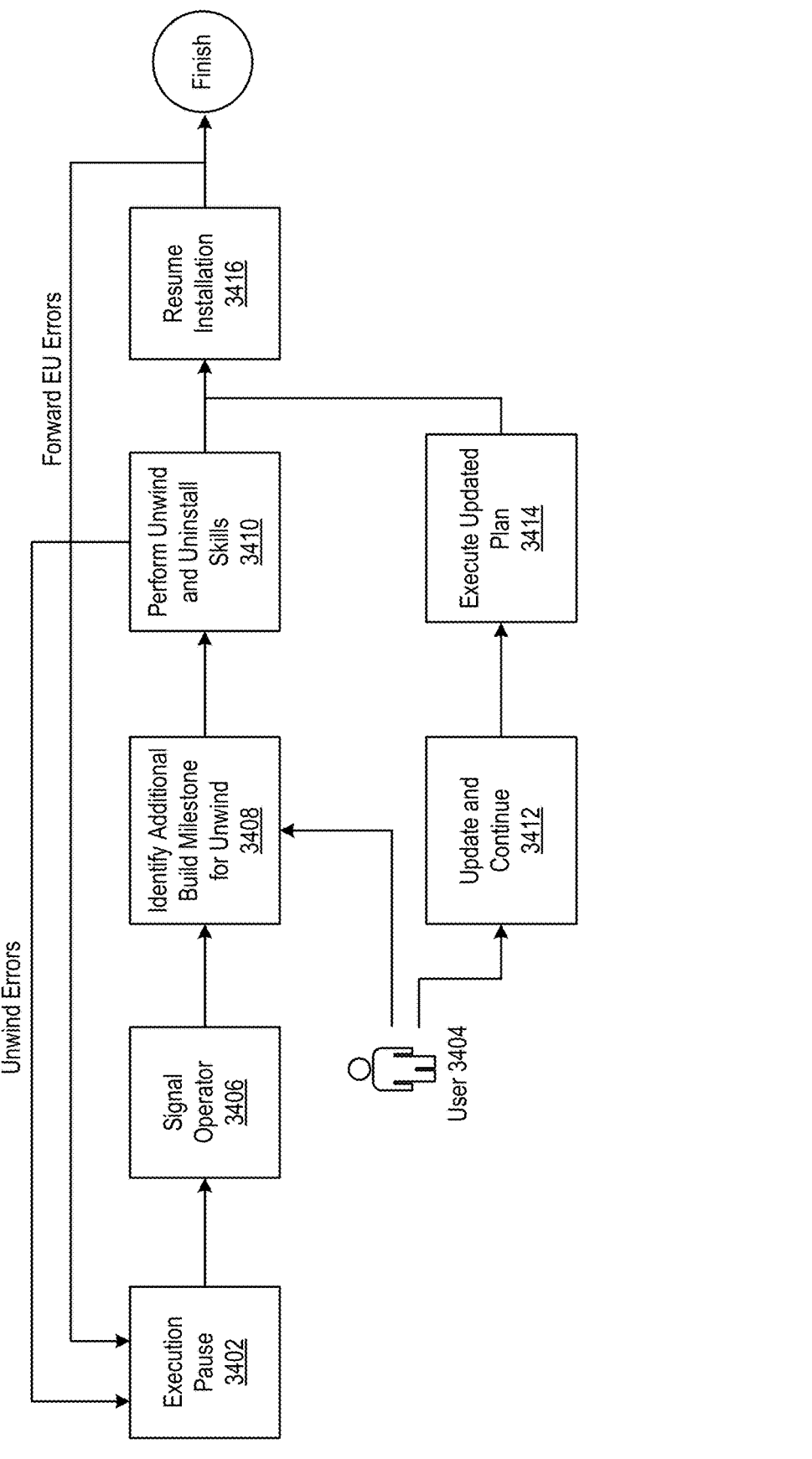
FIG. 34 is a block diagram depicting an overview of unwinding a service build, in accordance with at least one embodiment.

FIG. 34 is a block diagram 3400 depicting an overview of unwinding a service build, in accordance with at least one embodiment. One benefit of utilizing SPAMs is that service builds can include details for reversing installation progress. By way of example, backward steps like the one depicted in section 706 of FIG. 7 may be utilized to specify reversing installation progress of a service build. The ability to unwind is important for a myriad of reasons such as upon encountering an automation error. Unwinding a service may be initiated from any arbitrary point in execution and may be used to transition the region to a prior stable state. A successful unwind and move forward (e.g., with an updated service plan) may be used to troubleshoot and/or remedy automation issues, enabling service teams to verify their changes, and to ensure a more deterministic region build process.

An unwind workflow may be invoked during testing scenarios and build automation issues. By way of example, an execution pause may occur at 3402 (e.g., based on user input related to performing an intervention, based on encountering an error, etc.). The operator (e.g., user 3404) may be signaled at 3406. This signal may occur in any suitable manner such as presenting a notification at a console application or other suitable user interface managed by a component of CIOS 102 of FIG. 1. As another suitable example, data may be sent to a device associated with the user 3409 based at least in part on an association between the user 3409, their device, and a service corresponding to the error encountered at 3402. As a non-limiting example, an error may surface in the process of executing an execution unit in an attempt to transition a SPAM from one build milestone to another. As a result of encountering the error, the region build plan executor (e.g., plan executor 1320 of FIG. 13) may enter a pause state for one or more of its tracks to prevent a set of SPAMs from further advancement in build milestones.

A Region Orchestrator (e.g., the Region Orchestrator 106 of FIG. 1) may notify the user 3404 of the failure (e.g., via a work ticket and/or a notification provided via a user interface managed by a component of CIOS 102 and/or a remote communication system associated with the cloud provider).

In some embodiment, a build planner (e.g., build planner 1312 of FIG. 13) may be configured to generate a new region build plan to go to a prior stable state. In some embodiments, this may include, at 3408, the user 3404 (e.g., a build operator) identifying a build milestone to which to unwind.

Given the build milestone to which to unwind (referred to as a "goal state"), the build planner may compute the backward execution unit workflow to reach the goal state. The plan executor (e.g., the plan executor 1320 of FIG. 13) may execute the backwards workflow to perform the unwind and to uninstall corresponding skills at 3410. In some embodiments, if the build is in the middle of an execution unit, the build planner may not be able to compute the backward path automatically. In these use cases, a user interface may be presented to enable the user 3404 to specify necessary unwind steps to transition the execution state to the desired build milestone.

To effectuate the unwind, the plan executor may take the new set of instructions start the unwind operations along the backward execution units for relevant tracks to take the installation progress of a service to the desired build milestone. During unwind, any skills that were published as part of previous forward progress of a corresponding execution unit may be uninstalled. Dependent SPAM's build milestones may be moved to an earlier state that does not require any of the uninstalled skills, meaning backward workflow execution that leads to skill uninstallation should ensure the overall consistency of region build by ensuring dependent services are at a build milestone that meets all its preconditions. Any suitable error experienced through the execution of the unwind procedure may cause an execution pause at 3402 and the process may begin anew.

Once unwind is complete, the forward moving installation may be resumed at 3416. Optionally, the user 2404 may modify any suitable aspect of the service build such as providing an updated SPAM and may continue the build at 3412. Upon receiving the update, the build planner may compute a new plan and may execute the updated plan at 3414 which may cause the forward installation to resume at 3416. At any point after resuming forward execution unit transitions, should error occur, an execution pause may occur once more at 3402 and the process may begin anew.

This process may be conducted any suitable number of times until the region build has finished at 3418.

Figure 35:
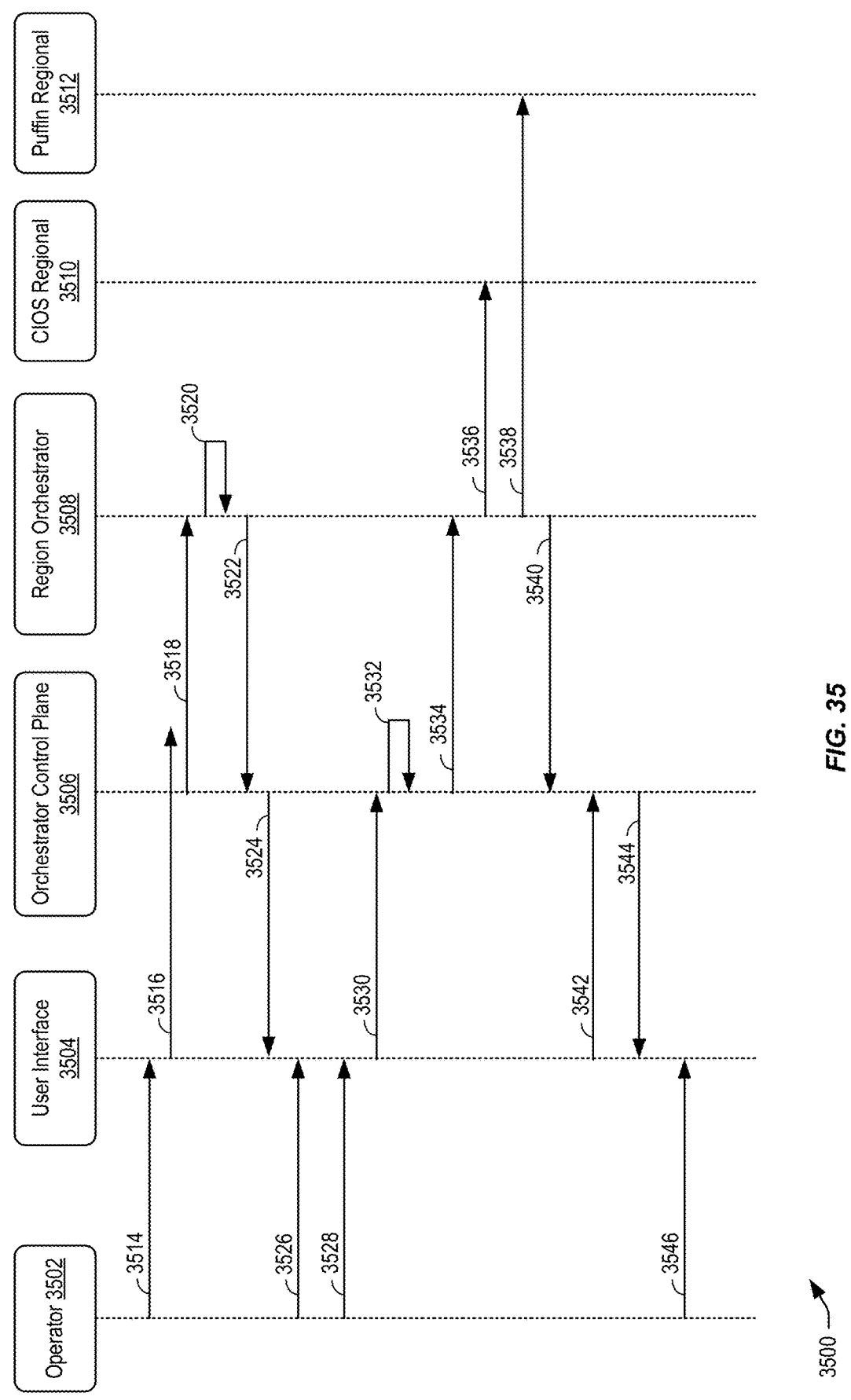
FIG. 35 is a flow diagram depicting a method for unwinding a service build, in accordance with at least one embodiment.

FIG. 35 is a flow diagram depicting a method 3500 for unwinding a service build, in accordance with at least one embodiment. The method 3500 may be performed by any suitable combination of user interface 3504 (an example of user interface 2104 of FIG. 1), Orchestrator Control Plane 3506 (e.g., Orchestrator Control Plane 107 of FIG. 1), Region Orchestrator 3508 (Region Orchestrator 106 of FIG. 1), CIOS Regional 3510 (e.g., CIOS Regional 110 of FIG. 1), and Puffin Regional 3512 (e.g., Puffin Regional 120 of FIG. 1). In some embodiments, Orchestrator Control Plane 3506 may receive and transmit data from/to user interface 3504. More or fewer operations may be included in the method 3500 and these operations may be performed in any suitable order. The method 3500 may be repeated any suitable number of times.

The method 3500 may begin at 3514, where operator 3502 may provide user input via user interface 3504 to begin an intervention. In some embodiments, the user input may include a region identifier and a scope (e.g., one or more tracks).

At 3516, user interface 3504 may transmit the user input to Orchestrator Control Plane 3506 which, in turn, may transmit the data to Region Orchestrator 3508 at 3518.

At 3520, Region Orchestrator 3508 may perform operations to pause the one or more tracks corresponding to the identified scope. At 3522, Region Orchestrator 3508 may return a current state of the pause to Orchestrator Control Plane 3506.

At 3524, Orchestrator Control Plane 3506 may transmit data to user interface 3504 to cause user interface 3504 to present the current state of the paused tracks.

At 3526, operator 3502 may utilize user interface 3504 to create an updated plan. By way of example, the operator 3502 may designate a goal state (e.g., a previous build milestone). An updated plan may include an update service plan, an updated retry policies, an updated manifest item, resolving ambiguous states, updating transition operations, or the like. As a non-limiting example, the operator 3502 may update the SPAM version to utilize a newly modified SPAM that may differ by at least one attribute from a corresponding SPAM previously utilize.

At 3528, operator 3502 may select an option via user interface 3504 to replace the region build plan with a new plan.

At 3530, user interface 3504 may transmit data to Orchestrator Control Plane 3506 indicating a new plan is to be generated. At 3532, Orchestrator Control Plane 2106 may be configured to generate the new region build plan (a "replacement plan") according to the data indicated at 3530. The Orchestrator Control Plane 3506 may validate the replacement plan. This may include rechecking that skill names, skill consumers, and skill producers, match corresponding data maintained by Puffin Regional 3512. In some embodiments, the replacement plan may be validated against the current region state.

At 3534, Orchestrator Control Plane 3506 may perform any suitable replace plan operation to cause Region Orchestrator 3508 to update the current region build with modified steps at 3542. This may include updating the region build plan with steps corresponding to unwinding the service to the build milestone goal state.

At 3536, Region Orchestrator 3508 may instruct CIOS Regional 3510 to perform any suitable release and/or operation corresponding to a backward step of an execution unit. At 3538, upon successful completion of the release and/or operation, Region Orchestrator 3508 may transmit data to update one or more skills corresponding to the backward step to "UNINSTALLED."

At 3540, Region Orchestrator 3508 may transmit any suitable data indicating the result of the unwind to Orchestrator Control Plane 3506.

The user interface 3504 may be configured to query Orchestrator Control Plane 3506 periodically for status at 3542 and a response may be provided at 3544. The operator 3546 may view the data corresponding to the response (e.g., the status of the unwind) at 3546.

Figure 36:
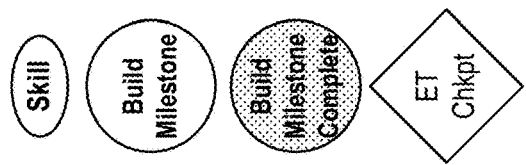
FIG. 36 is a block diagram depicting example build progress of building a set of services with interdependencies, in accordance with at least one embodiment.

FIG. 36 is a block diagram 3600 depicting example build progress of building a set of services with interdependencies, in accordance with at least one embodiment. In the example depicted in FIG. 36, SPAM A publishes skills S1 and S2 upon reaching build milestone 2 (e.g., "A: BM2"). In this example, SPAM B is dependent on skill S1, and SPAM C is dependent on skill S2 to make forward progress in their respective service builds, and the region build overall.

Once SPAM A publishes skills S1 and S2, SPAM B and SPAM C may advance to their next build milestones. FIG. 36 depicts such progress. For example, due to skill S1 being published, SPAM B may advance to its build milestone 2 (e.g., "B: BM2") where it remains as it waits for skill S3 to publish. SPAM C may advance to its build milestone 3 (e.g., "C: BM3") via two execution target checkpoints, designated "C: BM2: ETC1" and "C: BM2: ETC2," respectively.

In this example, unwinding SPAM A to a previous build milestone may result in unwinding SPAMs B and C since the skills on which SPAMs B and C depend may become be unpublished. Therefore, unwinding the build progress associated with one SPAM may cause the build progress of one or more other SPAMs to be affected.

Figure 37:
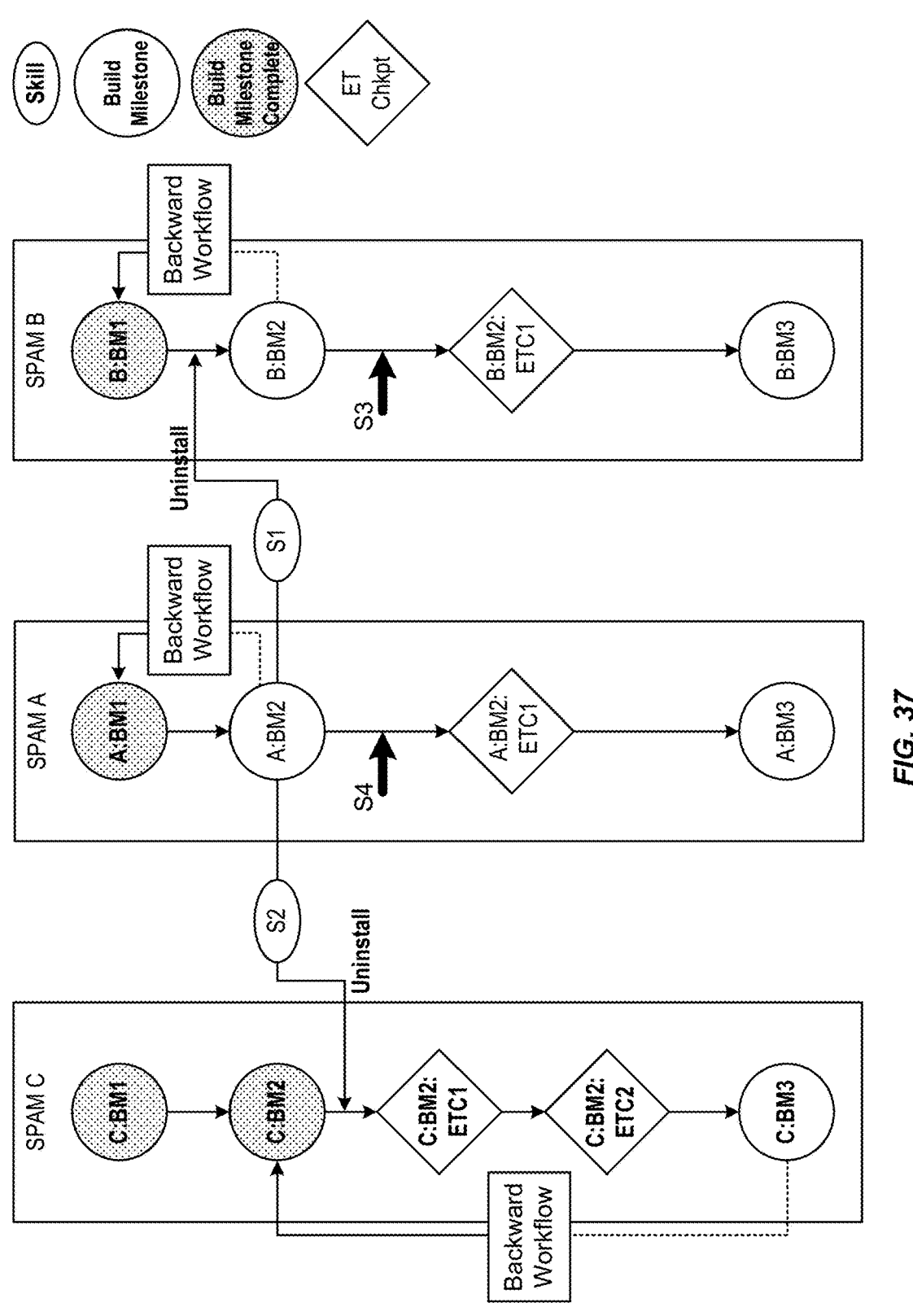
FIG. 37 is a block diagram depicting example build progress reversal corresponding to the set of services of FIG. 36, in accordance with at least one embodiment.

FIG. 37 is a block diagram 3700 depicting example build progress reversal corresponding to the set of services of FIG. 36, in accordance with at least one embodiment. In the ongoing example from FIG. 36, SPAM A may be unwound to a previous build milestone (e.g., "A: BM1") based at least in part on user input requesting the unwind. To effectuate the unwind, a backward execution unit defined within the SPAM may be executed to reverse previous forward effects. By way of example, dependent SPAMs B and C may be unwound to respective earlier states (e.g., states that occur prior to the dependencies on skills S1 and S2 were met). As an example, SPAM B may be unwound to its first build milestone, the milestone immediately preceding B: BM2 which depends on skill S1. Similarly, SPAM C may be unwound to its second build milestone (e.g., "C: BM2"), the milestone immediately preceding C: BM2: ETC1 which depends on skill S2.

Once SPAMs B and C are unwound to the build milestones specified above, SPAM A may uninstall skills S1 and S2 (e.g., the skills previously published upon reaching milestone A: BM2). A backward workflow specified by one or more backward steps (e.g., a backward step similar to the one depicted in section 706 of FIG. 7) may be executed to revert SPAM A to its first build milestone, A: BM1.

When the unwind is complete, SPAM C may be current at its second build milestone (C: BM2), SPAM A may be at its first build milestone (A: BM1), and SPAM B may be at its first build milestone (B: BM1).

FIG. 38 is a flow diagram depicting an example method 3800 for testing a service build, according to at least one embodiment. The method 3800 may be performed by any suitable combination of the Orchestrator Control Plane 107 of FIG. 1 and/or the Regional Orchestrator 106 of FIG. 1. More or fewer operations may be included in the method 3800 and these operations may be performed in any suitable order.

The method 3800 may begin at 3802, where an orchestrator control plane (e.g., orchestrator control plan 107) may generate a build plan (e.g., region build plan 338 of FIG. 3, region build plan 1318 of FIG. 13, etc.) comprising a plurality of ordered steps for bootstrapping one or more services. In some embodiments, the build plan may be generated based at least in part on one or more service plans and manifests (e.g., the service build definition 400 of FIG. 4). In some embodiments, a service plan and manifest of the one or more service plans and manifests specifies a deterministic process for bootstrapping a service of the one or more services. The service plan of the service plan and manifest may comprise 1) a plurality of build milestones, 2) a first execution unit defining forward progress from a first build milestone of the plurality of build milestones to a second build milestone of the plurality of build milestones, and 3) a second execution unit defining backward progress from the second build milestone of the plurality of build milestones to the first build milestone of the plurality of build milestones.

Figure 39:
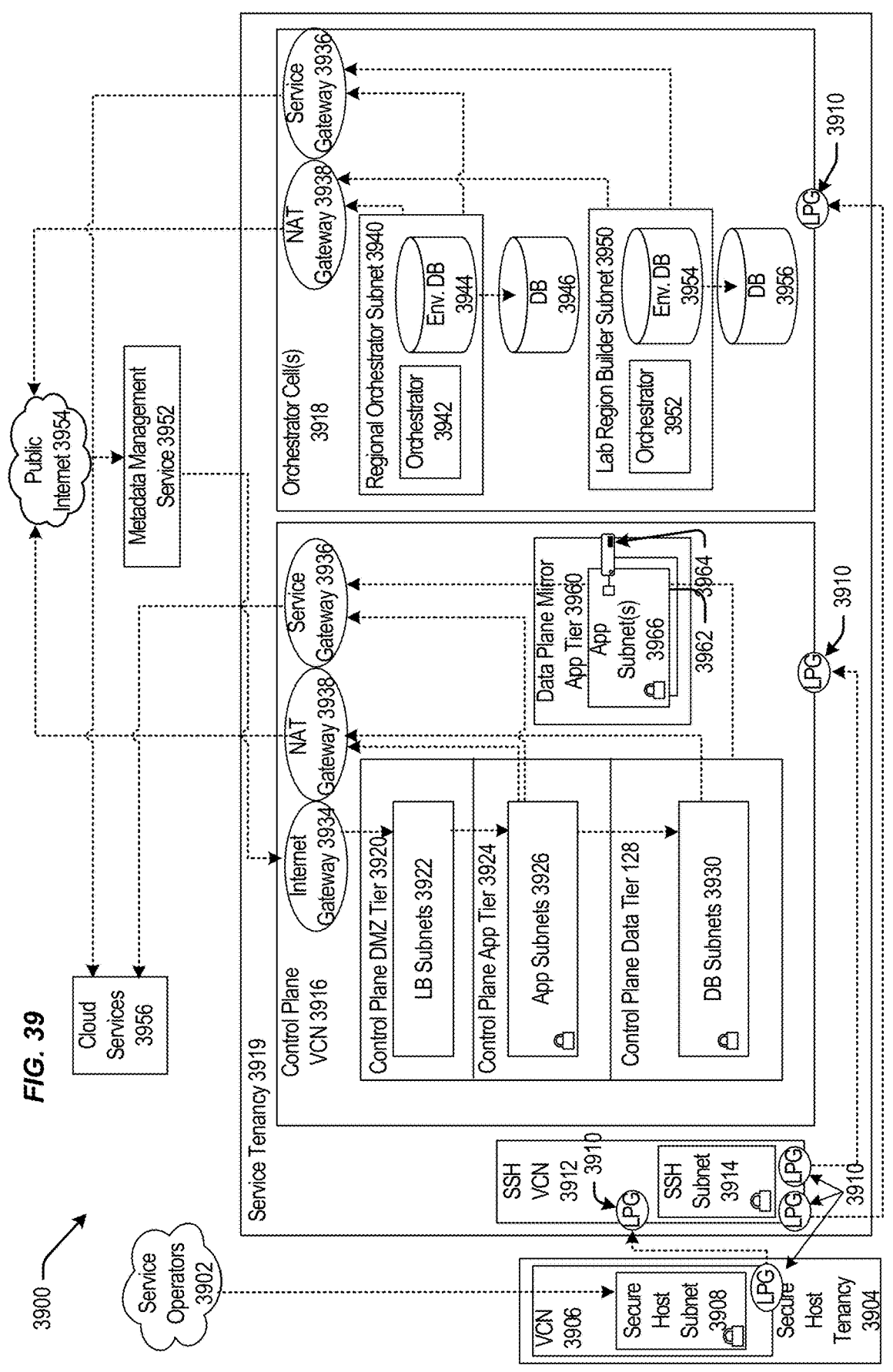
FIG. 39 is a block diagram illustrating an example IaaS architecture for region build orchestration service, according to at least one embodiment.

At 3804, the orchestrator control plane may instruct a region orchestrator (e.g., region orchestrator 106 of FIG. 1 orchestrator 3952 of FIG. 39) executing within an isolated testing environment (e.g., a service cell dedicated to a testing environment such as a lab region corresponding to lab region build subnet 3950 of FIG. 39) to execute a test build of the one or more services according to the build plan.

At 3806, the region orchestrator may execute, as part of the test build, a subset of steps from the plurality of ordered steps of the build plan. In some embodiments, executing the subset of steps may utilize resources of the isolated testing environment. The subset of steps may be executed in an order identified by the build plan.

At 3808, one or more operations may be executed (e.g., by the orchestrator control plane 106) to reset the isolated testing environment to enable the isolated testing environment to be utilized for subsequent test builds. In some embodiments, resetting the isolated testing environment comprises at least one of 1) identifying one or more resources of the isolated testing environment, and 2) deleting the one or more resources.

Although not depicted in FIG. 38, the method 3800 may further comprise any suitable combination of 1) pausing, by the region orchestrator, the test build during execution, 2) receiving, by the orchestration control plane, an updated service plan, 3) generating, by the orchestration control plane, a new build plan based at least in part on the updated service plan, and/or 4) resuming, by the region orchestrator, the test build, wherein subsequent operations performed during execution of the test build are performed based at least in part on the new build plan.

As described in the figures above, the method 3800 may comprise reversing build progress of the service to a previous state based at least in part on executing a workflow corresponding to the second execution unit defining backward progress from the second build milestone of the plurality of build milestones to the first build milestone of the plurality of build milestones (e.g., a backward step of section 706 of FIG. 7). In some embodiments, reversing the build progress of the service comprises specifying that a previously published resource is no longer available. Reversing the build progress may additionally, or alternatively, cause a corresponding build progress of a second service of the one or more services to be reversed to a respective previous state.

FIG. 39 is a block diagram illustrating an example IaaS architecture for region build orchestration service, according to at least one embodiment. Service operators 3902 can be communicatively coupled to a secure host tenancy 3904 that can include a virtual cloud network (VCN) 3906 and a secure host subnet 3908. In some examples, the service operators 3902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 3906 and/or the Internet.

The VCN 3906 can include a local peering gateway (LPG) 3910 that can be communicatively coupled to a secure shell (SSH) VCN 3912 via an LPG 3910 contained in the SSH VCN 3912. The SSH VCN 3912 can include an SSH subnet 3914, and the SSH VCN 3912 can be communicatively coupled to a control plane VCN 3916 via the LPG 3910 contained in the control plane VCN 3916. Also, the SSH VCN 3912 can be communicatively coupled to a data plane VCN 3918 via an LPG 3910. The control plane VCN 3916 and the data plane VCN 3918 can be contained in a service tenancy 3919 that can be owned and/or operated by the IaaS provider.

The control plane VCN 3916 can include a control plane demilitarized zone (DMZ) tier 3920 that acts as a perimeter network (e.g., portions of a corporate network between the corporate intranet and external networks). The DMZ-based servers may have restricted responsibilities and help keep breaches contained. Additionally, the DMZ tier 3920 can include one or more load balancer (LB) subnet(s) 3922, a control plane app tier 3924 that can include app subnet(s) 3926, a control plane data tier 3928 that can include database (DB) subnet(s) 3930 (e.g., frontend DB subnet(s) and/or backend DB subnet(s)). The Orchestrator Control Plane 107 of FIG. 1 may operate as part of app subnet(s) 3926. The LB subnet(s) 3922 contained in the control plane DMZ tier 3920 can be communicatively coupled to the app subnet(s) 3926 contained in the control plane app tier 3924 and an Internet gateway 3934 that can be contained in the control plane VCN 3916, and the app subnet(s) 3926 can be communicatively coupled to the DB subnet(s) 3930 contained in the control plane data tier 3928 and a service gateway 3936 and a network address translation (NAT) gateway 3938. The control plane VCN 3916 can include the service gateway 3936 and the NAT gateway 3938.

Multiple orchestrator cells (e.g., orchestrator cell(s) 3918, each an example of a service cell that isolated from each other) can include regional orchestrator subnet 3940 and lab region build subnet 3950 that can be communicatively coupled to the NAT gateway 3938 and the service gateway 3936.

The Internet gateway 3934 of the control plane VCN 3916 can be communicatively coupled to a metadata management service 3952 that can be communicatively coupled to public Internet 3954. Public Internet 3954 can be communicatively coupled to the NAT gateway 3938 of the control plane VCN 3916 and of the NAT gateway 3938 of an orchestrator cell. The service gateway 3936 of the control plane VCN 3916 and the service gateway 3936 can be communicatively coupled to cloud services 3956.

In some examples, the service gateway 3936 of the control plane VCN 3916 or the service gateway 3936 can make application programming interface (API) calls to cloud services 3956 without going through public Internet 3954. The API calls to cloud services 3956 from the service gateway 3936 can be one-way: the service gateway 3936 can make API calls to cloud services 3956, and cloud services 3956 can send requested data to the service gateway 3936. But, cloud services 3956 may not initiate API calls to the service gateway 3936.

In some examples, the secure host tenancy 3904 can be directly connected to the service tenancy 3919, which may be otherwise isolated. The secure host subnet 3908 can communicate with the SSH subnet 3914 through an LPG 3910 that may enable two-way communication over an otherwise isolated system. Connecting the secure host sub-net 3908 to the SSH subnet 3914 may give the secure host subnet 3908 access to other entities within the service tenancy 3919.

The control plane VCN 3916 may allow users of the service tenancy 3919 to set up or otherwise provision desired resources. Desired resources provisioned in the control plane VCN 3916 may be deployed or otherwise used in the regions build using orchestrator 3942 of regional orchestrator subnet 3940. In some examples, the control plane VCN 3916 can be isolated from the orchestrator cell(s) 3918. The orchestrators 3942 and 3952 may individually be an example of the regional orchestrator 106 of FIG. 1. Lab region build subnet 3950 may be an isolated environment in which SPAMs may be tested. Each orchestrator (e.g., orchestrator 3942 and/or 3952) may access a scheme via an environment database (e.g., env. DB 3944 and 3954, respectively). DB 3946 may be a single database viewable by all orchestrators across all orchestration cells. Similarly, DB 3956 may be viewable by env. DB 3954. Databases 3946 and 3956 may be configured to store a current-state-of-the-world view (progress against a goal) for each region build planned, performed, or in the process of being performed by an orchestrator (e.g., orchestrator 3940 and orchestrator 3950, respectively). Env. DB 3944 and 3954 may be con-figured to store a current-state-of-the-world view including any suitable data corresponding to a particular region build (e.g., a region build that is associated with a single region).

In some examples, users of the system, or customers, can make requests, for example create, read, update, or delete (CRUD) operations, through public Internet 3954 that can communicate the requests to the metadata management service 3952. The metadata management service 3952 can communicate the request to the control plane VCN 3916 through the Internet gateway 3934. The request can be received by the LB subnet(s) 3922 contained in the control plane DMZ tier 3920. The LB subnet(s) 3922 may determine that the request is valid, and in response to this determina-tion, the LB subnet(s) 3922 can transmit the request to app subnet(s) 3926 contained in the control plane app tier 3924. If the request is validated and requires a call to public Internet 3954, the call to public Internet 3954 may be transmitted to the NAT gateway 3938 that can make the call to public Internet 3954. Metadata that may be desired to be stored by the request can be stored in the DB subnet(s) 3930.

In some examples, the data plane mirror app tier 3960 can facilitate direct communication between the control plane VCN 3916 and the orchestrator cell(s) 3918. For example, changes, updates, or other suitable modifications to configu-ration may be desired to be applied to the resources con-tained in the data plane VCN managed by the orchestrator 3942. Via a VNIC 3962, the control plane VCN 3916 can directly communicate with, and can thereby execute the changes, updates, or other suitable modifications to configu-ration to, resources contained in the data plane VCN man-aged by orchestrator 3942.

In some embodiments, the control plane VCN 3916 and the data plane VCN managed by orchestrator 3942 can be contained in the service tenancy 3919. In this case, the user, or the customer, of the system may not own or operate either the control plane VCN 3916 or the data plane VCN. Instead, the IaaS provider may own or operate the control plane VCN 3916 and the data plane VCN, both of which may be contained in the service tenancy 3919. This embodiment can enable isolation of networks that may prevent users or customers from interacting with other users', or other cus-tomers', resources. Also, this embodiment may allow users or customers of the system to store databases privately without needing to rely on public Internet 3954, which may not have a desired level of threat prevention, for storage.

In other embodiments, the LB subnet(s) 3922 contained in the control plane VCN 3916 can be configured to receive a signal from the service gateway 3936. In this embodiment, the control plane VCN 3916 and the data plane VCN managed by the orchestrator 3942 may be configured to be called by a customer of the IaaS provider without calling public Internet 3954. Customers of the IaaS provider may desire this embodiment since database(s) that the customers use may be controlled by the IaaS provider and may be stored on the service tenancy 3919, which may be isolated from public Internet 3954.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hard-ware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, includ-ing balancing network traffic, troubleshooting application issues, monitoring performance, managing disaster recov-ery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middle-ware, and/or application deployment (e.g., on self-service virtual machines (e.g., that can be spun up on demand)) or the like.

In some examples, IaaS provisioning may refer to acquir-ing computers or virtual hosts for use, and even installing needed libraries or services on them. In most cases, deploy-ment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 40:
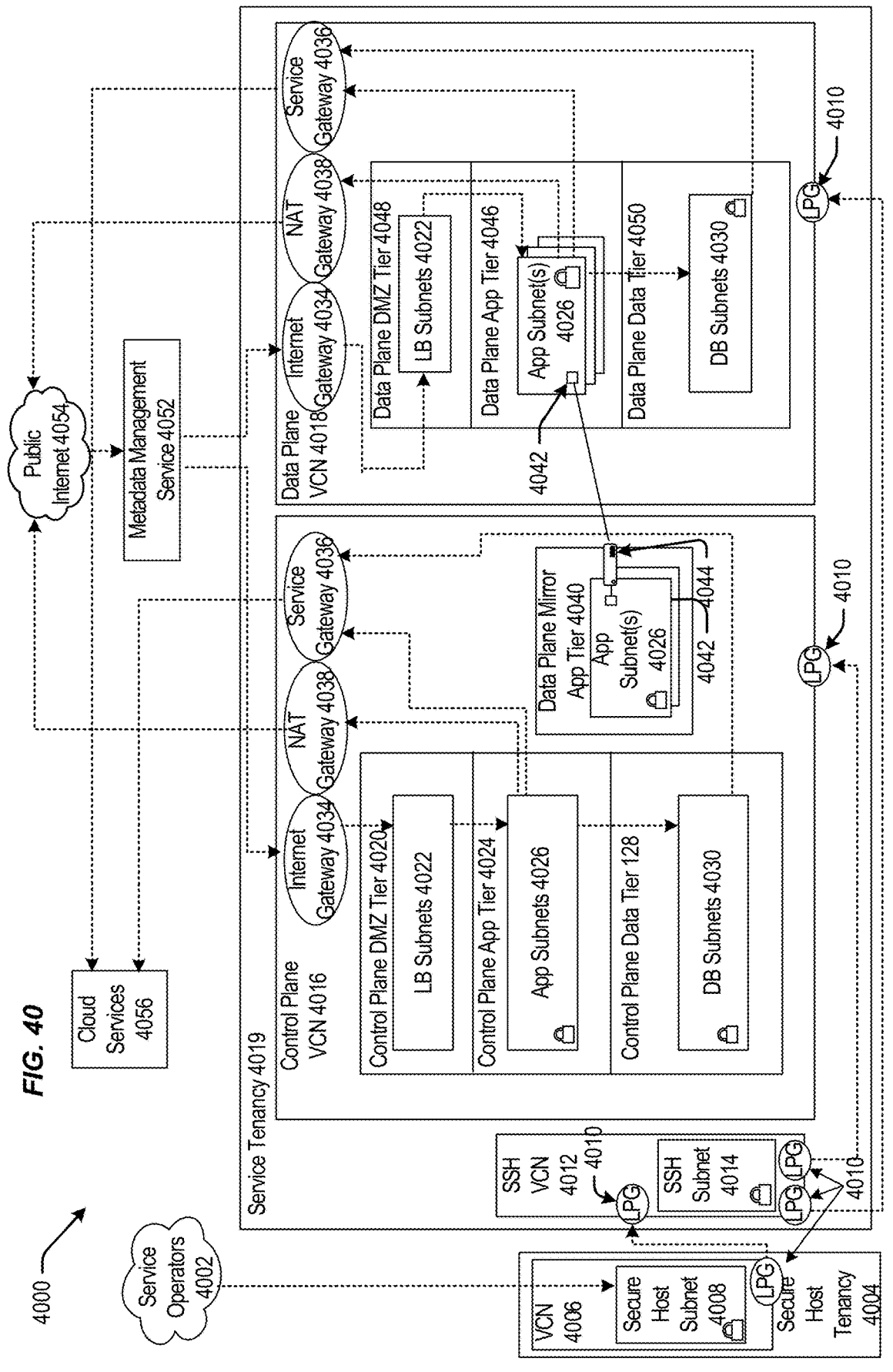
FIG. 40 is a block diagram illustrating one pattern for implementing a cloud infrastructure as a service system, according to at least one embodiment.

FIG. 40 is a block diagram 4000 illustrating an example pattern of an IaaS architecture, according to at least one embodiment. Service operators 4002 can be communicatively coupled to a secure host tenancy 4004 that can include a virtual cloud network (VCN) 4006 and a secure host subnet 4008. In some examples, the service operators 4002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 4006 and/or the Internet.

The VCN 4006 can include a local peering gateway (LPG) 4010 that can be communicatively coupled to a secure shell (SSH) VCN 4012 via an LPG 4010 contained in the SSH VCN 4012. The SSH VCN 4012 can include an SSH subnet 4014, and the SSH VCN 4012 can be communicatively coupled to a control plane VCN 4016 via the LPG 4010 contained in the control plane VCN 4016. Also, the SSH VCN 4012 can be communicatively coupled to a data plane VCN 4018 via an LPG 4010. The control plane VCN 4016 and the data plane VCN 4018 can be contained in a service tenancy 4019 that can be owned and/or operated by the IaaS provider.

The control plane VCN 4016 can include a control plane demilitarized zone (DMZ) tier 4020 that acts as a perimeter network (e.g., portions of a corporate network between the corporate intranet and external networks). The DMZ-based servers may have restricted responsibilities and help keep breaches contained. Additionally, the DMZ tier 4020 can include one or more load balancer (LB) subnet(s) 4022, a control plane app tier 4024 that can include app subnet(s) 4026, a control plane data tier 4028 that can include database (DB) subnet(s) 4030 (e.g., frontend DB subnet(s) and/or backend DB subnet(s)). The LB subnet(s) 4022 contained in the control plane DMZ tier 4020 can be communicatively coupled to the app subnet(s) 4026 contained in the control plane app tier 4024 and an Internet gateway 4034 that can be contained in the control plane VCN 4016, and the app subnet(s) 4026 can be communicatively coupled to the DB subnet(s) 4030 contained in the control plane data tier 4028 and a service gateway 4036 and a network address translation (NAT) gateway 4038. The control plane VCN 4016 can include the service gateway 4036 and the NAT gateway 4038.

The control plane VCN 4016 can include a data plane mirror app tier 4040 that can include app subnet(s) 4026. The app subnet(s) 4026 contained in the data plane mirror app tier 4040 can include a virtual network interface controller (VNIC) 4042 that can execute a compute instance 4044. The compute instance 4044 can communicatively couple the app subnet(s) 4026 of the data plane mirror app tier 4040 to app subnet(s) 4026 that can be contained in a data plane app tier 4046.

The data plane VCN 4018 can include the data plane app tier 4046, a data plane DMZ tier 4048, and a data plane data tier 4050. The data plane DMZ tier 4048 can include LB subnet(s) 4022 that can be communicatively coupled to the app subnet(s) 4026 of the data plane app tier 4046 and the Internet gateway 4034 of the data plane VCN 4018. The app subnet(s) 4026 can be communicatively coupled to the service gateway 4036 of the data plane VCN 4018 and the NAT gateway 4038 of the data plane VCN 4018. The data plane data tier 4050 can also include the DB subnet(s) 4030 that can be communicatively coupled to the app subnet(s) 4026 of the data plane app tier 4046.

The Internet gateway 4034 of the control plane VCN 4016 and of the data plane VCN 4018 can be communicatively coupled to a metadata management service 4052 that can be communicatively coupled to public Internet 4054. Public Internet 4054 can be communicatively coupled to the NAT gateway 4038 of the control plane VCN 4016 and of the data plane VCN 4018. The service gateway 4036 of the control plane VCN 4016 and of the data plane VCN 4018 can be communicatively coupled to cloud services 4056.

In some examples, the service gateway 4036 of the control plane VCN 4016 or of the data plane VCN 4018 can make application programming interface (API) calls to cloud services 4056 without going through public Internet 4054. The API calls to cloud services 4056 from the service gateway 4036 can be one-way: the service gateway 4036 can make API calls to cloud services 4056, and cloud services 4056 can send requested data to the service gateway 4036. But, cloud services 4056 may not initiate API calls to the service gateway 4036.

In some examples, the secure host tenancy 4004 can be directly connected to the service tenancy 4019, which may be otherwise isolated. The secure host subnet 4008 can communicate with the SSH subnet 4014 through an LPG 4010 that may enable two-way communication over an otherwise isolated system. Connecting the secure host subnet 4008 to the SSH subnet 4014 may give the secure host subnet 4008 access to other entities within the service tenancy 4019.

The control plane VCN 4016 may allow users of the service tenancy 4019 to set up or otherwise provision desired resources. Desired resources provisioned in the control plane VCN 4016 may be deployed or otherwise used in the data plane VCN 4018. In some examples, the control plane VCN 4016 can be isolated from the data plane VCN 4018, and the data plane mirror app tier 4040 of the control plane VCN 4016 can communicate with the data plane app tier 4046 of the data plane VCN 4018 via VNICs 4042 that can be contained in the data plane mirror app tier 4040 and the data plane app tier 4046.

In some examples, users of the system, or customers, can make requests, for example create, read, update, or delete (CRUD) operations, through public Internet 4054 that can communicate the requests to the metadata management service 4052. The metadata management service 4052 can communicate the request to the control plane VCN 4016 through the Internet gateway 4034. The request can be received by the LB subnet(s) 4022 contained in the control plane DMZ tier 4020. The LB subnet(s) 4022 may determine that the request is valid, and in response to this determination, the LB subnet(s) 4022 can transmit the request to app subnet(s) 4026 contained in the control plane app tier 4024. If the request is validated and requires a call to public Internet 4054, the call to public Internet 4054 may be transmitted to the NAT gateway 4038 that can make the call to public Internet 4054. Metadata that may be desired to be stored by the request can be stored in the DB subnet(s) 4030.

In some examples, the data plane mirror app tier 4040 can facilitate direct communication between the control plane VCN 4016 and the data plane VCN 4018. For example, changes, updates, or other suitable modifications to configuration may be desired to be applied to the resources contained in the data plane VCN 4018. Via a VNIC 4042, the control plane VCN 4016 can directly communicate with, and can thereby execute the changes, updates, or other suitable modifications to configuration to, resources contained in the data plane VCN 4018.

In some embodiments, the control plane VCN 4016 and the data plane VCN 4018 can be contained in the service tenancy 4019. In this case, the user, or the customer, of the system may not own or operate either the control plane VCN 4016 or the data plane VCN 4018. Instead, the IaaS provider may own or operate the control plane VCN 4016 and the data plane VCN 4018, both of which may be contained in the service tenancy 4019. This embodiment can enable isolation of networks that may prevent users or customers from interacting with other users', or other customers', resources. Also, this embodiment may allow users or customers of the system to store databases privately without needing to rely on public Internet 4054, which may not have a desired level of threat prevention, for storage.

In other embodiments, the LB subnet(s) 4022 contained in the control plane VCN 4016 can be configured to receive a signal from the service gateway 4036. In this embodiment, the control plane VCN 4016 and the data plane VCN 4018 may be configured to be called by a customer of the IaaS provider without calling public Internet 4054. Customers of the IaaS provider may desire this embodiment since database(s) that the customers use may be controlled by the IaaS provider and may be stored on the service tenancy 4019, which may be isolated from public Internet 4054.

Figure 41:
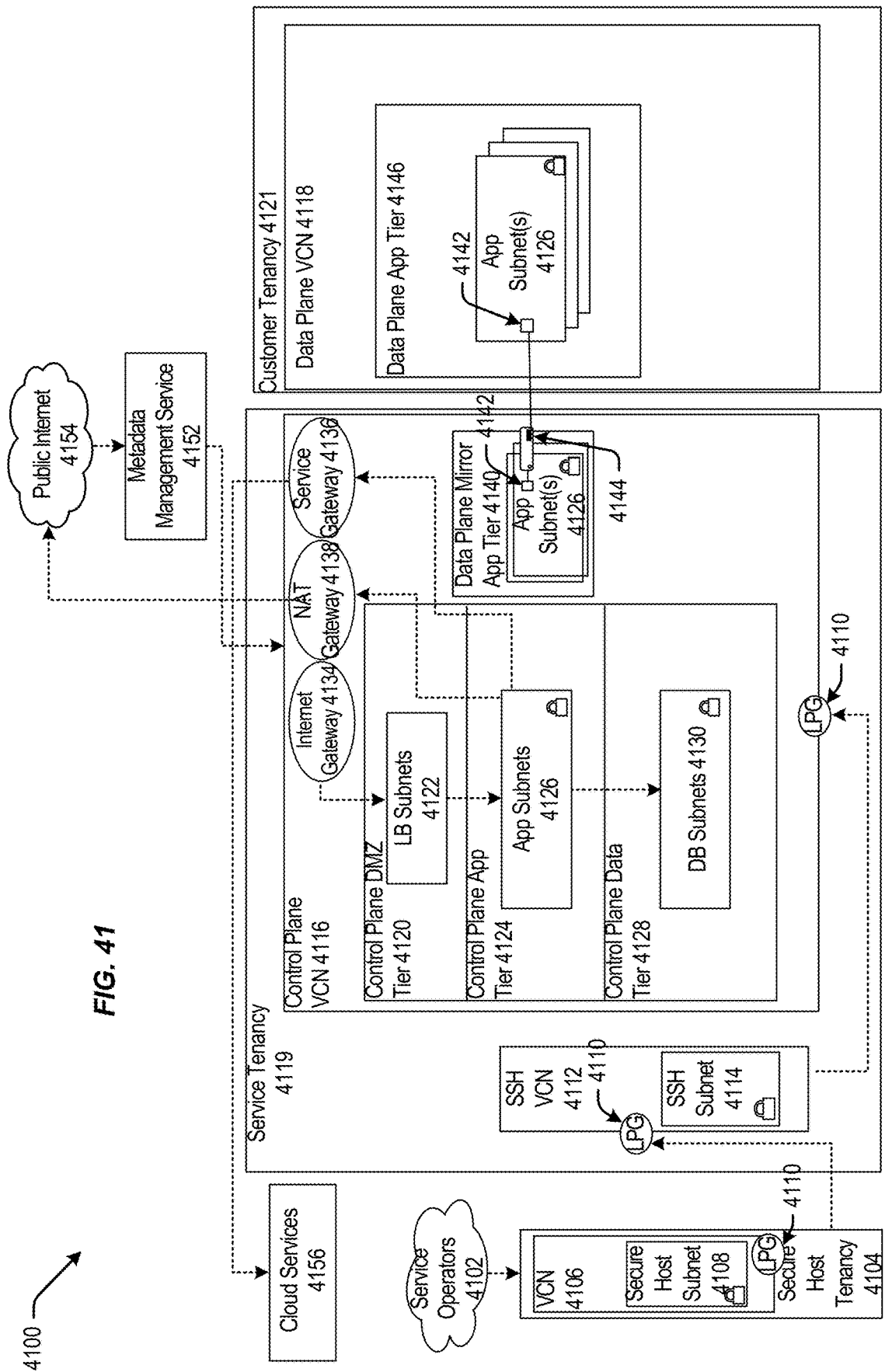
FIG. 41 is a block diagram illustrating another pattern for implementing a cloud infrastructure as a service system, according to at least one embodiment.

FIG. 41 is a block diagram 4100 illustrating another example pattern of an IaaS architecture, according to at least one embodiment. Service operators 4102 (e.g., service operators 4002 of FIG. 40) can be communicatively coupled to a secure host tenancy 4104 (e.g., the secure host tenancy 4004 of FIG. 40) that can include a virtual cloud network (VCN) 4106 (e.g., the VCN 4006 of FIG. 40) and a secure host subnet 4108 (e.g., the secure host subnet 4008 of FIG. 40). The VCN 4106 can include a local peering gateway (LPG) 4110 (e.g., the LPG 4010 of FIG. 40) that can be communicatively coupled to a secure shell (SSH) VCN 4112 (e.g., the SSH VCN 4012 of FIG. 40) via an LPG 4010 contained in the SSH VCN 4112. The SSH VCN 4112 can include an SSH subnet 4114 (e.g., the SSH subnet 4014 of FIG. 40), and the SSH VCN 4112 can be communicatively coupled to a control plane VCN 4116 (e.g., the control plane VCN 4016 of FIG. 40) via an LPG 4110 contained in the control plane VCN 4116. The control plane VCN 4116 can be contained in a service tenancy 4119 (e.g., the service tenancy 4019 of FIG. 40), and the data plane VCN 4118 (e.g., the data plane VCN 4018 of FIG. 40) can be contained in a customer tenancy 4121 that may be owned or operated by users, or customers, of the system.

The control plane VCN 4116 can include a control plane DMZ tier 4120 (e.g., the control plane DMZ tier 4020 of FIG. 40) that can include LB subnet(s) 4122 (e.g., LB subnet(s) 4022 of FIG. 40), a control plane app tier 4124 (e.g., the control plane app tier 4024 of FIG. 40) that can include app subnet(s) 4126 (e.g., app subnet(s) 4026 of FIG. 40), a control plane data tier 4128 (e.g., the control plane data tier 4028 of FIG. 40) that can include database (DB) subnet(s) 4130 (e.g., similar to DB subnet(s) 4030 of FIG. 40). The LB subnet(s) 4122 contained in the control plane DMZ tier 4120 can be communicatively coupled to the app subnet(s) 4126 contained in the control plane app tier 4124 and an Internet gateway 4134 (e.g., the Internet gateway 4034 of FIG. 40) that can be contained in the control plane VCN 4116, and the app subnet(s) 4126 can be communicatively coupled to the DB subnet(s) 4130 contained in the control plane data tier 4128 and a service gateway 4136 (e.g., the service gateway 4036 of FIG. 40) and a network address translation (NAT) gateway 4138 (e.g., the NAT gateway 4038 of FIG. 40). The control plane VCN 4116 can include the service gateway 4136 and the NAT gateway 4138.

The control plane VCN 4116 can include a data plane mirror app tier 4140 (e.g., the data plane mirror app tier 4040 of FIG. 40) that can include app subnet(s) 4126. The app subnet(s) 4126 contained in the data plane mirror app tier 4140 can include a virtual network interface controller (VNIC) 4142 (e.g., the VNIC of 4042) that can execute a compute instance 4144 (e.g., similar to the compute instance 4044 of FIG. 40). The compute instance 4144 can facilitate communication between the app subnet(s) 4126 of the data plane mirror app tier 4140 and the app subnet(s) 4126 that can be contained in a data plane app tier 4146 (e.g., the data plane app tier 4046 of FIG. 40) via the VNIC 4142 contained in the data plane mirror app tier 4140 and the VNIC 4142 contained in the data plane app tier 4146.

The Internet gateway 4134 contained in the control plane VCN 4116 can be communicatively coupled to a metadata management service 4152 (e.g., the metadata management service 4052 of FIG. 40) that can be communicatively coupled to public Internet 4154 (e.g., public Internet 4054 of FIG. 40). Public Internet 4154 can be communicatively coupled to the NAT gateway 4138 contained in the control plane VCN 4116. The service gateway 4136 contained in the control plane VCN 4116 can be communicatively coupled to cloud services 4156 (e.g., cloud services 4056 of FIG. 40).

In some examples, the data plane VCN 4118 can be contained in the customer tenancy 4121. In this case, the IaaS provider may provide the control plane VCN 4116 for each customer, and the IaaS provider may, for each customer, set up a unique compute instance 4144 that is contained in the service tenancy 4119. Each compute instance 4144 may allow communication between the control plane VCN 4116, contained in the service tenancy 4119, and the data plane VCN 4118 that is contained in the customer tenancy 4121. The compute instance 4144 may allow resources, that are provisioned in the control plane VCN 4116 that is contained in the service tenancy 4119, to be deployed or otherwise used in the data plane VCN 4118 that is contained in the customer tenancy 4121.

In other examples, the customer of the IaaS provider may have databases that live in the customer tenancy 4121. In this example, the control plane VCN 4116 can include the data plane mirror app tier 4140 that can include app subnet(s) 4126. The data plane mirror app tier 4140 can reside in the data plane VCN 4118, but the data plane mirror app tier 4140 may not live in the data plane VCN 4118. That is, the data plane mirror app tier 4140 may have access to the customer tenancy 4121, but the data plane mirror app tier 4140 may not exist in the data plane VCN 4118 or be owned or operated by the customer of the IaaS provider. The data plane mirror app tier 4140 may be configured to make calls to the data plane VCN 4118 but may not be configured to make calls to any entity contained in the control plane VCN 4116. The customer may desire to deploy or otherwise use resources in the data plane VCN 4118 that are provisioned in the control plane VCN 4116, and the data plane mirror app tier 4140 can facilitate the desired deployment, or other usage of resources, of the customer.

In some embodiments, the customer of the IaaS provider can apply filters to the data plane VCN 4118. In this embodiment, the customer can determine what the data plane VCN 4118 can access, and the customer may restrict access to public Internet 4154 from the data plane VCN 4118. The IaaS provider may not be able to apply filters or otherwise control access of the data plane VCN 4118 to any outside networks or databases. Applying filters and controls by the customer onto the data plane VCN 4118, contained in the customer tenancy 4121, can help isolate the data plane VCN 4118 from other customers and from public Internet 4154.

In some embodiments, cloud services 4156 can be called by the service gateway 4136 to access services that may not exist on public Internet 4154, on the control plane VCN 4116, or on the data plane VCN 4118. The connection between cloud services 4156 and the control plane VCN 4116 or the data plane VCN 4118 may not be live or continuous. Cloud services 4156 may exist on a different network owned or operated by the IaaS provider. Cloud services 4156 may be configured to receive calls from the service gateway 4136 and may be configured to not receive calls from public Internet 4154. Some cloud services 4156 may be isolated from other cloud services 4156, and the control plane VCN 4116 may be isolated from cloud services 4156 that may not be in the same region as the control plane VCN 4116. For example, the control plane VCN 4116 may be located in "Region 1," and cloud service "Deployment 40," may be located in Region 1 and in "Region 2." If a call to Deployment 40 is made by the service gateway 4136 contained in the control plane VCN 4116 located in Region 1, the call may be transmitted to Deployment 40 in Region 1. In this example, the control plane VCN 4116, or Deployment 40 in Region 1, may not be communicatively coupled to, or otherwise in communication with, Deployment 40 in Region 2.

Figure 42:
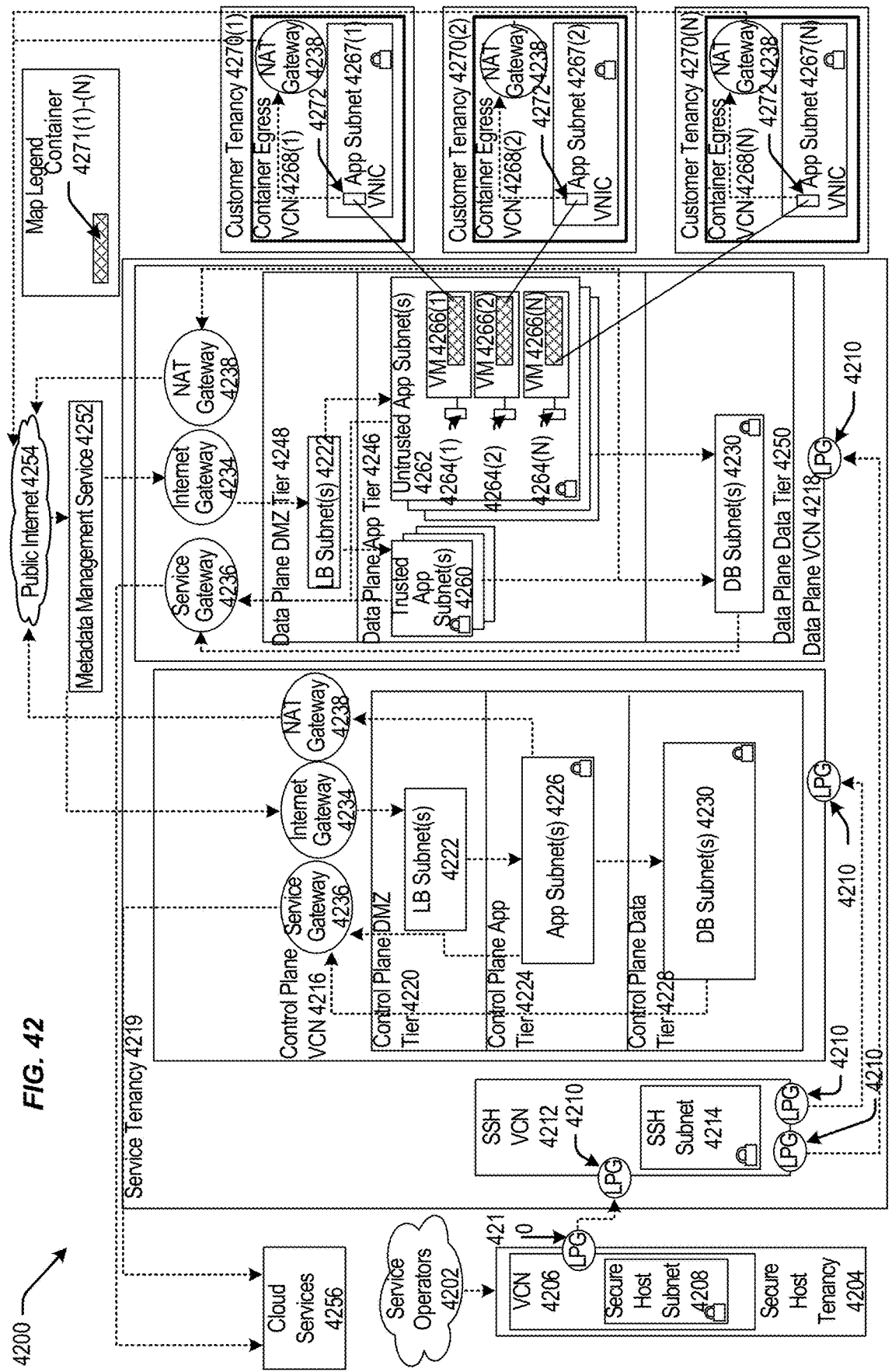
FIG. 42 is a block diagram illustrating another pattern for implementing a cloud infrastructure as a service system, according to at least one embodiment.

FIG. 42 is a block diagram 4200 illustrating another example pattern of an IaaS architecture, according to at least one embodiment. Service operators 4202 (e.g., service operators 4002 of FIG. 40) can be communicatively coupled to a secure host tenancy 4204 (e.g., the secure host tenancy 4004 of FIG. 40) that can include a virtual cloud network (VCN) 4206 (e.g., the VCN 4006 of FIG. 40) and a secure host subnet 4208 (e.g., the secure host subnet 4008 of FIG. 40). The VCN 4206 can include an LPG 4210 (e.g., the LPG 4010 of FIG. 40) that can be communicatively coupled to an SSH VCN 4212 (e.g., the SSH VCN 4012 of FIG. 40) via an LPG 4210 contained in the SSH VCN 4212. The SSH VCN 4212 can include an SSH subnet 4214 (e.g., the SSH subnet 4014 of FIG. 40), and the SSH VCN 4212 can be communicatively coupled to a control plane VCN 4216 (e.g., the control plane VCN 4016 of FIG. 40) via an LPG 4210 contained in the control plane VCN 4216 and to a data plane VCN 4218 (e.g., the data plane 4018 of FIG. 40) via an LPG 4210 contained in the data plane VCN 4218. The control plane VCN 4216 and the data plane VCN 4218 can be contained in a service tenancy 4219 (e.g., the service tenancy 4019 of FIG. 40).

The control plane VCN 4216 can include a control plane DMZ tier 4220 (e.g., the control plane DMZ tier 4020 of FIG. 40) that can include load balancer (LB) subnet(s) 4222 (e.g., LB subnet(s) 4022 of FIG. 40), a control plane app tier 4224 (e.g., the control plane app tier 4024 of FIG. 40) that can include app subnet(s) 4226 (e.g., similar to app subnet(s) 4026 of FIG. 40), a control plane data tier 4228 (e.g., the control plane data tier 4028 of FIG. 40) that can include DB subnet(s) 4230. The LB subnet(s) 4222 contained in the control plane DMZ tier 4220 can be communicatively coupled to the app subnet(s) 4226 contained in the control plane app tier 4224 and to an Internet gateway 4234 (e.g., the Internet gateway 4034 of FIG. 40) that can be contained in the control plane VCN 4216, and the app subnet(s) 4226 can be communicatively coupled to the DB subnet(s) 4230 contained in the control plane data tier 4228 and to a service gateway 4236 (e.g., the service gateway of FIG. 40) and a network address translation (NAT) gateway 4238 (e.g., the NAT gateway 4038 of FIG. 40). The control plane VCN 4216 can include the service gateway 4236 and the NAT gateway 4238.

The data plane VCN 4218 can include a data plane app tier 4246 (e.g., the data plane app tier 4046 of FIG. 40), a data plane DMZ tier 4248 (e.g., the data plane DMZ tier 4048 of FIG. 40), and a data plane data tier 4250 (e.g., the data plane data tier 4050 of FIG. 40). The data plane DMZ tier 4248 can include LB subnet(s) 4222 that can be communicatively coupled to trusted app subnet(s) 4260 and untrusted app subnet(s) 4262 of the data plane app tier 4246 and the Internet gateway 4234 contained in the data plane VCN 4218. The trusted app subnet(s) 4260 can be communicatively coupled to the service gateway 4236 contained in the data plane VCN 4218, the NAT gateway 4238 contained in the data plane VCN 4218, and DB subnet(s) 4230 contained in the data plane data tier 4250. The untrusted app subnet(s) 4262 can be communicatively coupled to the service gateway 4236 contained in the data plane VCN 4218 and DB subnet(s) 4230 contained in the data plane data tier 4250. The data plane data tier 4250 can include DB subnet(s) 4230 that can be communicatively coupled to the service gateway 4236 contained in the data plane VCN 4218.

The untrusted app subnet(s) 4262 can include one or more primary VNICs 4264(1)-(N) that can be communicatively coupled to tenant virtual machines (VMs) 4266(1)-(N). Each tenant VM 4266(1)-(N) can be communicatively coupled to a respective app subnet 4267(1)-(N) that can be contained in respective container egress VCNs 4268(1)-(N) that can be contained in respective customer tenancies 4270(1)-(N). Respective secondary VNICs 4272(1)-(N) can facilitate communication between the untrusted app subnet(s) 4262 contained in the data plane VCN 4218 and the app subnet contained in the container egress VCNs 4268(1)-(N). Each container egress VCNs 4268(1)-(N) can include a NAT gateway 4238 that can be communicatively coupled to public Internet 4254 (e.g., public Internet 4054 of FIG. 40).

The Internet gateway 4234 contained in the control plane VCN 4216 and contained in the data plane VCN 4218 can be communicatively coupled to a metadata management service 4252 (e.g., the metadata management system 4052 of FIG. 40) that can be communicatively coupled to public Internet 4254. Public Internet 4254 can be communicatively coupled to the NAT gateway 4238 contained in the control plane VCN 4216 and contained in the data plane VCN 4218. The service gateway 4236 contained in the control plane VCN 4216 and contained in the data plane VCN 4218 can be communicatively coupled to cloud services 4256.

In some embodiments, the data plane VCN 4218 can be integrated with customer tenancies 4270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 4246. Code to run the function may be executed in the VMs 4266(1)-(N), and the code may not be configured to run anywhere else on the data plane VCN 4218. Each VM 4266(1)-(N) may be connected to one customer tenancy 4270. Respective containers 4271(1)-(N) contained in the VMs 4266(1)-(N) may be configured to run the code. In this case, there can be a dual isolation (e.g., the containers 4271(1)-(N) running code, where the containers 4271(1)-(N) may be contained in at least the VM 4266(1)-(N) that are contained in the untrusted app subnet(s) 4262), which may help prevent incorrect or otherwise undesirable code from damaging the network of the IaaS provider or from damaging a network of a different customer. The containers 4271(1)-(N) may be communicatively coupled to the customer tenancy 4270 and may be configured to transmit or receive data from the customer tenancy 4270. The containers 4271(1)-(N) may not be configured to transmit or receive data from any other entity in the data plane VCN 4218. Upon completion of running the code, the IaaS provider may kill or otherwise dispose of the containers 4271(1)-(N).

In some embodiments, the trusted app subnet(s) 4260 may run code that may be owned or operated by the IaaS provider. In this embodiment, the trusted app subnet(s) 4260 may be communicatively coupled to the DB subnet(s) 4230 and be configured to execute CRUD operations in the DB subnet(s) 4230. The untrusted app subnet(s) 4262 may be communicatively coupled to the DB subnet(s) 4230, but in this embodiment, the untrusted app subnet(s) may be configured to execute read operations in the DB subnet(s) 4230. The containers 4271(1)-(N) that can be contained in the VM 4266(1)-(N) of each customer and that may run code from the customer may not be communicatively coupled with the DB subnet(s) 4230.

In other embodiments, the control plane VCN 4216 and the data plane VCN 4218 may not be directly communicatively coupled. In this embodiment, there may be no direct communication between the control plane VCN 4216 and the data plane VCN 4218. However, communication can occur indirectly through at least one method. An LPG 4210 may be established by the IaaS provider that can facilitate communication between the control plane VCN 4216 and the data plane VCN 4218. In another example, the control plane VCN 4216 or the data plane VCN 4218 can make a call to cloud services 4256 via the service gateway 4236. For example, a call to cloud services 4256 from the control plane VCN 4216 can include a request for a service that can communicate with the data plane VCN 4218.

Figure 43:
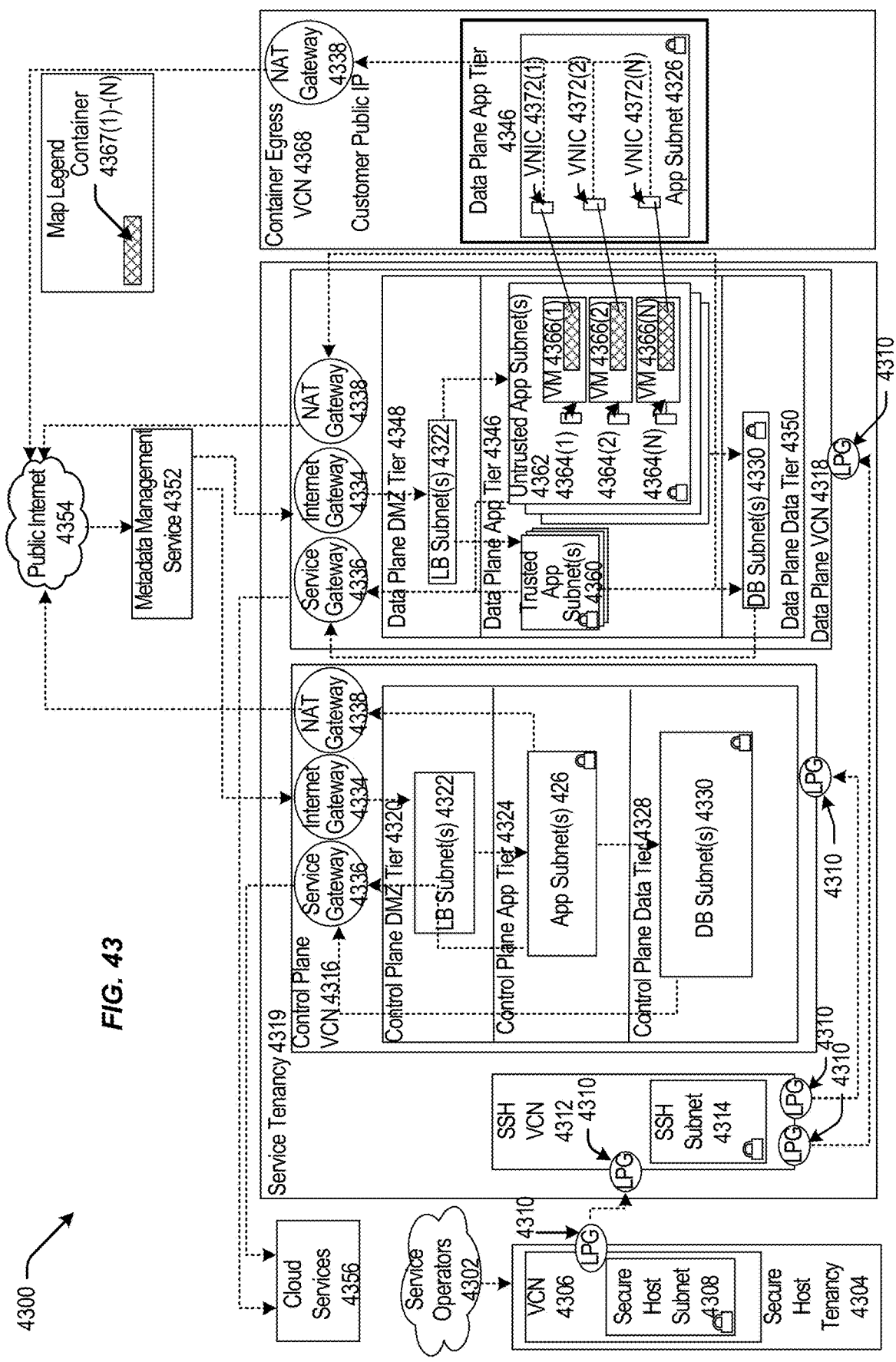
FIG. 43 is a block diagram illustrating another pattern for implementing a cloud infrastructure as a service system, according to at least one embodiment.

FIG. 43 is a block diagram 4300 illustrating another example pattern of an IaaS architecture, according to at least one embodiment. Service operators 4302 (e.g., service operators 4002 of FIG. 40) can be communicatively coupled to a secure host tenancy 4304 (e.g., the secure host tenancy 4004 of FIG. 40) that can include a virtual cloud network (VCN) 4306 (e.g., the VCN 4006 of FIG. 40) and a secure host subnet 4308 (e.g., the secure host subnet 4008 of FIG. 40). The VCN 4306 can include an LPG 4310 (e.g., the LPG 4010 of FIG. 40) that can be communicatively coupled to an SSH VCN 4312 (e.g., the SSH VCN 4012 of FIG. 40) via an LPG 4310 contained in the SSH VCN 4312. The SSH VCN 4312 can include an SSH subnet 4314 (e.g., the SSH subnet 4014 of FIG. 40), and the SSH VCN 4312 can be communicatively coupled to a control plane VCN 4316 (e.g., the control plane VCN 4016 of FIG. 40) via an LPG 4310 contained in the control plane VCN 4316 and to a data plane VCN 4318 (e.g., the data plane 4018 of FIG. 40) via an LPG 4310 contained in the data plane VCN 4318. The control plane VCN 4316 and the data plane VCN 4318 can be contained in a service tenancy 4319 (e.g., the service tenancy 4019 of FIG. 40).

The control plane VCN 4316 can include a control plane DMZ tier 4320 (e.g., the control plane DMZ tier 4020 of FIG. 40) that can include LB subnet(s) 4322 (e.g., LB subnet(s) 4022 of FIG. 40), a control plane app tier 4324 (e.g., the control plane app tier 4024 of FIG. 40) that can include app subnet(s) 4326 (e.g., app subnet(s) 4026 of FIG. 40), a control plane data tier 4328 (e.g., the control plane data tier 4028 of FIG. 40) that can include DB subnet(s) 4330 (e.g., DB subnet(s) 4230 of FIG. 42). The LB subnet(s) 4322 contained in the control plane DMZ tier 4320 can be communicatively coupled to the app subnet(s) 4326 contained in the control plane app tier 4324 and to an Internet gateway 4334 (e.g., the Internet gateway 4034 of FIG. 40) that can be contained in the control plane VCN 4316, and the app subnet(s) 4326 can be communicatively coupled to the DB subnet(s) 4330 contained in the control plane data tier 4328 and to a service gateway 4336 (e.g., the service gateway of FIG. 40) and a network address translation (NAT) gateway 4338 (e.g., the NAT gateway 4038 of FIG. 40). The control plane VCN 4316 can include the service gateway 4336 and the NAT gateway 4338.

The data plane VCN 4318 can include a data plane app tier 4346 (e.g., the data plane app tier 4046 of FIG. 40), a data plane DMZ tier 4348 (e.g., the data plane DMZ tier 4048 of FIG. 40), and a data plane data tier 4350 (e.g., the data plane data tier 4050 of FIG. 40). The data plane DMZ tier 4348 can include LB subnet(s) 4322 that can be communicatively coupled to trusted app subnet(s) 4360 (e.g., trusted app subnet(s) 4260 of FIG. 42) and untrusted app subnet(s) 4362 (e.g., untrusted app subnet(s) 4262 of FIG. 42) of the data plane app tier 4346 and the Internet gateway 4334 contained in the data plane VCN 4318. The trusted app subnet(s) 4360 can be communicatively coupled to the service gateway 4336 contained in the data plane VCN 4318, the NAT gateway 4338 contained in the data plane VCN 4318, and DB subnet(s) 4330 contained in the data plane data tier 4350. The untrusted app subnet(s) 4362 can be communicatively coupled to the service gateway 4336 contained in the data plane VCN 4318 and DB subnet(s) 4330 contained in the data plane data tier 4350. The data plane data tier 4350 can include DB subnet(s) 4330 that can be communicatively coupled to the service gateway 4336 contained in the data plane VCN 4318.

The untrusted app subnet(s) 4362 can include primary VNICs 4364(1)-(N) that can be communicatively coupled to tenant virtual machines (VMs) 4366(1)-(N) residing within the untrusted app subnet(s) 4362. Each tenant VM 4366(1)-(N) can run code in a respective container 4367(1)-(N) and be communicatively coupled to an app subnet 4326 that can be contained in a data plane app tier 4346 that can be contained in a container egress VCN 4368. Respective secondary VNICs 4372(1)-(N) can facilitate communication between the untrusted app subnet(s) 4362 contained in the data plane VCN 4318 and the app subnet contained in the container egress VCN 4368. The container egress VCN can include a NAT gateway 4338 that can be communicatively coupled to public Internet 4354 (e.g., public Internet 4054 of FIG. 40).

The Internet gateway 4334 contained in the control plane VCN 4316 and contained in the data plane VCN 4318 can be communicatively coupled to a metadata management service 4352 (e.g., the metadata management system 4052 of FIG. 40) that can be communicatively coupled to public Internet 4354. Public Internet 4354 can be communicatively coupled to the NAT gateway 4338 contained in the control plane VCN 4316 and contained in the data plane VCN 4318. The service gateway 4336 contained in the control plane VCN 4316 and contained in the data plane VCN 4318 can be communicatively coupled to cloud services 4356.

In some examples, the pattern illustrated by the architecture of block diagram 4300 of FIG. 43 may be considered an exception to the pattern illustrated by the architecture of block diagram 4200 of FIG. 42 and may be desirable for a customer of the IaaS provider if the IaaS provider cannot directly communicate with the customer (e.g., a disconnected region). The respective containers 4367(1)-(N) that are contained in the VMs 4366(1)-(N) for each customer can be accessed in real-time by the customer. The containers 4367(1)-(N) may be configured to make calls to respective secondary VNICs 4372(1)-(N) contained in app subnet(s) 4326 of the data plane app tier 4346 that can be contained in the container egress VCN 4368. The secondary VNICs 4372(1)-(N) can transmit the calls to the NAT gateway 4338 that may transmit the calls to public Internet 4354. In this example, the containers 4367(1)-(N) that can be accessed in real-time by the customer can be isolated from the control plane VCN 4316 and can be isolated from other entities contained in the data plane VCN 4318. The containers 4367(1)-(N) may also be isolated from resources from other customers.

In other examples, the customer can use the containers 4367(1)-(N) to call cloud services 4356. In this example, the customer may run code in the containers 4367(1)-(N) that requests a service from cloud services 4356. The containers 4367(1)-(N) can transmit this request to the secondary VNICs 4372(1)-(N) that can transmit the request to the NAT gateway that can transmit the request to public Internet 4354. Public Internet 4354 can transmit the request to LB subnet(s) 4322 contained in the control plane VCN 4316 via the Internet gateway 4334. In response to determining the request is valid, the LB subnet(s) can transmit the request to app subnet(s) 4326 that can transmit the request to cloud services 4356 via the service gateway 4336.

It should be appreciated that IaaS architectures 4000, 4100, 4200, 4300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 44:
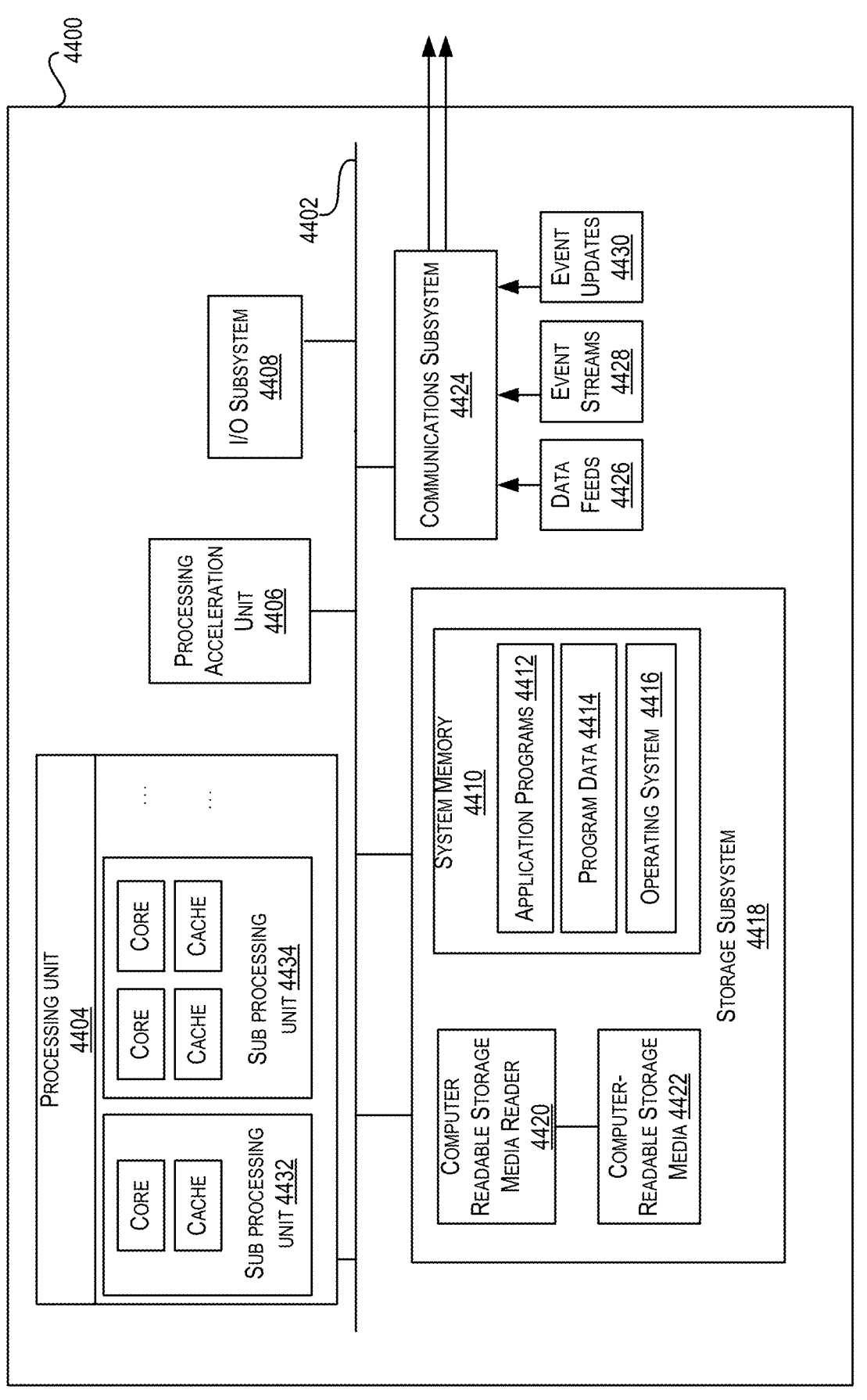
FIG. 44 is a block diagram illustrating an example computer system, according to at least one embodiment.

FIG. 44 illustrates an example computer system 4400, in which various embodiments may be implemented. The system 4400 may be used to implement any of the computer systems described above. As shown in the figure, computer system 4400 includes a processing unit 4404 that communicates with a number of peripheral subsystems via a bus subsystem 4402. These peripheral subsystems may include a processing acceleration unit 4406, an I/O subsystem 4408, a storage subsystem 4418 and a communications subsystem 4424. Storage subsystem 4418 includes tangible computer-readable storage media 4422 and a system memory 4410.

Bus subsystem 4402 provides a mechanism for letting the various components and subsystems of computer system 4400 communicate with each other as intended. Although bus subsystem 4402 is shown schematically as a single bus, alternative embodiments of the bus subsystem may utilize multiple buses. Bus subsystem 4402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 4404, which can be implemented as one or more integrated circuits (e.g., a conventional microprocessor or microcontroller), controls the operation of computer system 4400. One or more processors may be included in processing unit 4404. These processors may include single core or multicore processors. In certain embodiments, processing unit 4404 may be implemented as one or more independent processing units 4432 and/or 4434 with single or multicore processors included in each processing unit. In other embodiments, processing unit 4404 may also be implemented as a quad-core processing unit formed by integrating two dual-core processors into a single chip.

In various embodiments, processing unit 4404 can execute a variety of programs in response to program code and can maintain multiple concurrently executing programs or processes. At any given time, some or all of the program code to be executed can be resident in processor(s) 4404 and/or in storage subsystem 4418. Through suitable programming, processor(s) 4404 can provide various functionalities described above. Computer system 4400 may additionally include a processing acceleration unit 4406, which can include a digital signal processor (DSP), a specialpurpose processor, and/or the like.

I/O subsystem 4408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 4400 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 4400 may comprise a storage subsystem 4418 that provides a tangible non-transitory computerreadable storage medium for storing software and data constructs that provide the functionality of the embodiments described in this disclosure. The software can include programs, code modules, instructions, scripts, etc., that when executed by one or more cores or processors of processing unit 4404 provide the functionality described above. Storage subsystem 4418 may also provide a repository for storing data used in accordance with the present disclosure.

As depicted in the example in FIG. 44, storage subsystem 4418 can include various components including a system memory 4410, computer-readable storage media 4422, and a computer readable storage media reader 4420. System memory 4410 may store program instructions that are loadable and executable by processing unit 4404. System memory 4410 may also store data that is used during the execution of the instructions and/or data that is generated during the execution of the program instructions. Various different kinds of programs may be loaded into system memory 4410 including but not limited to client applications, Web browsers, mid-tier applications, relational database management systems (RDBMS), virtual machines, containers, etc.

System memory 4410 may also store an operating system 4416. Examples of operating system 4416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 4400 executes one or more virtual machines, the virtual machines along with their guest operating systems (GOSs) may be loaded into system memory 4410 and executed by one or more processors or cores of processing unit 4404.

System memory 4410 can come in different configurations depending upon the type of computer system 4400. For example, system memory 4410 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 4410 may include a basic input/output system (BIOS) containing basic routines that help to transfer information between elements within computer system 4400, such as during start-up.

Computer-readable storage media 4422 may represent remote, local, fixed, and/or removable storage devices plus storage media for temporarily and/or more permanently containing, storing, computer-readable information for use by computer system 4400 including instructions executable by processing unit 4404 of computer system 4400.

Computer-readable storage media 4422 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 4422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 4422 may include, but is not limited to, Zip® drives, flash memory cards, universal serial bus (USB) flash drives, secure digital (SD) cards, DVD disks, digital video tape, and the like. Computer-readable storage media 4422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 4400.

Machine-readable instructions executable by one or more processors or cores of processing unit 4404 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 4424 provides an interface to other computer systems and networks. Communications subsystem 4424 serves as an interface for receiving data from and transmitting data to other systems from computer system 4400. For example, communications subsystem 4424 may enable computer system 4400 to connect to one or more devices via the Internet. In some embodiments communications subsystem 4424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 4424 can provide wired network connectivity (e.g., Ethernet) in addition to or instead of a wireless interface.

In some embodiments, communications subsystem 4424 may also receive input communication in the form of structured and/or unstructured data feeds 4426, event streams 4428, event updates 4430, and the like on behalf of one or more users who may use computer system 4400.

By way of example, communications subsystem 4424 may be configured to receive data feeds 4426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 4424 may also be configured to receive data in the form of continuous data streams, which may include event streams 4428 of real-time events and/or event updates 4430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 4424 may also be configured to output the structured and/or unstructured data feeds 4426, event streams 4428, event updates 4430, and the like to one or more databases that may be in communication with one or more streaming data source computers coupled to computer system 4400.

Computer system 4400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 4400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
generating, by an orchestrator control plane of a cloud infrastructure orchestration service, a build plan comprising a plurality of ordered steps for bootstrapping one or more services, the build plan being generated based at least in part on one or more service plans and manifests, a service plan and manifest of the one or more service plans and manifests specifying a deterministic process for bootstrapping a service of the one or more services;
instructing, by the orchestrator control plane, a region orchestrator executing within an isolated testing environment to execute a test build of the one or more services according to the build plan;
executing, by the region orchestrator as part of executing the test build, a subset of steps from the plurality of ordered steps of the build plan utilizing resources of the isolated testing environment, the subset of steps being executed in an order identified by the build plan; and
executing, by the orchestrator control plane, one or more operations to reset the isolated testing environment to enable the isolated testing environment to be utilized for subsequent test builds.

2. The computer-implemented method of claim 1, wherein resetting the isolated testing environment comprises at least one of 1) identifying one or more resources of the isolated testing environment, and 2) deleting the one or more resources.

3. The computer-implemented method of claim 1, further comprising:
pausing, by the region orchestrator, the test build during execution;
receiving, by the orchestration control plane, an updated service plan;
generating, by the orchestration control plane, a new build plan based at least in part on the updated service plan; and
resuming, by the region orchestrator, the test build, wherein subsequent operations performed during execution of the test build are performed based at least in part on the new build plan.

4. The computer-implemented method of claim 1, wherein the service plan of the service plan and manifest comprises 1) a plurality of build milestones, 2) a first execution unit defining forward progress from a first build milestone of the plurality of build milestones to a second build milestone of the plurality of build milestones, and 3) a second execution unit defining backward progress from the second build milestone of the plurality of build milestones to the first build milestone of the plurality of build milestones.

5. The computer-implemented method of claim 4, further comprising reversing build progress of the service to a previous state based at least in part on executing a workflow corresponding to the second execution unit defining backward progress from the second build milestone of the plurality of build milestones to the first build milestone of the plurality of build milestones.

6. The computer-implemented method of claim 5, wherein reversing the build progress of the service comprises specifying that a previously published resource is no longer available.

7. The computer-implemented method of claim 1, wherein reversing the build progress of the service causes corresponding build progress of a second service of the one or more services to be reversed to a respective previous state.

8. A cloud infrastructure orchestration system, comprising:

one or more processors; and one or more memories storing computer-executable instructions that, when executed by the one or more processors, cause the one or more processors to:

generate, by an orchestrator control plane of the cloud infrastructure orchestration system, a build plan comprising a plurality of ordered steps for bootstrapping one or more services, the build plan being generated based at least in part on one or more service plans and manifests, a service plan and manifest of the one or more service plans and manifests specifying a deterministic process for bootstrapping a service of the one or more services;

instruct, by the orchestrator control plane, a region orchestrator executing within an isolated testing environment to execute a test build of the one or more services according to the build plan;

execute, by the region orchestrator of the cloud infrastructure orchestration system, as part of executing the test build, a subset of steps from the plurality of ordered steps of the build plan utilizing resources of the isolated testing environment, the subset of steps being executed in an order identified by the build plan; and execute, by the orchestrator control plane, one or more operations to reset the isolated testing environment to enable the isolated testing environment to be utilized for subsequent test builds.

9. The cloud infrastructure orchestration system of claim 8, wherein resetting the isolated testing environment comprises at least one of 1) identifying one or more resources of the isolated testing environment, and 2) deleting the one or more resources.

10. The cloud infrastructure orchestration system of claim 8, wherein executing the computer-executable instructions further causes the one or more processors to:

pause, by the region orchestrator, the test build during execution;

receive, by the orchestration control plane, an updated service plan;

generate, by the orchestration control plane, a new build plan based at least in part on the updated service plan; and resume, by the region orchestrator, the test build, wherein subsequent operations performed during execution of the test build are performed based at least in part on the new build plan.

11. The cloud infrastructure orchestration system of claim 8, wherein the service plan of the service plan and manifest comprises 1) a plurality of build milestones, 2) a first execution unit defining forward progress from a first build milestone of the plurality of build milestones to a second build milestone of the plurality of build milestones, and 3) a second execution unit defining backward progress from the second build milestone of the plurality of build milestones to the first build milestone of the plurality of build milestones.

12. The cloud infrastructure orchestration system of claim 11, wherein executing the computer-executable instructions further causes the one or more processors to reverse build progress of the service to a previous state based at least in part on executing a workflow corresponding to the second execution unit defining backward progress from the second build milestone of the plurality of build milestones to the first build milestone of the plurality of build milestones.

13. The cloud infrastructure orchestration system of claim 12, wherein reversing the build progress of the service comprises specifying that a previously published resource is no longer available.

14. The cloud infrastructure orchestration system of claim 8, wherein reversing the build progress of the service causes corresponding build progress of a second service of the one or more services to be reversed to a respective previous state.

15. A non-transitory computer-readable medium storing computer-executable instructions that, when executed by one or more processors of a cloud infrastructure orchestration system, cause the one or more processors of the cloud infrastructure orchestration system to at least:

generate, by an orchestrator control plane of the cloud infrastructure orchestration system, a build plan comprising a plurality of ordered steps for bootstrapping one or more services, the build plan being generated based at least in part on one or more service plans and manifests, a service plan and manifest of the one or more service plans and manifests specifying a deterministic process for bootstrapping a service of the one or more services;

instruct, by the orchestrator control plane, a region orchestrator executing within an isolated testing environment to execute a test build of the one or more services according to the build plan;

execute, by the region orchestrator of the cloud infrastructure orchestration system, as part of executing the test build, a subset of steps from the plurality of ordered steps of the build plan utilizing resources of the isolated testing environment, the subset of steps being executed in an order identified by the build plan; and execute, by the orchestrator control plane, one or more operations to reset the isolated testing environment to enable the isolated testing environment to be utilized for subsequent test builds.

16. The non-transitory computer-readable medium of claim 15, wherein resetting the isolated testing environment comprises at least one of 1) identifying one or more resources of the isolated testing environment, and 2) deleting the one or more resources.

17. The non-transitory computer-readable medium of claim 15, wherein executing the computer-executable instructions further causes the one or more processors to:

pause, by the region orchestrator, the test build during execution;

receive, by the orchestration control plane, an updated service plan;

generate, by the orchestration control plane, a new build plan based at least in part on the updated service plan; and resume, by the region orchestrator, the test build, wherein subsequent operations performed during execution of the test build are performed based at least in part on the new build plan.

18. The non-transitory computer-readable medium of claim 15, wherein the service plan of the service plan and manifest comprises 1) a plurality of build milestones, 2) a first execution unit defining forward progress from a first build milestone of the plurality of build milestones to a second build milestone of the plurality of build milestones, and 3) a second execution unit defining backward progress from the second build milestone of the plurality of build milestones to the first build milestone of the plurality of build milestones.

19. The non-transitory computer-readable medium of claim 18, wherein executing the computer-executable instructions further causes the one or more processors to reverse build progress of the service to a previous state based at least in part on executing a workflow corresponding to the second execution unit defining backward progress from the second build milestone of the plurality of build milestones to the first build milestone of the plurality of build milestones.

20. The non-transitory computer-readable medium of claim 19, wherein reversing the build progress of the service comprises specifying that a previously published resource is no longer available.

\* \* \* \* \*